US011763634B2

(12) United States Patent
Thomas et al.

(10) Patent No.: US 11,763,634 B2
(45) Date of Patent: Sep. 19, 2023

(54) TOURNAMENT GAMING FOR ELECTRONIC GAMING MACHINES AND OTHER COMPUTING DEVICES

(71) Applicant: Aristocrat Technologies, Inc., Las Vegas, NV (US)

(72) Inventors: Alfred Thomas, Ventura, CA (US); Joseph Masinter, II, Las Vegas, NV (US); Michele Rousseau, Las Vegas, NV (US); Allon Englman, Las Vegas, NV (US); Angelo Palmisano, Henderson, NV (US); Christopher Cleveland, Las Vegas, NV (US); Larry Pacey, Calabasas, CA (US)

(73) Assignee: Aristocrat Technologies, Inc., Las Vegas, NV (US)

(*) Notice: Subject to any disclaimer, the term of this patent is extended or adjusted under 35 U.S.C. 154(b) by 121 days.

(21) Appl. No.: 16/948,961

(22) Filed: Oct. 7, 2020

(65) Prior Publication Data

US 2021/0110666 A1 Apr. 15, 2021

Related U.S. Application Data

(60) Provisional application No. 62/955,881, filed on Dec. 31, 2019, provisional application No. 62/913,682, (Continued)

(51) Int. Cl.
*A63F 9/24* (2006.01)
*A63F 11/00* (2006.01)
(Continued)

(52) U.S. Cl.
CPC ...... *G07F 17/3276* (2013.01); *G07F 17/3211* (2013.01); *G07F 17/3244* (2013.01); *H04W 4/021* (2013.01)

(58) Field of Classification Search
CPC ... G07F 17/32; G07F 17/3211; G07F 17/3214
(Continued)

(56) References Cited

U.S. PATENT DOCUMENTS

D259,499 S   6/1981  Dunham
5,342,518 A   8/1994  Posner
(Continued)

FOREIGN PATENT DOCUMENTS

AU      630112 B      3/1993
AU   1997022551 A1   8/1997
(Continued)

OTHER PUBLICATIONS

"Cashman Casino," Sep. 2018 screenshot from YouTube video. Publication date Apr. 4, 2017, 1 page.
(Continued)

*Primary Examiner* — Adetokunbo O Torimiro
(74) *Attorney, Agent, or Firm* — Weaver Austin Villeneuve & Sampson LLP

(57) ABSTRACT

Various gaming tournament-related techniques and systems for providing for game-of-chance gaming tournaments are disclosed, including techniques relating to criteria-based award of plays and/or perks for use in a particular tournament. Unlockable tournament games and geolocation-based award of tournament benefits are also discussed.

18 Claims, 10 Drawing Sheets

Related U.S. Application Data filed on Oct. 10, 2019, provisional application No. 62/913,680, filed on Oct. 10, 2019, provisional application No. 62/913,684, filed on Oct. 10, 2019, provisional application No. 62/913,685, filed on Oct. 10, 2019.

(51) Int. Cl.
    *G06F 13/00* (2006.01)
    *G06F 17/00* (2019.01)
    *G07F 17/32* (2006.01)
    *H04W 4/021* (2018.01)

(58) Field of Classification Search
    USPC .............................. 463/1, 20, 22, 25, 39, 42
    See application file for complete search history.

(56) References Cited

U.S. PATENT DOCUMENTS

| | | |
|---|---|---|
| 5,560,603 A | 10/1996 | Seelig |
| 5,664,998 A | 9/1997 | Seelig |
| 5,755,621 A | 5/1998 | Marks |
| 5,767,854 A | 6/1998 | Anwar |
| 5,779,242 A | 7/1998 | Kaufmann |
| 5,779,549 A | 7/1998 | Walker |
| 6,039,648 A | 3/2000 | Guinn |
| 6,082,887 A | 7/2000 | Feuer |
| 6,093,100 A | 7/2000 | Singer |
| 6,210,275 B1 | 4/2001 | Olsen |
| 6,224,486 B1 | 5/2001 | Walker |
| 6,270,412 B1 | 8/2001 | Crawford |
| 6,287,202 B1 | 9/2001 | Pascal |
| 6,293,865 B1 | 9/2001 | Kelly |
| 6,309,299 B1 | 10/2001 | Weiss |
| 6,354,592 B1 | 3/2002 | Virzi |
| 6,425,828 B2 | 7/2002 | Walker |
| 6,620,045 B2 | 9/2003 | Berman |
| D492,692 S | 7/2004 | Fallon |
| 6,817,948 B2 | 11/2004 | Pascal |
| D499,786 S | 12/2004 | Dropo |
| 6,908,390 B2 | 6/2005 | Nguyen |
| 7,354,345 B2 | 4/2008 | Bortnik |
| 7,393,280 B2 | 7/2008 | Cannon |
| 7,516,959 B2 | 4/2009 | Huard |
| D605,725 S | 12/2009 | Chang |
| 7,682,251 B2 | 3/2010 | Bortnik |
| 7,684,874 B2 | 3/2010 | Schlottmann |
| 7,684,882 B2 | 3/2010 | Baerlocher |
| 7,689,302 B2 | 3/2010 | Schlottmann |
| 7,690,996 B2 | 4/2010 | Iddings |
| 7,704,144 B2 | 4/2010 | Abbott |
| 7,753,790 B2 | 7/2010 | Nguyen |
| 7,780,520 B2 | 8/2010 | Baerlocher |
| 7,787,972 B2 | 8/2010 | Schlottmann |
| 7,798,901 B2 | 9/2010 | Nguyen |
| 7,824,267 B2 | 11/2010 | Cannon |
| 7,878,899 B2 | 2/2011 | Duhamel |
| 7,972,209 B2 | 7/2011 | Kelly |
| 7,976,389 B2 | 7/2011 | Cannon |
| 8,002,630 B2 | 8/2011 | Nguyen |
| 3,021,230 A1 | 9/2011 | Baerlocher |
| 8,043,157 B2 | 10/2011 | Cannon |
| 8,070,583 B2 | 12/2011 | Baerlocher |
| 8,092,309 B2 | 1/2012 | Bickley |
| 8,142,272 B2 | 3/2012 | Walker |
| 8,157,647 B2 | 4/2012 | House |
| 8,192,270 B2 | 6/2012 | Slomiany |
| 8,202,165 B2 | 6/2012 | Duhamel |
| 8,246,434 B2 | 8/2012 | Moody |
| 8,246,439 B2 | 8/2012 | Kelly |
| 8,277,298 B2 | 10/2012 | Mace |
| 8,313,372 B2 | 11/2012 | Naicker |
| 8,317,620 B2 | 11/2012 | Kelly |
| 8,342,957 B2 | 1/2013 | Carpenter |
| 8,382,572 B2 | 2/2013 | Hoffman |
| 8,419,520 B2 | 4/2013 | Johnson |
| 8,419,546 B2 | 4/2013 | Decasa |
| 8,430,736 B2 | 4/2013 | Cannon |
| 8,439,733 B2 | 5/2013 | Kay |
| 8,449,386 B2 | 5/2013 | Englman |
| 8,465,363 B1 | 6/2013 | Mayeroff |
| 8,469,788 B2 | 6/2013 | Carpenter |
| 8,485,892 B2 | 7/2013 | Nguyen |
| 8,506,394 B2 | 8/2013 | Kelly |
| 8,512,119 B2 | 8/2013 | Kelly |
| 8,523,682 B2 | 9/2013 | Bickley |
| 8,540,577 B2 | 9/2013 | Shvili |
| 8,562,418 B2 | 10/2013 | Gomez |
| 8,585,481 B2 | 11/2013 | Owen |
| 8,585,494 B2 | 11/2013 | Parrinello |
| 8,591,338 B2 | 11/2013 | Nguyen |
| D694,773 S | 12/2013 | Sakaguchi |
| D695,778 S | 12/2013 | Edwards |
| 8,602,877 B2 | 12/2013 | Carpenter |
| 8,613,650 B2 | 12/2013 | Kovacs |
| 8,622,793 B2 | 1/2014 | Ford |
| 8,622,817 B2 | 1/2014 | Englman |
| 8,641,507 B2 | 2/2014 | Kelly |
| 8,641,515 B2 | 2/2014 | Nicely |
| 8,684,830 B1 | 4/2014 | Chun |
| 8,690,661 B2 | 4/2014 | Cannon |
| 8,702,499 B2 | 4/2014 | Johnson |
| 8,702,520 B2 | 4/2014 | Seelig |
| 8,715,051 B2 | 5/2014 | Davis |
| 8,715,052 B2 | 5/2014 | Bennett |
| 8,715,069 B2 | 5/2014 | Arnone |
| 8,721,421 B2 | 5/2014 | Tempest |
| 8,734,232 B2 | 5/2014 | Bunch |
| D706,808 S | 6/2014 | Edwards |
| D710,372 S | 8/2014 | Dellinger |
| 8,801,518 B2 | 8/2014 | Lipscomb |
| 8,808,077 B1 | 8/2014 | Chun |
| 8,840,462 B2 | 9/2014 | Patel |
| 8,851,980 B2 | 10/2014 | Versaci |
| 8,851,981 B2 | 10/2014 | Ramsey |
| 8,852,001 B2 | 10/2014 | Kelly |
| 8,870,659 B2 | 10/2014 | House |
| 8,894,480 B2 | 11/2014 | Johnson |
| 8,905,841 B2 | 12/2014 | Carpenter |
| 9,005,010 B2 | 4/2015 | Watkins |
| 9,011,241 B2 | 4/2015 | Kelly |
| D730,373 S | 5/2015 | Clement |
| 9,022,867 B2 | 5/2015 | Kelly |
| 9,033,786 B2 | 5/2015 | Kelly |
| D732,054 S | 6/2015 | Yoneda |
| 9,070,255 B2 | 6/2015 | Christensen |
| 9,111,416 B2 | 8/2015 | Cannon |
| 9,123,208 B2 | 9/2015 | Davis |
| 9,123,210 B2 | 9/2015 | Bennett |
| D741,897 S | 10/2015 | Wilkinson |
| 9,155,968 B2 | 10/2015 | Hedrick |
| 9,159,198 B2 | 10/2015 | Moshal |
| 9,165,429 B2 | 10/2015 | Cannon |
| 9,165,430 B2 | 10/2015 | Bickley |
| 9,171,426 B2 | 10/2015 | Dimichele |
| 9,177,445 B2 | 11/2015 | Vemuri |
| 9,214,056 B2 | 12/2015 | Kovacs |
| D750,113 S | 2/2016 | Kettner |
| 9,286,756 B2 | 3/2016 | Bramble |
| D753,158 S | 4/2016 | Mezzanotte |
| 9,311,773 B2 | 4/2016 | Chun |
| D759,065 S | 6/2016 | Mezzanotte |
| 9,361,754 B2 | 6/2016 | Decasa, Jr. |
| 9,364,753 B2 | 6/2016 | Bennett |
| 9,384,631 B2 | 7/2016 | Arnone |
| 9,384,635 B2 | 7/2016 | Nguyen |
| 9,401,073 B2 | 7/2016 | Lee |
| D763,904 S | 8/2016 | Knapp |
| 9,430,908 B2 | 8/2016 | Owen |
| 9,443,393 B2 | 9/2016 | Johnson |
| 9,443,394 B2 | 9/2016 | Carpenter |
| D771,670 S | 11/2016 | Chan |
| D772,252 S | 11/2016 | Myers |

(56) References Cited

U.S. PATENT DOCUMENTS

| | | |
|---|---|---|
| D772,260 S | 11/2016 | Thomas |
| D772,894 S | 11/2016 | Zhao |
| 9,495,838 B2 | 11/2016 | Davis |
| 9,520,020 B2 | 12/2016 | Bickley |
| 9,530,280 B2 | 12/2016 | Melnick |
| 9,558,632 B2 | 1/2017 | Melnick |
| D780,201 S | 2/2017 | Zielinski |
| 9,569,933 B2 | 2/2017 | Baker |
| 9,607,479 B2 | 3/2017 | Robbins |
| D783,655 S | 4/2017 | Hu |
| 9,613,492 B2 | 4/2017 | Englman |
| 9,616,331 B1 | 4/2017 | Jordan |
| 9,626,836 B2 | 4/2017 | Arnone |
| 9,633,509 B2 | 4/2017 | Cannon |
| D788,167 S | 5/2017 | Fox Uribe |
| 9,656,174 B1 | 5/2017 | McLellan |
| 9,697,671 B2 | 7/2017 | Moody |
| 9,697,674 B2 | 7/2017 | Morrissette |
| 9,715,790 B2 | 7/2017 | Arnone |
| 9,734,660 B2 | 8/2017 | Kiely |
| 9,747,754 B2 | 8/2017 | Carpenter |
| D801,990 S | 11/2017 | Reissner |
| D804,505 S | 12/2017 | Hoffman |
| 9,858,750 B2 | 1/2018 | Kovacs |
| 9,984,529 B2 | 5/2018 | Kim |
| 9,990,806 B2 | 6/2018 | Davis |
| D823,336 S | 7/2018 | Tinney |
| 10,013,852 B1 | 7/2018 | Jordan |
| 10,032,338 B2 | 7/2018 | Lark |
| 10,055,940 B2 | 8/2018 | Arnone |
| 10,068,432 B2 | 9/2018 | Wortmann |
| 10,109,155 B2 | 10/2018 | Chase |
| D834,604 S | 11/2018 | Feldman |
| D836,653 S | 12/2018 | Zhou |
| 10,163,305 B2 | 12/2018 | Wortmann |
| 10,195,532 B1 | 2/2019 | McLellan |
| 10,210,706 B2 | 2/2019 | Penacho |
| D842,316 S | 3/2019 | Toth |
| 10,235,841 B2 | 3/2019 | Nguyen |
| 10,255,765 B2 | 4/2019 | Washington |
| D847,833 S | 5/2019 | Toth |
| D849,771 S | 5/2019 | Foley |
| D852,830 S | 7/2019 | Penacho |
| D854,554 S | 7/2019 | Toth |
| 10,354,491 B2 | 7/2019 | Melnick |
| 10,360,766 B2 | 7/2019 | Arnone |
| 10,373,442 B2 | 8/2019 | Schlottmann |
| 10,395,474 B2 | 8/2019 | Englman |
| D858,535 S | 9/2019 | Evans |
| 10,424,162 B2 | 9/2019 | Heenan |
| D861,703 S | 10/2019 | Suslik |
| D861,710 S | 10/2019 | Frackelton |
| 10,445,985 B2 | 10/2019 | Davis |
| 10,460,568 B2 | 10/2019 | Givant |
| D867,391 S | 11/2019 | Yoshioka |
| D868,825 S | 12/2019 | Paulik |
| D870,123 S | 12/2019 | Butcher |
| D870,126 S | 12/2019 | Crispino |
| 10,504,332 B2 | 12/2019 | Riggs |
| 10,510,215 B2 | 12/2019 | Arnone |
| 10,515,514 B1 | 12/2019 | Weaver |
| 10,540,852 B2 | 1/2020 | Lark |
| D875,110 S | 2/2020 | Spors |
| D876,450 S | 2/2020 | Suslik |
| D876,477 S | 2/2020 | Gansert |
| D879,122 S | 3/2020 | Ebler |
| 10,621,829 B2 | 4/2020 | Loader |
| D889,493 S | 7/2020 | Schwegler |
| D890,790 S | 7/2020 | Marks |
| D895,645 S | 9/2020 | Sanborn |
| D896,256 S | 9/2020 | Kawaichi |
| 10,789,814 B2 * | 9/2020 | Palmisano ......... G07F 17/3276 |
| D898,769 S | 10/2020 | Park |
| D905,106 S | 12/2020 | Kang |
| D905,736 S | 12/2020 | Felkins |
| 10,864,443 B2 | 12/2020 | Eatedali |
| 10,872,492 B2 | 12/2020 | Michael |
| D910,071 S | 2/2021 | Chen |
| D913,325 S | 3/2021 | Chen |
| D914,056 S | 3/2021 | Chen |
| D916,754 S | 4/2021 | Johnson |
| D916,903 S | 4/2021 | Arena |
| D917,503 S | 4/2021 | Sakurai |
| 11,055,951 B2 | 7/2021 | La Guardia |
| 11,183,020 B2 | 11/2021 | Berman |
| 2001/0034260 A1 | 10/2001 | Anthony |
| 2001/0054003 A1 | 12/2001 | Chien |
| 2002/0028707 A1 | 3/2002 | Pascal |
| 2002/0119824 A1 | 8/2002 | Allen |
| 2002/0183105 A1 | 12/2002 | Cannon |
| 2003/0050831 A1 | 3/2003 | Klayh |
| 2003/0060264 A1 | 3/2003 | Chilton |
| 2004/0229700 A1 | 11/2004 | Cannon |
| 2005/0020352 A1 | 1/2005 | Chilton |
| 2005/0071024 A1 | 3/2005 | Henshaw |
| 2005/0160003 A1 | 7/2005 | Berardi |
| 2006/0058082 A1 | 3/2006 | Crawford, III |
| 2006/0082056 A1 | 4/2006 | Kane |
| 2006/0148565 A1 | 7/2006 | Gauselmann |
| 2006/0157934 A1 | 7/2006 | Yoseloff |
| 2006/0178202 A1 | 8/2006 | Hughes |
| 2006/0287045 A1 | 12/2006 | Walker |
| 2007/0129147 A1 | 6/2007 | Gagner |
| 2007/0191102 A1 | 8/2007 | Coliz |
| 2007/0218968 A1 | 9/2007 | Snow |
| 2007/0218982 A1 | 9/2007 | Baerlocher |
| 2007/0243936 A1 | 10/2007 | Binenstock |
| 2008/0045288 A1 | 2/2008 | Moshal |
| 2008/0070692 A1 | 3/2008 | Schlottmann |
| 2008/0070693 A1 | 3/2008 | Schlottmann |
| 2008/0070694 A1 | 3/2008 | Schlottmann |
| 2008/0070695 A1 | 3/2008 | Baerlocher |
| 2008/0076520 A1 | 3/2008 | Chan |
| 2008/0146305 A1 | 6/2008 | Moody |
| 2008/0207313 A1 | 8/2008 | Acres |
| 2008/0254883 A1 | 10/2008 | Patel |
| 2009/0005150 A1 | 1/2009 | Haveson |
| 2009/0011810 A1 | 1/2009 | Moshal |
| 2009/0011827 A1 | 1/2009 | Englman |
| 2009/0029773 A1 | 1/2009 | Cherry |
| 2009/0061997 A1 | 3/2009 | Popovich |
| 2009/0061999 A1 | 3/2009 | Popovich |
| 2009/0069093 A1 | 3/2009 | Kelly |
| 2009/0104965 A1 | 4/2009 | House |
| 2009/0118000 A1 | 5/2009 | Yoshizawa |
| 2009/0124320 A1 | 5/2009 | Dewaal |
| 2009/0124364 A1 | 5/2009 | Cuddy |
| 2009/0170584 A1 | 7/2009 | Tan |
| 2009/0197659 A1 | 8/2009 | Christensen |
| 2009/0270168 A1 | 10/2009 | Englman |
| 2009/0275374 A1 | 11/2009 | Nelson |
| 2010/0022307 A1 | 1/2010 | Steuer |
| 2010/0035674 A1 | 2/2010 | Slomiany |
| 2010/0062840 A1 | 3/2010 | Herrmann |
| 2010/0070056 A1 | 3/2010 | Coronel |
| 2010/0105470 A1 | 4/2010 | Englman |
| 2010/0120503 A1 | 5/2010 | Hoffman |
| 2010/0197377 A1 | 8/2010 | Aoki |
| 2010/0210356 A1 | 8/2010 | Losica |
| 2010/0210362 A1 | 8/2010 | Toompere |
| 2010/0227686 A1 | 9/2010 | Brunet De Courssou |
| 2010/0311497 A1 | 12/2010 | Suslik |
| 2011/0014964 A1 | 1/2011 | Crowder, Jr. |
| 2011/0028160 A1 | 2/2011 | Roeding |
| 2011/0070940 A1 | 3/2011 | Jaffe |
| 2011/0111856 A1 | 5/2011 | White |
| 2011/0130186 A1 | 6/2011 | Chim |
| 2011/0281624 A1 | 11/2011 | Moody |
| 2012/0122561 A1 | 5/2012 | Hedrick |
| 2012/0129610 A1 | 5/2012 | Mazursky |
| 2012/0225724 A1 | 9/2012 | Barber |
| 2013/0029739 A1 | 1/2013 | Ramsey |
| 2013/0065676 A1 | 3/2013 | Owen |
| 2013/0072294 A1 | 3/2013 | Mosley |

(56) References Cited

U.S. PATENT DOCUMENTS

| | | |
|---|---|---|
| 2013/0116809 A1 | 5/2013 | Carpenter |
| 2013/0122978 A1 | 5/2013 | Slomiany |
| 2013/0244751 A1 | 9/2013 | Bennett |
| 2013/0252704 A1 | 9/2013 | Gilbertson |
| 2013/0281179 A1 | 10/2013 | Tempest |
| 2013/0296036 A1 | 11/2013 | Scott |
| 2013/0310127 A1 | 11/2013 | Bradley |
| 2013/0331181 A1 | 12/2013 | Newton |
| 2013/0331184 A1 | 12/2013 | Kelly |
| 2013/0331968 A1 | 12/2013 | Newton |
| 2014/0038703 A1 | 2/2014 | Lampert |
| 2014/0038724 A1 | 2/2014 | Layne, IV |
| 2014/0051520 A1 | 2/2014 | Davis |
| 2014/0087815 A1 | 3/2014 | Caputo |
| 2014/0106866 A1 | 4/2014 | Hardy |
| 2014/0162787 A1 | 6/2014 | Carpenter |
| 2014/0194176 A1 | 7/2014 | Robbins |
| 2014/0274308 A1 | 9/2014 | Guinn |
| 2014/0323199 A1 | 10/2014 | Dimichele |
| 2015/0018070 A1 | 1/2015 | Meyer |
| 2015/0099576 A1 | 4/2015 | Anderson |
| 2015/0199878 A1 | 7/2015 | Wright |
| 2015/0228151 A1 | 8/2015 | Damodaran |
| 2015/0248810 A1 | 9/2015 | Wortmann |
| 2015/0287069 A1 | 10/2015 | Gissara |
| 2015/0348361 A1 | 12/2015 | Adiraju |
| 2015/0355727 A1 | 12/2015 | Hu |
| 2015/0356815 A1 | 12/2015 | Kim |
| 2015/0379822 A1 | 12/2015 | Ellis |
| 2016/0063807 A1 | 3/2016 | Bennett |
| 2016/0104344 A1 | 4/2016 | Meyer |
| 2016/0140807 A1 | 5/2016 | Chase |
| 2016/0148126 A1 | 5/2016 | Paleja |
| 2016/0217646 A1 | 7/2016 | Hornik |
| 2016/0275757 A1 | 9/2016 | Decasa, Jr. |
| 2016/0284157 A1 | 9/2016 | Marrinson |
| 2016/0328918 A1 | 11/2016 | De Waal |
| 2017/0161999 A1 | 6/2017 | Givant |
| 2017/0200349 A1 | 7/2017 | Englman |
| 2017/0323528 A1 | 11/2017 | Arnone |
| 2017/0337775 A1 | 11/2017 | Singer |
| 2018/0052582 A1 | 2/2018 | Hilbert |
| 2018/0068529 A1 | 3/2018 | Delekta |
| 2018/0075708 A1 | 3/2018 | San |
| 2018/0089953 A1 | 3/2018 | Palmisano |
| 2018/0089954 A1 | 3/2018 | Carpenter |
| 2018/0095616 A1 | 4/2018 | Valdivia |
| 2018/0130312 A1 | 5/2018 | Cire |
| 2018/0146206 A1 | 5/2018 | Weekes |
| 2019/0066446 A1 | 2/2019 | Mariscal |
| 2019/0073859 A1 | 3/2019 | Penacho |
| 2019/0080562 A1 | 3/2019 | Jungmann |
| 2019/0096182 A1 | 3/2019 | Oberberger |
| 2019/0102993 A1 | 4/2019 | Washington |
| 2019/0139366 A1 | 5/2019 | Davis |
| 2019/0147706 A1 | 5/2019 | Bolling, Jr. |
| 2019/0244482 A1 | 8/2019 | Washington |
| 2019/0262717 A1 | 8/2019 | Thielbar |
| 2019/0287344 A1 | 9/2019 | Oberberger |
| 2019/0333314 A1 | 10/2019 | Henshaw |
| 2019/0340883 A1 | 11/2019 | Arnone |
| 2019/0347907 A1 | 11/2019 | Bolling, Jr. |
| 2019/0378379 A1 | 12/2019 | Satterlie |
| 2019/0385406 A1 | 12/2019 | Marks |
| 2020/0043233 A1 | 2/2020 | Nelson |
| 2020/0043293 A1 | 2/2020 | Nelson |
| 2020/0043294 A1 | 2/2020 | Davis |
| 2020/0111293 A1 | 4/2020 | Oberberger |
| 2020/0184775 A1 | 6/2020 | Oberberger |
| 2020/0279451 A1 | 9/2020 | La Guardia |
| 2020/0364987 A1* | 11/2020 | Weaver ............... G07F 17/3225 |
| 2021/0007632 A1 | 1/2021 | Blahnik |
| 2021/0256811 A1 | 8/2021 | Uberuaga |

FOREIGN PATENT DOCUMENTS

| | | |
|---|---|---|
| AU | 1997029346 A1 | 11/1997 |
| AU | 1997030070 A1 | 11/1997 |
| AU | 1997035809 A1 | 1/1998 |
| AU | 700667 B2 | 1/1999 |
| AU | 2001036378 A1 | 5/2001 |
| AU | 2001294751 A1 | 6/2002 |
| AU | 2002311978 A1 | 12/2002 |
| AU | 755912 B2 | 1/2003 |
| AU | 2002250161 A1 | 7/2003 |
| AU | 2003281244 A1 | 1/2004 |
| AU | 2004904539 | 8/2004 |
| AU | 2005203403 A1 | 2/2006 |
| AU | 2005285317 A1 | 3/2006 |
| AU | 2002306874 B2 | 6/2006 |
| AU | 2006200237 A1 | 8/2006 |
| AU | 2007200711 A1 | 10/2007 |
| AU | 2008100162 B4 | 4/2008 |
| AU | 2008100163 B4 | 4/2008 |
| AU | 2006208418 B2 | 11/2008 |
| AU | 2007211906 B2 | 2/2009 |
| AU | 2005235004 B2 | 4/2009 |
| AU | 2008323670 B2 | 5/2009 |
| AU | 2007216930 B2 | 3/2010 |
| AU | 2007237214 B2 | 3/2010 |
| AU | 2008200060 B2 | 3/2010 |
| AU | 2004267734 B2 | 7/2010 |
| AU | 2010200449 A1 | 9/2010 |
| AU | 2005270750 B2 | 12/2010 |
| AU | 2010202077 A1 | 12/2010 |
| AU | 2004267733 B2 | 1/2011 |
| AU | 2004267746 B2 | 1/2011 |
| AU | 2005203404 B2 | 3/2011 |
| AU | 2011100529 A1 | 3/2011 |
| AU | 2010246507 A1 | 6/2011 |
| AU | 2007200050 B2 | 9/2011 |
| AU | 2006302141 B2 | 1/2012 |
| AU | 2005248969 B2 | 2/2012 |
| AU | 2011205125 A1 | 3/2012 |
| AU | 2011200434 B2 | 11/2012 |
| AU | 2010202282 B2 | 1/2013 |
| AU | 2012268860 A1 | 1/2013 |
| AU | 2008312413 B2 | 9/2013 |
| AU | 2013254911 A1 | 11/2013 |
| AU | 2014900096 | 1/2014 |
| AU | 2013202667 B2 | 1/2015 |
| AU | 2015201979 A1 | 5/2015 |
| AU | 2012326136 B2 | 6/2015 |
| AU | 2015200050 A1 | 7/2015 |
| AU | 2013213728 B2 | 1/2016 |
| AU | 2011307385 B2 | 3/2016 |
| AU | 2016203321 A1 | 6/2016 |
| AU | 2016204577 A1 | 7/2016 |
| AU | 2014395471 A1 | 1/2017 |
| AU | 2014317574 B2 | 6/2017 |
| AU | 2014317575 B2 | 6/2017 |
| AU | 2016349725 A1 | 6/2018 |
| AU | 2018203786 A1 | 6/2018 |
| AU | 2018203839 A1 | 6/2018 |
| CA | 2340562 A1 | 8/2002 |
| CA | 2536018 A1 | 3/2005 |
| CA | 2920520 A1 | 3/2005 |
| CA | 2538706 A1 | 4/2005 |
| CA | 2259197 C | 9/2005 |
| CA | 2253884 C | 11/2005 |
| CA | 2563942 A1 | 11/2005 |
| CA | 2580187 A1 | 3/2006 |
| CA | 2522944 A1 | 7/2006 |
| CA | 2527367 A1 | 5/2007 |
| CA | 2527416 A1 | 5/2007 |
| CA | 2403035 C | 7/2007 |
| CA | 2572719 A1 | 7/2007 |
| CA | 2604412 A1 | 4/2008 |
| CA | 2617034 A1 | 7/2008 |
| CA | 2691337 A1 | 8/2010 |
| CA | 2812377 A1 | 4/2012 |
| CA | 2838347 A1 | 12/2012 |
| CA | 2852464 A1 | 4/2013 |

(56) References Cited

FOREIGN PATENT DOCUMENTS

| | | |
|---|---|---|
| CA | 2876890 A1 | 7/2015 |
| CA | 2947448 A1 | 11/2015 |
| CA | 2956084 A1 | 1/2016 |
| CA | 2535880 C | 4/2016 |
| CA | 2599635 C | 8/2016 |
| CA | 2535838 C | 9/2016 |
| CA | 2941629 A1 | 3/2017 |
| CA | 3004490 A1 | 5/2017 |
| CA | 3017742 A1 | 9/2017 |
| CA | 3017745 A1 | 9/2017 |
| CA | 2655095 C | 4/2018 |
| CN | 1853203 A | 10/2006 |
| CN | 1853204 A | 10/2006 |
| CN | 1853205 A | 10/2006 |
| CN | 101018592 A | 8/2007 |
| CN | 101043923 A | 9/2007 |
| CN | 101044523 A | 9/2007 |
| CN | 101044525 A | 9/2007 |
| CN | 101321564 B | 7/2011 |
| DE | 19740287 A1 | 3/1998 |
| EP | 1021228 A4 | 1/2001 |
| EP | 1296294 A3 | 2/2004 |
| EP | 1644902 A2 | 4/2006 |
| EP | 1656647 A1 | 5/2006 |
| EP | 1656648 A1 | 5/2006 |
| EP | 1677263 A3 | 4/2007 |
| EP | 1794721 A1 | 6/2007 |
| EP | 1903522 A1 | 3/2008 |
| EP | 1912185 A1 | 4/2008 |
| EP | 1933960 A2 | 6/2008 |
| EP | 2003630 A1 | 12/2008 |
| EP | 1740281 A4 | 2/2009 |
| EP | 1814091 A3 | 2/2009 |
| EP | 2218487 A3 | 8/2010 |
| EP | 2435995 A1 | 4/2012 |
| EP | 2723462 A4 | 11/2014 |
| EP | 2621595 A4 | 6/2015 |
| EP | 3171951 A4 | 12/2017 |
| EP | 3149713 A4 | 2/2018 |
| EP | 3429710 A2 | 1/2019 |
| EP | 3429711 A1 | 1/2019 |
| GB | 2387950 A | 10/2003 |
| GB | 0409224 | 4/2004 |
| GB | 2401063 B | 10/2006 |
| GB | 2427149 B | 3/2007 |
| HK | 1237704 A | 4/2018 |
| IL | 216538 A | 2/2012 |
| IN | 201847034966 A | 9/2018 |
| JP | 2007502658 A | 2/2007 |
| JP | 2007502659 A | 2/2007 |
| JP | 2007502661 A | 2/2007 |
| JP | 5941152 B2 | 6/2016 |
| JP | 2017518850 A | 7/2017 |
| MO | I000434 A | 2/2008 |
| MO | I000877 A | 3/2009 |
| MO | 1001296 C | 5/2016 |
| MO | 1001298 C | 5/2016 |
| NZ | 703662 A | 7/2015 |
| PH | 12018501052 A1 | 1/2019 |
| RU | 96117375 C1 | 9/1999 |
| SG | 131166 A1 | 5/2007 |
| SG | 11201401444 | 5/2014 |
| SG | 10201500175 | 8/2015 |
| SG | 11201803977 | 6/2018 |
| TW | 573262 B | 1/2004 |
| WO | 1997027921 A1 | 8/1997 |
| WO | 1997039811 A1 | 10/1997 |
| WO | 1997041933 A1 | 11/1997 |
| WO | 1998000210 A1 | 1/1998 |
| WO | 2001032276 A3 | 2/2002 |
| WO | 2003059472 A1 | 7/2003 |
| WO | 2002094399 A8 | 8/2003 |
| WO | 2002027676 A8 | 9/2003 |
| WO | 2003083796 A1 | 10/2003 |
| WO | 2004004853 A2 | 1/2004 |
| WO | 2005020165 A1 | 3/2005 |
| WO | 2005020166 A1 | 3/2005 |
| WO | 2005020164 A3 | 4/2005 |
| WO | 2005030353 A3 | 4/2005 |
| WO | 2005102480 A1 | 11/2005 |
| WO | 2006015442 A1 | 2/2006 |
| WO | 2006031439 A1 | 3/2006 |
| WO | 2005110563 A3 | 1/2007 |
| WO | 2007044785 A3 | 4/2007 |
| WO | 2007050119 A3 | 7/2007 |
| WO | 2007087297 A3 | 7/2008 |
| WO | 2007146791 A3 | 12/2008 |
| WO | 2009006274 A1 | 1/2009 |
| WO | 2009052300 A1 | 4/2009 |
| WO | 2009062187 A1 | 5/2009 |
| WO | 2009086466 A3 | 7/2009 |
| WO | 2009108805 A3 | 12/2009 |
| WO | 2010011673 A1 | 1/2010 |
| WO | 2009135086 A3 | 2/2010 |
| WO | 2010054061 A1 | 5/2010 |
| WO | 2010098808 A1 | 9/2010 |
| WO | 2010137010 A1 | 12/2010 |
| WO | 2011019949 A9 | 11/2011 |
| WO | 2012044559 A1 | 4/2012 |
| WO | 2013059372 A3 | 4/2013 |
| WO | 2013052453 A3 | 5/2014 |
| WO | 2014074271 A1 | 5/2014 |
| WO | 2014210080 A1 | 12/2014 |
| WO | 2015172060 A1 | 11/2015 |
| WO | 2015183335 A8 | 12/2015 |
| WO | 2016014266 A1 | 1/2016 |
| WO | 2017079706 A1 | 5/2017 |
| WO | 2017160910 A1 | 9/2017 |
| WO | 2017160917 A3 | 12/2017 |
| WO | 2019125422 A1 | 6/2019 |
| WO | 2019168646 A1 | 9/2019 |
| ZA | 201500185 B | 12/2015 |

OTHER PUBLICATIONS

"Catherine Wheels, Fireworks, android/ios game" Oct. 24, 2015, YouTube, site visited May 27, 2020: https://www.youtube.com/watch?v=DzCYicyl FJA (Year: 2015) 1 page.

"Figures and Polygons" Sep. 15, 2008, Themathleague, site visited May 27, 2020: https://www.mathleague.com/index.php/connponent/content/article/31-nnathleaguewebsite/general/75-figuresandpolygons#octagon (Year: 2018) 2 pages.

"Gold Stacks 88 Lunar Festival Slot—Nice Session, All Features!" Feb. 14, 2019, YouTube, site visited May 27, 2020: https://www.youtube.conn/watch?v=kusOLt2fvM4 (Year: 2019) 1 page.

"Golden Firework Video Slot Casino Game with a "Mega Win" Free Spin Bonus" Apr. 16, 2018, YouTube, site visited May 27, 2020: https://www.youtube.conn/watch?v=YgCbY7c-nYM (Year: 2018) 1 page.

"Hot Shot Twin Fire Live Play with many features BALLY Slot Machine" Jan. 8, 2017, YouTube, site visited Jun. 16, 2020: https://www.youtube.com/watch?v=b_03gJvQecw (Year: 2017) 1 page.

"House of Fun," Sep. 2018 screenshot from web page: "https://www.houseoffun.com/play-now/," 1 page.

"iSoftBet—Scrolls of Ra HD" May 8, 2015, YouTube, site visited Jun. 16, 2020: https://www.youtube.conn/watch?v=9ZciLdlqQNo (Year: 2015) 1 page.

"Lucky Firecracker slot game [Wild Jackpots]" Jan. 30, 2015, YouTube, site visited May 27, 2020: https://www.youtube.com/watch?v=Gzfe182Qtbc (Year: 2015) 1 page.

"New Game  Fortune Scroll  Slot Lover" Feb. 11, 2019, YouTube, site visited Jun. 16, 2020: https://www.youtube.conn/watch?v=cdCsvzzRHvs&list=LLMFvEIKJd5VZ1hOwZ7BZDdQ&index=2873 (Year: 2019) 1 page.

"Paper Scroll Clip Art" Dec. 11, 2017, FavPNG, site visited Jun. 16, 2020: https://favpng.com/png_view/ paper-scroll-clip-art-png/DDpwDsEh (Year: 2017) 3 pages.

"Torah Scroll Icon" Jun. 25, 2018, Depositphotos, site visited Jun. 16, 2020: https://depositphotos.com/201375256/ stock-illustration-torah-scroll-icon-outline-style.html (Year: 2018) 1 page.

(56) References Cited

OTHER PUBLICATIONS

"Traditional Torah Icon" Feb. 6, 2018, Alamy, site visited Jun. 16, 2020: https://www.alamy.com/stock-photo-traditional-torah-icon-174149305.htnnl (Year: 2018) 1 page.

3 2 1 GO! Countdown Green Screen, by Da24Gemini, YouTube [online], published on Sep. 15, 2012, [retrieved on Aug. 13, 2020], retrieved from the Internet <URL: https://www.youtube.com/watch?v=WJhxCcx1 M4g> (Year: 2012) 1 page.

Candy Words—Match Word Puzzle Game, by Homer S, YouTube [online], published on Mar. 5, 2019, [retrieved on Aug. 13, 2020], retrieved from the Internet <URL: https://www.youtube.com/watch?v=4TSGNDLrpWk> (Year: 2019) 1 page.

Countdown Timer Background 10 Seconds, by Kanadaka, YouTube [online], published on Dec. 16, 2013, [retrieved on Aug. 13, 2020], retrieved from the Internet <URL: https://www.youtube.com/watch?v=AwOYH3RDUe4> (Year: 2013) 1 page.

Legato, Frank, "Tourney Time", Global Gaming Business Magazine, Mar. 22, 2019, retrieved from internet on Oct. 7, 2019, https://ggbmagazine.com/article/tourney-time/, 20 pages.

Notice of Allowance dated Aug. 26, 2020 for U.S. Appl. No. 16/290,836 (pp. 1-8).

Notice of Allowance dated Jan. 7, 2021 for U.S. Appl. No. 29/703,046 (pp. 1-9).

Notice of Allowance dated Jun. 17, 2020 for U.S. Appl. No. 29/682,178 (pp. 1-10).

Notice of Allowance dated Oct. 7, 2020 for U.S. Appl. No. 29/682,179 (pp. 1-7).

Office Action dated Aug. 18, 2020 for U.S. Appl. No. 29/703,046 (pp. 1-12).

Office Action dated Jul. 20, 2020 for U.S. Appl. No. 16/290,833 (pp. 1-9).

Office Action dated Jun. 23, 2020 for U.S. Appl. No. 29/682,179 (pp. 1-11).

Office Action dated May 14, 2020 for U.S. Appl. No. 16/290,836 (pp. 1-5).

Office Action dated Nov. 12, 2020 for U.S. Appl. No. 16/290,833 (pp. 1-8).

Office Action dated Jan. 27, 2021 for U.S. Appl. No. 16/290,838 (pp. 1-9).

International Search Report and Written Opinion for App. No. PCT/US 19/53398, dated Jan. 6, 2020, 9 pages.

International Search Report and Written Opinion for App. No. PCT/US 19/53407, dated Jan. 9, 2020, 8 pages.

Notice of Allowance dated Mar. 15, 2021 for U.S. Appl. No. 16/290,833 (pp. 1-8).

International Preliminary Report on Patentability for App. No. PCT/US2019/053407, dated Apr. 15, 2021, 8 pages.

Office Action dated May 11, 2021 for U.S. Appl. No. 16/946,113 (pp. 1-14).

Notice of Allowance dated May 19, 2021 for U.S. Appl. No. 29/703,046 (pp. 1-8).

Supplemental Notice of Allowability dated Jun. 7, 2021 for U.S. Appl. No. 16/290,833 (pp. 1-2).

Office Action (Final Rejection) dated Aug. 5, 2021 for U.S. Appl. No. 16/290,838 (pp. 1-7).

Corrected Notice of Allowability dated Aug. 18, 2021 for U.S. Appl. No. 29/703,046 (pp. 1-4).

Office Action (Notice of Allowance and Fees Due (PTOL-85)) dated Oct. 21, 2021 for U.S. Appl. No. 16/946,113 (pp. 1-5).

Office Action (Notice of Allowance and Fees Due (PTOL-85)) dated Nov. 9, 2021 for U.S. Appl. No. 16/290,838 (pp. 1-7).

IP.com NPL Search Strategy (Year: 2021).

Office Action (Non-Final Rejection) dated Dec. 27, 2021 for U.S. Appl. No. 17/058,548 (pp. 1-32).

"Gold Stacks 88 Lunar Festival Slot—Nice Session, All Features!" Feb. 14, 2019, YouTube, site visited May 27, 2020: https://www.youtube.conn/watch?v=kusOLt2fvM4 (Year: 2019).

"Figures and Polygons" Sep. 15, 2008, Themathleague, site visited May 27, 2020: https://www.mathleague.com/index.php/connponent/content/article/31-nnathleaguewebsite/general/75-figuresandpolygons#octagon (Year: 2018).

"Catherine Wheels, Fireworks, android/ios game" Oct. 24, 2015, YouTube, site visited May 27, 2020: https://www.youtube.com/watch?v=DzCYicyl FJA (Year: 2015).

"Golden Firework Video Slot Casino Game with a "Mega Win" Free Spin Bonus" Apr. 16, 2018, YouTube, site visited May 27, 2020: https://www.youtube.conn/watch?v=YgCbY7c-nYM (Year: 2018).

"Lucky Firecracker slot game [Wild Jackpots]" Jan. 30, 2015, YouTube, site visited May 27, 2020: https://www.youtube.com/watch?v=Gzfe182Qtbc (Year: 2015).

"ISoftBet—Scrolls of Ra HD" May 8, 2015, YouTube, site visited Jun. 16, 2020: https://www.youtube.conn/watch?v=9ZciLdlqQNo Year: 2015).

"New Game  Fortune Scroll  Slot Lover" Feb. 11, 2019, YouTube, site visited Jun. 16, 2020: https://www.youtube.com/watch?v=cdCsvzzRHvs&list=LLMFvEIKJd5VZ1hOwZ7BZDdQ&index=2873 (Year: 2019).

"Hot Shot Twin Fire Live Play with many features BALLY Slot Machine" Jan. 8, 2017, YouTube, site visited Jun. 16, 2020: https://www.youtube.com/watch?v=b_03gJvQecw (Year: 2017).

"Traditional Torah Icon" Feb. 6, 2018, Alamy, site visited Jun. 16, 2020: https://www.alamy.com/ stock-photo-traditional-torah-icon-174149305.htnnl (Year: 2018).

"Paper Scroll Clip Art" Dec. 11, 2017, FavPNG, site visited Jun. 16, 2020: https://favpng.com/png_view/ paper-scroll-clip-art-png/DDpwDsEh (Year: 2017).

"Torah Scroll Icon" Jun. 25, 2018, Depositphotos, site visited Jun. 16, 2020: https://depositphotos.com/201375256/stock-illustration-torah-scroll-icon-outline-style.html (Year: 2018).

Office Action (Non-Final Rejection) dated Mar. 25, 2022 for U.S. Appl. No. 17/304,107 (pp. 1-7).

Office Action (Non-Final Rejection) dated Apr. 1, 2022 for U.S. Appl. No. 17/058,531 (pp. 1-15).

Office Action (Final Rejection) dated Apr. 12, 2022 for U.S. Appl. No. 17/058,548 (pp. 1-18).

Office Action (Non-Final Rejection) dated May 24, 2022 for U.S. Appl. No. 16/946,114 (pp. 1-8).

Office Action (Non-Final Rejection) dated Jun. 9, 2022 for U.S. Appl. No. 16/948,846 (pp. 1-7).

Office Action (Non-Final Rejection) dated Jun. 22, 2022 for U.S. Appl. No. 16/946,116 (pp. 1-16).

Office Action (Notice of Allowance and Fees Due (PTOL-85)) dated Jul. 27, 2022 for U.S. Appl. No. 16/948,846 (pp. 1-7).

Office Action (Final Rejection) dated Jul. 27, 2022 for U.S. Appl. No. 17/304,107 (pp. 1-8).

Office Action (Non-Final Rejection) dated Jul. 21, 2022 for U.S. Appl. No. 16/946,117 (pp. 1-6).

Office Action (Notice of Allowance and Fees Due (PTOL-85)) dated Aug. 8, 2022 for U.S. Appl. No. 17/058,548 (pp. 1-13).

* cited by examiner

TOURNAMENT GAMING FOR ELECTRONIC GAMING MACHINES AND OTHER COMPUTING DEVICES

RELATED APPLICATION(S)

The present application claims benefit of priority under 35 U.S.C. § 119(e) to U.S. Patent Application Nos. 62/913,682, titled "SYSTEMS AND TECHNIQUES FOR PROVIDING ANIMATED LEADERBOARDS," 62/913,684, titled "STICKY WILDS FEATURE FOR TOURNAMENT GAMING FOR ELECTRONIC GAMING MACHINES AND OTHER COMPUTING DEVICES," 62/913,685, titled "TOURNAMENT GAMING SYSTEM WITH ALL WINS MULTIPLIER MODE," 62/913,680, titled "TOURNAMENT GAMING FOR ELECTRONIC GAMING MACHINES AND OTHER COMPUTING DEVICES," all of which were filed on Oct. 10, 2019, and 62/955,881, filed Dec. 31, 2019, and titled "MULTIPLAYER GAME SERVER FOR WAGERING GAME TOURNAMENT ADMINISTRATION," all of which are hereby incorporated by reference herein in their entireties and for all purposes. This application is also related to U.S. patent application Ser. No. 16/946,117, titled "MULTIPLAYER GAME SERVER FOR WAGERING GAME TOURNAMENT ADMINISTRATION" and filed on Jun. 5, 2020, which is hereby incorporated by reference herein in its entirety.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

SUMMARY

While many implementations will be evident from the disclosure provided herein, at least the following specific implementations are considered to be within the scope of this disclosure; the implementations summarized below are not intended to exclude further implementations not listed below but otherwise disclosed via the Figures and the detailed description.

In some implementations, a system may be provided that includes a plurality of processors, a plurality of memory devices, and one or more display devices. The processors, the memory devices, and the one or more display devices may be communicatively connected, and the plurality of memory devices may collectively store computer-executable instructions for controlling the processors to, collectively: receive information identifying a first player associated with a first device having at least one display device of the one or more display devices, at least one memory device of the memory devices, and at least one processor of the processors; cause a tournament graphical user interface (GUI) to be displayed on the at least one display device of the first device, the tournament GUI including a plurality of controls configured to display one or more unlocked tournament games that are available for play by the first player within a gaming tournament and one or more locked tournament games that are each available for play within the gaming tournament by the first player once unlocked for the first player; determine when one or more first conditions are met; cause, responsive to determining that the one or more first conditions are met, a first locked tournament game of the one or more locked tournament games indicated by the tournament GUI displayed on the at least one display device of the first device to transition to being an unlocked tournament game available for play by the first player; receive a first player game selection input via the tournament GUI displayed on the at least one display device of the first device, the first player game selection input associated with one of the one or more unlocked tournament games displayed by the tournament GUI displayed on the at least one display device of the first device; cause a first unlocked tournament game of the one or more unlocked tournament games to be presented for play via the at least one display device of the first device responsive, at least in part, to receipt of a player input via the tournament GUI displayed on the at least one display device of the first device; and adjust a first tournament score associated with the first player responsive to game outcomes in the first unlocked tournament game resulting from plays of the first unlocked tournament game.

In some implementations, the plurality of memory devices may further collectively store computer-executable instructions for further controlling the processors to, collectively: cause a timer to be displayed as part of the tournament GUI, cause, prior to a start time of the gaming tournament, the timer to display a first countdown of time remaining until the gaming tournament starts, and cause, after the gaming tournament starts, the timer to display a second countdown of time remaining until the gaming tournament ends.

In some implementations, the plurality of memory devices may further collectively store computer-executable instructions for further controlling the processors to, collectively, cause a control to be displayed as part of the tournament GUI that indicates a number of plays in the gaming tournament that are available to the first player for use in playing one or more of the unlocked tournament games indicated by the graphical user interface.

In some implementations, the plurality of memory devices may further collectively store computer-executable instructions for further controlling the processors to, collectively, cause a control to be displayed as part of the tournament GUI that indicates a number of perks that are available to the first player for use in the gaming tournament, where each perk is a redeemable benefit in the gaming tournament.

In some implementations, the plurality of memory devices may further collectively store computer-executable instructions for further controlling the processors to, collectively, cause one or more controls of the tournament GUI to indicate, for each type of perk of a plurality of types of perks that are earnable for use in the gaming tournament, the type of perk and a quantity of that type of perk that are available to the first player for use in the gaming tournament.

In some implementations, the first device may be an electronic gaming machine.

In some other implementations, the first device may be a mobile phone or a tablet computer.

In some implementations, the plurality of memory devices may further collectively store computer-executable instructions for further controlling the processors to, collectively, obtain geolocation data indicating a location of the first device and determine that the one or more first conditions are met by determining that the location of the first device is at least within a predetermined geographical area associated with the first locked tournament game.

In some implementations, the plurality of memory devices may further collectively store computer-executable instructions for further controlling the processors to, collectively, determine that the one or more first conditions are met by determining that the location of the first device is at least within the predetermined geographical area associated with the first locked tournament game for a determined period of time.

In some implementations, the plurality of memory devices may further collectively store computer-executable instructions for further controlling the processors to, collectively, obtain geolocation data indicating a location of the first device and determine that the one or more first conditions are met by determining that the location of the first device is within a predetermined geographical area associated with the first locked tournament game.

In some implementations, the plurality of memory devices may further collectively store computer-executable instructions for further controlling the processors to, collectively, cause a game purchase GUI to be displayed on the at least one display device of the one of the one or more display devices, the game purchase GUI displaying a first purchase condition associated with the first locked tournament game and receive input indicating that the player has met the first purchase condition, where the one or more first conditions are met when the first purchase condition is met.

In some implementations, the plurality of memory devices may further collectively store computer-executable instructions for further controlling the processors to, collectively, determine when one or more second conditions are met and cause the first player to be awarded items relating to the gaming tournament responsive to the one or more second conditions being met. The one or more items may be one or more plays for the gaming tournament, one or more perks that are redeemable for a benefit in the gaming tournament, or combinations thereof.

In some implementations, the plurality of memory devices may further collectively store computer-executable instructions for further controlling the processors to, collectively, obtain geolocation data indicating a location of the first device and determine that the one or more second conditions are met by determining that the location of the first device is at least within a predetermined geographical area.

In some implementations, the predetermined geographical area may be associated with a particular casino.

In some implementations, the predetermined geographical area may at least partially overlap with territory subject to tribal sovereignty. In some such implementations, at least 90% of the predetermined geographical area may overlap with the territory subject to tribal sovereignty.

In some implementations, all of the predetermined geographical area may overlap with the territory subject to tribal sovereignty.

In some implementations, the plurality of memory devices may further collectively store computer-executable instructions for further controlling the processors to, collectively, obtain geolocation data indicating a location of the first device and cause the first unlocked tournament game of the one or more unlocked tournament games to be presented for play via the at least one display device of the first device responsive, at least in part, to the receipt of the player input via the tournament GUI displayed on the at least one display device of the first device contemporaneous with the geolocation data indicating that the location of the first device is within a predetermined geographical area.

In some implementations, the plurality of memory devices may further collectively store computer-executable instructions for further controlling the processors to, collectively, obtain geolocation data indicating a location of the first device, determine that the location of the first device is within a predetermined geographical area, and cause, responsive to determining that the location of the first device is within the predetermined geographical area, a notification to be provided via the first device that indicates that the first player is eligible to earn one or more items relating to the gaming tournament if the first player takes one or more actions at a particular location. The one or more items may be one or more plays for the gaming tournament, one or more perks that are redeemable for a benefit in the gaming tournament, or combinations thereof.

In some implementations, a system may be provided that includes one or more processors and one or more memory devices. The one or more processors and the one or more memory devices may be communicatively connected and the one or more memory devices may collectively store computer-executable instructions for controlling the one or more processors to, collectively, receive information identifying a first player associated with a first device (where the first player is a participant in an asynchronous gaming tournament); determine when one or more first conditions are met; cause, responsive to determining that the one or more first conditions are met, a signal to be sent to the first device that causes a first locked tournament game of one or more locked tournament games for the asynchronous gaming tournament to be transitioned to being a first unlocked tournament game available for play by the first player on the first device; receive a first player game selection input from the first device that is associated with the first unlocked tournament game; send a signal to the first device to cause the first unlocked tournament game of the one or more unlocked tournament games to be presented for play on the first device responsive, at least in part, to receipt of the first player game selection input from the first device; receive messages indicating game outcomes associated with the first player's play of the first unlocked tournament game; and adjust a first tournament score associated with the first player responsive to the game outcomes associated with the first player's play of the first unlocked tournament game.

These and other implementations are described in more detail below and with respect to the Figures; it will be understood that the above list of implementations is not to be considered an exclusive list and other implementations will also be evident from the discussion below.

DETAILED DESCRIPTION

As is discussed later herein, casinos or other wagering game providers may sometimes wish to engage in campaigns to drive patron interest and encourage patronage of particular casino properties or related entities, particularly by valued patrons. One such mechanism for encouraging such patron interest is for the casino or wagering game provider to provide wagering game tournaments in which each player in a set of players plays a wagering game or games with the goal of increasing a tournament score that is associated with that player. For example, a player that plays a wagering game in a tournament setting may win a jackpot outcome that results in a 100 "credit" win—the 100 "credits," however, are awarded in the form of tournament points and are not cashable in themselves, unlike would typically be the case with non-tournament wagering game play (in which case the 100 credits may be cashable for an equivalent monetary amount). Each time a tournament player plays a wagering game as part of such a tournament, the player's tournament score may be adjusted to reflect the additional score that that particular play of the wagering game produced, e.g., increased upward as a result. During such tournament play, the players compete against each other in one or more rounds for points or other score indicators that are ultimately used to determine a relative ranking between the participating players at the end of each round. The rankings of the players participating in each round of a particular tournament may then be used to determine first, second, third, etc., place finishers for that round of the tournament. Tournament awards may then be granted to players of particular ranks at the conclusion of one or more of the rounds.

The following discussion provides examples of various gaming systems that may be used to provide all or some of such tournament systems. The discussion relating to FIGS. 1-3 relates to gaming systems generally, although later Figures provide further insight as to more tournament-specific systems.

Figure 1:
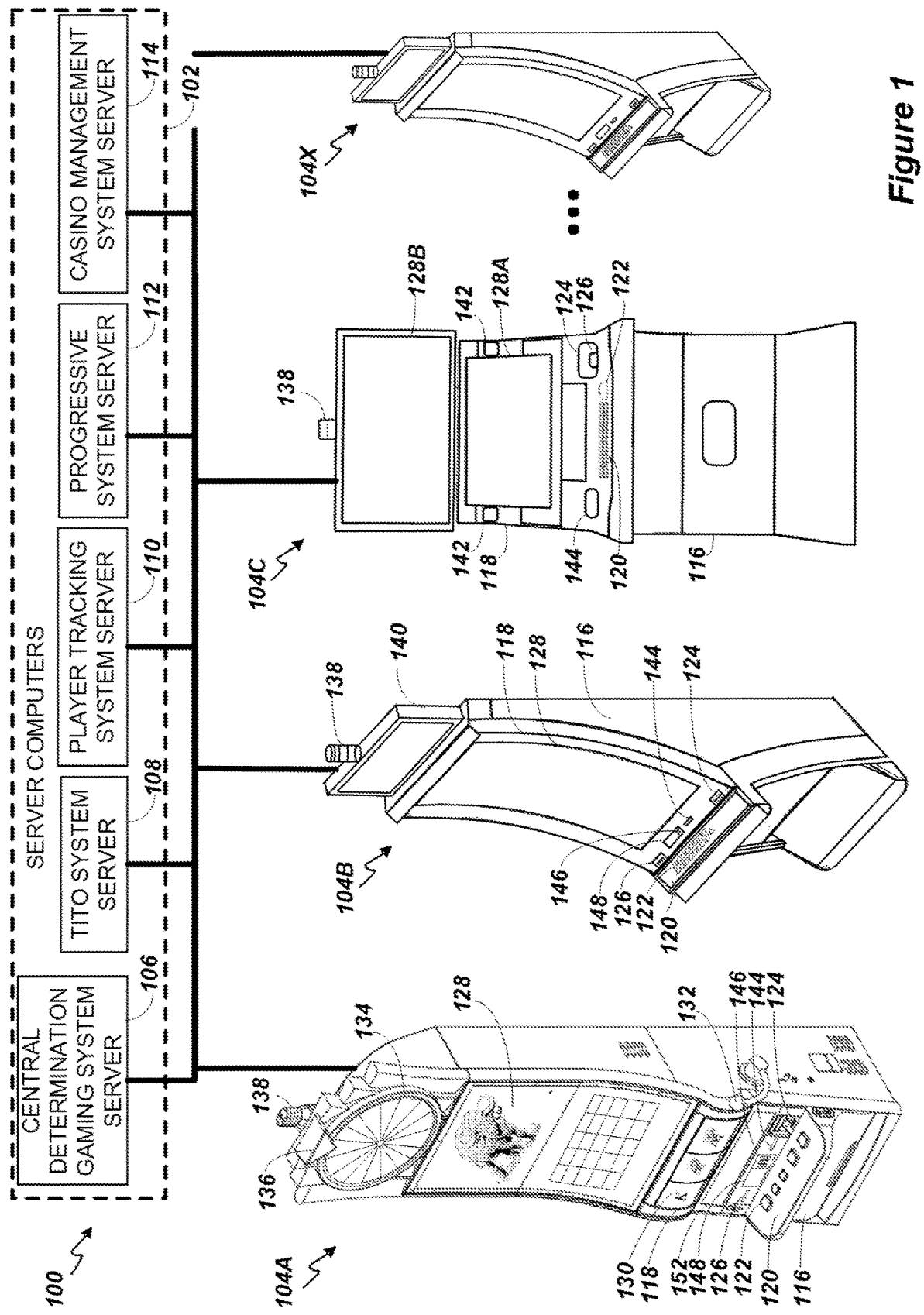
FIG. 1 is an exemplary diagram showing several EGMs networked with various gaming related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. The gaming machine 104A can have hardware meters for purposes including ensuring regulatory compliance and monitoring the player credit balance. In addition, there can be additional meters that record the total amount of money wagered on the gaming machine, total amount of money deposited, total amount of money withdrawn, total amount of winnings on gaming device 104A.

In some embodiments, a player tracking card reader 144, a transceiver for wireless communication with a mobile device (e.g., a player's smartphone), a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
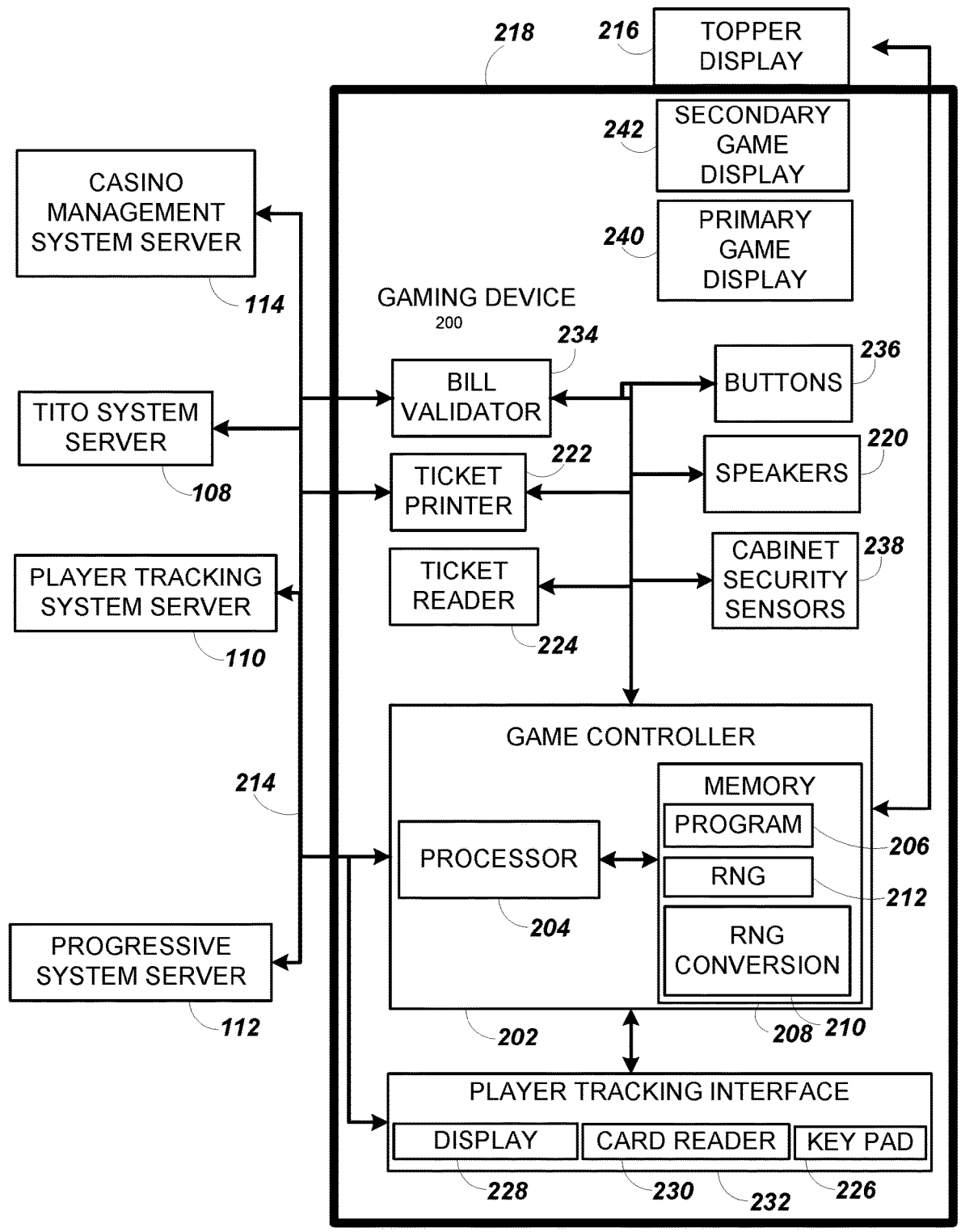
FIG. 2 is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator. In some embodiments, example gaming device 104C may also include speakers 142 to output various audio such as game sound, background music, etc.

Many different types of games, including mechanical slot games, video slot games, video poker, video blackjack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. As shown in FIG. 2, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2 illustrates that game controller 202 includes a single processor 204, game controller 202 is not limited to this representation and instead can include multiple processors 204 (e.g., two or more processors).

FIG. 2 illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2 illustrates that game controller 202 includes a single memory 208, game controller 208 could include multiple memories 208 for storing program instructions and/or data.

Memory 208 can store one or more game programs 206 that provide program instructions and/or data for carrying out various embodiments (e.g., game mechanics) described herein. Stated another way, game program 206 represents an executable program stored in any portion or component of memory 208. In one or more embodiments, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be setup to generate one or more game instances based on instructions and/or data that gaming device 200 exchange with one or more remote gaming devices, such as a central determination gaming system server 106 (not shown in FIG. 2 but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2 illustrates that gaming device 200 includes an RNG 212 that utilizes hardware and/or software to generate RNG outcomes that lack any pattern. The RNG operations are often specialized and non-generic in order to comply with regulatory and gaming requirements. For example, in a reel game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more embodiments, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2 illustrates that gaming device 200 includes an RNG conversion engine 210 that translates the RNG outcome from RNG 212 to a game outcome presented to a player. To meet a designated RTP, a game developer can setup the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2 also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch-screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Although FIGS. 1 and 2 illustrates specific embodiments of a gaming device (e.g., gaming devices 104A-104X and 200), the disclosure is not limited to those embodiments shown in FIGS. 1 and 2. For example, not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Additionally, or alternatively, gaming devices 104A-104X and 200 can include credit transceivers that wirelessly communicate (e.g., Bluetooth or other near-field communication technology) with one or more mobile devices to perform credit transactions. As an example, bill validator 234 could contain or be coupled to the credit transceiver that output credits from and/or load credits onto the gaming device 104A by communicating with a player's smartphone (e.g., a digital wallet interface). Gaming devices 104A-104X and 200 may also include other processors that are not separately shown. Using FIG. 2 as an example, gaming device 200 could include display controllers (not shown in FIG. 2) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 3:
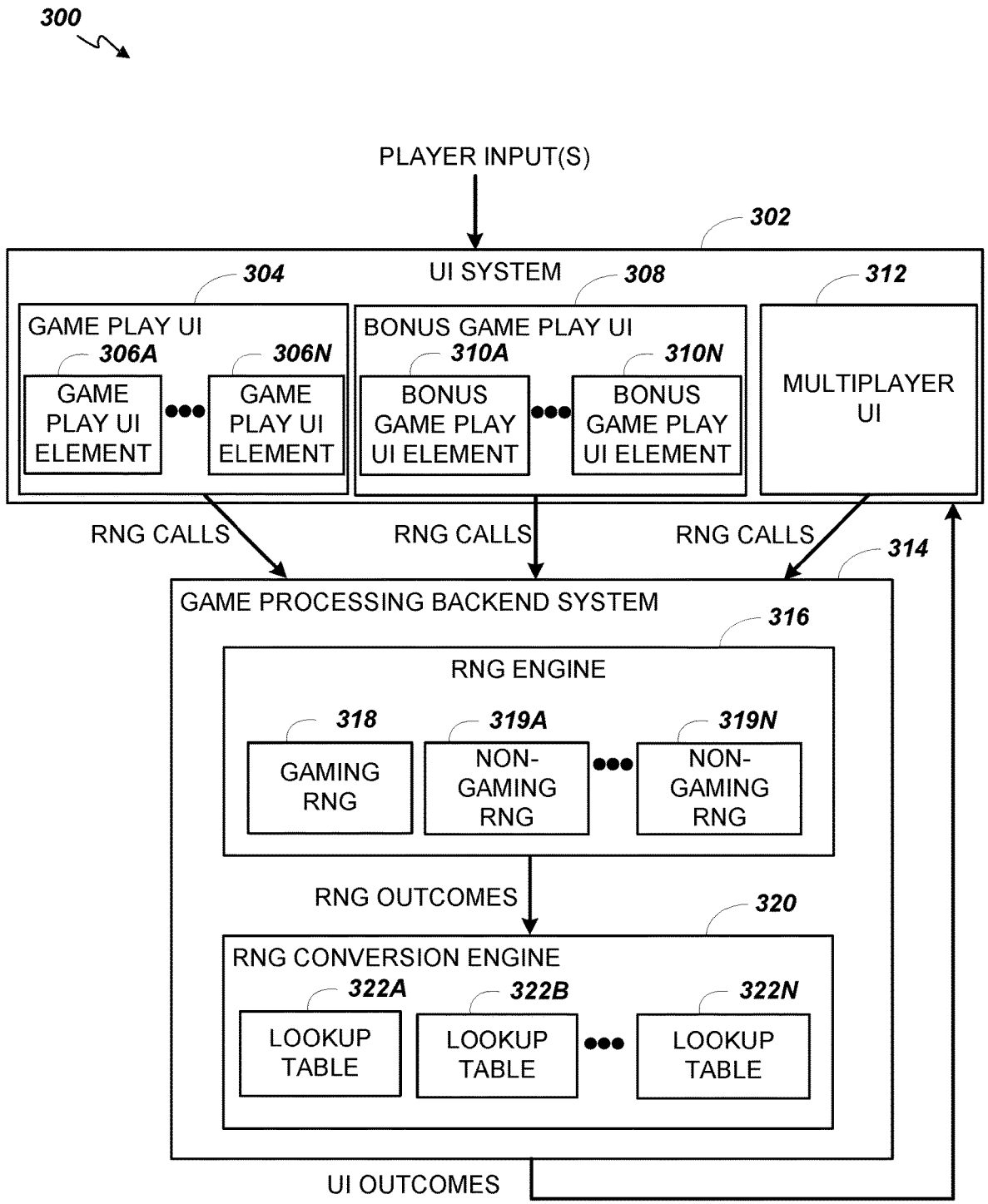
FIG. 3 illustrates, in block diagram form, an embodiment of a game processing architecture that implements a game processing pipeline for the play of a game in accordance with various embodiments described herein.

FIG. 3 illustrates, in block diagram form, an embodiment of a game processing architecture 300 that implements a game processing pipeline for the play of a game in accordance with various embodiments described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more embodiments, at least some of the game play UI element 306A-306N are similar to the bonus game play UI elements 310A-310N. In other embodiments, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or present game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 corresponds to RNG 212 shown in FIG. 2. As previously discussed with reference to FIG. 2, gaming RNG 318 often performs specialized and non-generic operations that comply with regulatory and/or game requirements. For example, because of regulation requirements, gaming RNG 318 could be a cryptographic random or pseudorandom number generator (PRNG) (e.g., Fortuna PRNG) that securely produces random numbers for one or more game features. To generate random numbers, gaming RNG 318 could collect random data from various sources of entropy, such as from an operating system (OS). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for such purposes as generating random messages that appear on the gaming device.

The RNG conversion engine 320 processes each RNG outcome from RNG engine 316 and converts the RNG outcome to a UI outcome that is feedback to the UI system 302. With reference to FIG. 2, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

In some instances, casinos or other wagering game providers may wish to engage in campaigns to drive patron interest and encourage patronage of particular casino properties or related entities, particularly by valued patrons. One such mechanism for encouraging such patron interest is for the casino or wagering game provider to provide wagering game tournaments in which each player in a set of players, as discussed in U.S. patent application Ser. No. 16/946,117, generally plays a wagering game or games with the goal of increasing a tournament score that is associated with that player. For example, a player that plays a wagering game in a tournament setting may win a jackpot outcome that results in a 100 "credit" win—the 100 "credits," however, are awarded in the form of tournament points and are not cashable in themselves, unlike would typically be the case with non-tournament wagering game play (in which case the 100 credits may be cashable for an equivalent monetary amount). Each time a tournament player plays a wagering game as part of such a tournament, the player's tournament score may be adjusted to reflect the additional score that that particular play of the wagering game produced, e.g., increased upward as a result. During such tournament play, the players compete against each other in one or more rounds for points or other score indicators that are ultimately used to determine a relative ranking between the participating players at the end of each round. The rankings of the players participating in each round of a particular tournament may then be used to determine first, second, third, etc., place finishers for that round of the tournament. Tournament awards may then be granted to players of particular ranks at the conclusion of one or more of the rounds. In some instances, a tournament may have only one round, in which case the round and the tournament itself may be the same, e.g., reference to a player's score for the tournament is to be understood to also be equivalent to reference to the player's score for the round. In other instances, a tournament may have multiple rounds; in such tournaments, the players' relative rankings at the end of each round may be used in any of a number of ways. For example, in some tournaments, several rounds may initially be conducted with different groups of players so that the players in each group are ranked within their respective groups; a subset of the highest-ranked players from each earlier round may then be eligible to play in a subsequent round of the tournament, with the remaining lower-ranked players from the earlier round being eliminated from the tournament (although in some implementations, an eliminated player may still be given the opportunity to re-join the tournament by playing in a later tournament round that they would otherwise not have been eligible for). A round for multi-round tournaments may be configured such that each player's score is reset before the start of that round (so that all players playing within that round start on an even footing) or such that each player's score at the end of the immediately preceding round that they participated in is carried forward into the next round (so that a player that had a particularly high-scoring round may start at an advantage in a subsequent round). In some multi-round tournaments, there may or may not be prizes or awards allocated to the top-ranked players of one or more rounds other than eligibility to continue playing in a subsequent round of the tournament—although the top-ranked players of the last round of the tournament, of course, will generally be awarded prizes or awards. In other multi-round tournaments, however, prizes or awards may be given to players based on their rankings at the conclusion of one or more other rounds than the last round of the tournament.

In some implementations, some tournaments may include prizes or awards that are funded, at least in part, through tournament participant non-tournament game play. For example, for the duration of the tournament, a percentage of each tournament player's coin-in on one or more EGMs, e.g., EGMs belonging to the casino that is hosting the tournament, may be diverted to fund the prize pool for the tournament.

The tournaments discussed in U.S. patent application Ser. No. 16/946,117 include time-limited tournaments in which players in a given tournament session (similar in concept to the tournament round discussed above) all play against each other concurrently and continuously for a generally limited period of time, e.g., two minutes; such tournaments may also be referred to as synchronous tournaments herein. However, other types of tournaments, referred to as asynchronous tournaments herein, may be structured in a different manner. In asynchronous tournaments, the duration of each tournament round is typically orders of magnitude larger than in synchronous tournaments, e.g., one or more hours, days, weeks, or months, and players participating in a given tournament round may generally elect to play according to their own schedules and independently of when other players participating in that tournament round play.

Another difference between synchronous and asynchronous tournament play is that in synchronous tournament play, the player participants are generally not limited in any way with regard to the number of opportunities they have to increase their score within the tournament round through play of the wagering game(s) that are used to generate the scores that determine the player rankings for a given tournament round. For example, it is common in synchronous tournaments for players to engage in as many plays as possible within the limited window of time, e.g., a few minutes, that is allocated for a synchronous tournament round, resulting in a highly volatile, frenzied competition between players.

In contrast, in asynchronous play, the player participants are typically limited with respect to the number of opportunities that the players have to increase their score within a given tournament round. For example, when a player is invited to participate in an asynchronous tournament round, the player may receive a base number of "entries," "spins," or "plays" (the three terms, in the context of tournament game play, are used equivalently herein), i.e., opportunities to potentially increase their tournament score during the tournament round. For example, each such opportunity may equate to a single "play" of a wagering game that is associated with the tournament. Thus, if a player is allocated 100 spins in conjunction with their entry into an asynchronous tournament round, this means that the player will have 100 chances to increase their tournament score within that tournament round—they can choose, however, when to use those opportunities within the timespan allocated for that tournament round.

Asynchronous tournaments, however, may also be configured to provide mechanisms to allow players to increase the number of tournament entries, spins, or plays that they have available. For example, in some implementations, players may be awarded additional entries in a tournament round for meeting certain criteria, e.g., for each time that the player plays non-tournament wagering games a certain number of times, for reaching particular milestones such as achieving a certain amount of total coin-in, achieving a winning outcome of a particular amount or more, visiting a casino property, etc. The players may thus compete between each other on two levels—directly within the tournament round based on their tournament score and outside of the tournament round in terms of maximizing their opportunities to play in the tournament round (and thus allowing them further opportunities to increase their tournament score).

In some asynchronous tournaments, players may also be given the opportunity to earn "perks" outside of tournament game plate which may be player-redeemable to receive a benefit within a tournament round. Such benefits may be one-time benefits, e.g., adding a predetermined or random amount, e.g., a base amount plus a randomized amount between a predetermined upper and lower bound, to the player's tournament score or applying a predetermined multiplier factor, e.g., 5×, 10×, 25×, 50×, or 100×, to the player's next point award resulting from a tournament game outcome, or durational benefits, e.g., applying a multiplier to the points awarded as the result of the next X plays of the player within the tournament (where X is some positive non-zero integer) or to the points awarded as the result of the player's plays in the tournament during a particular time window (such as the next five minutes after redemption of the perk). Another potential durational benefit associated with a perk may, for example, allow the player that redeems such a perk to engage in as many plays as they can (subject to the speed with which plays can physically be completed) within a given time period, e.g., 1 minute, 2 minutes, etc., after redemption of the perk. Such perks may allow for strategic play, as players may hold them in reserve until particular moments during play, e.g., near the end of the tournament round, or when the player feels they have a heightened chance of achieving winning outcomes that award greater amounts of points.

Asynchronous tournaments may also be particularly well-suited for implementation in a mobile context, e.g., participants in an asynchronous tournament may engage in tournament play via, for example, an application installed on a personal smartphone, tablet, or other device that the participant controls and/or owns (as opposed to an EGM that is owned/controlled by a casino). As a result, the devices which players may use to participate in asynchronous tournament play may often be "mobile" as opposed to "fixed." As discussed later below, this aspect of asynchronous tournaments may serve as the basis for various additional technical features associated with asynchronous tournament systems.

Asynchronous tournaments may be provided using specially configured computing systems that may, in aggregate, be configured to act as a tournament management system that allows tournament operators to configure such tournaments, manage invitations to potential participants for such tournaments, and then manage the actual execution of such tournaments, including, for example, potential award and prize allocation resulting from such tournament play.

Figure 4:
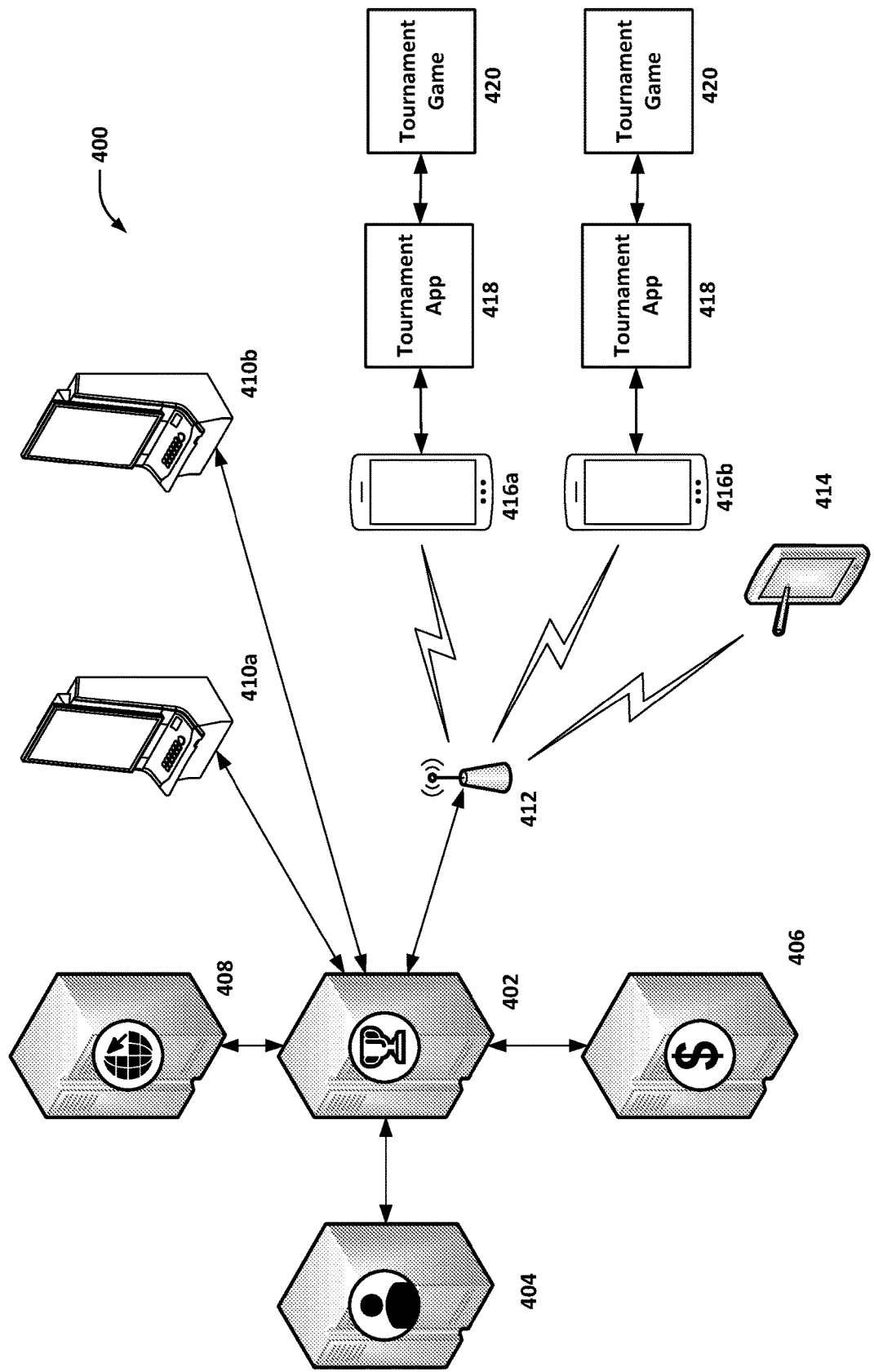
FIG. 4 depicts a diagram of one example of a computing system that may be used to provide for asynchronous tournament play.

FIG. 4 depicts a diagram of one example of a computing system that may be used to provide for asynchronous tournament play; it will be understood that there are many alternative configurations of computing systems that may be configured to provide the tournament-related functionality discussed herein, and this disclosure is not limited to only the specific examples discussed herein.

In FIG. 4, an asynchronous tournament management system 400 is depicted. The asynchronous tournament system may, for example, include a tournament backend server (or servers) 402 that may be communicatively connected with a player tracking server (or servers) 404, an award service server (or servers) 406, and a geolocation service or server (or servers) 408. The tournament backend server 402 may, for example, be configured to obtain and store settings relating to asynchronous tournaments, e.g., which players have been invited to participate in each tournament, which players have been selected to potentially participate in each tournament, what the scores are of each player in a particular tournament, how many plays each player has available to them within each tournament, which perks each player has available to them for use within each tournament, what rules govern the award of additional plays and/or perks for the players of each tournament, etc. The tournament backend server 402 may also be configured to manage tournaments that are actually in play, e.g., by sending communications to players regarding such tournaments, receiving messages from mobile devices and/or EGMs relating to each player's play of a tournament game and the outcomes that result therefrom, receiving messages from mobile devices and/or EGMs relating to a player's use of an available perk, adjusting the score of each tournament player based on tournament game outcomes and/or perk usage by that player. The tournament backend server may also be configured to determine tournament players' ranks relative to each other within a tournament and to determine final rankings/winners for a given tournament at the conclusion of the tournament.

The player tracking server 404 may, for example, be configured to track the gaming activity of players, e.g., across a casino property or multiple casino properties, as well as potential non-gaming activity of such players, e.g., at affiliated businesses. The player tracking server 404 may thus serve as a source of information regarding potential participants in an asynchronous tournament, including, for example, information regarding the players' gaming activity (which may be used, for example, to determine if such players are to be awarded plays and/or perks in an asynchronous tournament, as discussed later below), contact information for such players to allow for tournament invitations to be sent to such players, etc.

The award service server 406 may, for example, work in conjunction with the player tracking server 404 and the tournament backend server 402 to facilitate the award of prizes to specific tournament players at the conclusion of an asynchronous tournament.

The geolocation service or server 408 may provide geolocation data on tournament players that indicates where each such player is believed to be at any given moment in time, e.g., based on information obtained from a mobile device associated with that player. For example, a player's smartphone may include a GPS receiver that periodically obtains geolocation fixes and provides the geolocation coordinates to the geolocation service or server 408. The player's geolocation may also be determined using sensors external to the player's smartphone, e.g., the player's location may be triangulated based on the signal strength between the smartphone and multiple cellular or wireless transceiver stations (the locations of which are known) that may be within range of the smartphone. Regardless, the geolocation service or server 408 may track and manage geolocation data from a device associated with the player.

The tournament backend server 402 (and, for that matter, the other servers 404, 406 and 408) may communicate, either directly or indirectly, with various other devices used by tournament operators or players, e.g., EGMs 410_a_ and 410_b_, via a suitable communications link, e.g., a wired network connection. The tournament backend server 402 may also communicate, either directly or indirectly, with mobile devices 416_a_ and 416_b_ using one or more wireless access points 412. Thus, regardless of how a player chooses to interface with the tournament system, the tournament backend server may be able to receive information regarding tournament play from each participating player and to then manage that play in accordance with the tournament configuration settings.

For example, on an EGM such as EGM 410_a_, the EGM may provide information back to the tournament backend server 402 that relates to tournament game play on the EGM. On a mobile device 416, the tournament may be accessible through a specialized application, e.g., a tournament app 418, that may be installed on the mobile device by the player. The tournament app may present one or more GUIs that may facilitate the player's participation in the tournament and may serve as a portal for launching a tournament game application 420 to allow the player to actually play a tournament game.

The tournament backend server 402 may also be configured to communicate with a mobile device (or other computing device) 414 that is used by a tournament operator, e.g., a user that may have login credentials authorizing them to access and set the configuration settings for a given asynchronous tournament. The mobile device 414 may have, for example, an application installed that facilitates communication between the mobile device 414 and the tournament backend server 402 in order to allow settings for tournaments managed by the tournament backend server 402 to be modified or set via a GUI provided on the mobile device 414 by the application.

Other such computing systems may be similar to those discussed earlier with respect to FIG. 1, such as being provided by one or more server computers 102. The various devices and systems that provide for asynchronous tournament play may be used to execute an asynchronous tournament management system which may, as one of its elements, include a configuration system that allows tournament operators to configure and deploy a particular tournament event. Such a tournament configuration system may be designed to, for example, facilitate one or more of the following tasks.

Tournament Scheduling: The tournament configuration system may be configured to present a graphical user interface that includes controls that allow for schedule-related information for a tournament to be input or selected by the tournament operator. For example, the graphical user interface may include fields that allow for the input or selection of a tournament start date/time and tournament duration or a tournament start date/time and a tournament end date/time. In some implementations, asynchronous tournaments may have one or more "earn" periods that occur before the tournament end date/time. Such earn periods may occur before and/or during the associated tournament. During an "earn" period for a tournament, players that are enrolled in that tournament may be able to earn perks and/or additional plays, entries, or spins that may be able to be used in the future, e.g., when the tournament is actually under way, or, if the tournament is already under way, when the player is actively engaged in playing in the tournament.

In some instances, there may be multiple such earn periods that may be sequentially scheduled or may be scheduled in overlapping fashion. For example, a first earn period for an asynchronous tournament may be scheduled to span the seven days immediately prior to the day that the tournament is scheduled to begin, and a second earn period for that tournament scheduled to span the three days immediately prior to the day that the tournament is scheduled to begin. During the first earn period, players enrolled in that tournament may be eligible to earn, for example, additional plays, spins, or entries in the tournament once the tournament begins, and during the second ear period, players enrolled in that tournament may be eligible to earn, for example, perks (such as those discussed above, for example) that may be redeemed in that tournament. Thus, for example, a player may, in the above example, be eligible to earn both extra spins, plays, or entries into the tournament and perks that may be redeemable during the tournament during the three days prior to the start date of the tournament.

It will be understood that in some implementations, a tournament may be configured such that a player may be eligible, at a minimum, to earn plays, spins, or entries into the tournament and/or perks that are redeemable in the tournament at any time within the tournament start date/time and end date/time (in other words, while the tournament is ongoing); in such a case, there may be an earn period that is defined to be coextensive with the tournament itself (such an earn period may not be explicitly defined but may be implicitly defined by the start data/time and end date/time for the tournament).

In some implementations, one or more earn periods may be specified that extend through some, but not all, of the tournament itself. For example, a tournament may have an associated earn period (or periods) that runs (or run) from the start of the tournament (or a point in time prior to the start of the tournament) up until some predetermined time from the end of the tournament, e.g., one or two hours prior to the end of the tournament. Terminating an earn period before the end of the tournament may cause tournament players to focus on tournament game play and using up whatever perks they may have earned as opposed to having their attention split between trying to earn additional plays, spins, or entries into the tournament or perks and engaging in tournament play.

Entry/Spin/Play Awards: The tournament configuration system may also include a GUI that allows for the input or selection of various parameters relating to how entries, spins, or plays (for ease of reference, the term "plays" is used herein to refer to any of spins, plays, entries, etc., that represent an opportunity for a tournament player to attempt to increase their tournament score through play of a game of chance within the framework of the tournament) within a particular tournament are distributed or awarded to players that are participating in that tournament. Such parameters may, for example, specify the number of plays that each player is provided with in association in association with their agreement to participate in the tournament. For example, each player that participates in a given tournament may initially be given 100 plays, each play representing an opportunity that the player has to raise their score in the tournament by engaging in play of a game of chance within the framework of the tournament. In some such instances, a player that receives a tournament invitation may be awarded a predetermined number of plays upon providing an indication of acceptance of the invitation. It is to be understood that a game of chance that is within the framework of the tournament is a game of chance that is configured to award points that contribute towards the player's tournament score responsive to the player achieving one or more winning outcomes as a result of a play of that game of chance.

In many asynchronous tournament configuration systems, parameters governing the award of further plays to players beyond any initially provided plays (if any) for a particular tournament may also be input or selected by the tournament operator. Such parameters may, for example, take the form of various rules or trigger conditions that may, if met during a relevant earn period, cause the asynchronous tournament system to award additional plays to a particular player or players for a given tournament. For example, such rules may include:

a) Awarding one or more additional plays to a player responsive to that player achieving one or more designated outcomes in a non-tournament wagering game, such as obtaining an outcome that contains a particular symbol, an outcome that is associated with a monetary award above a predetermined threshold amount, a bonus game outcome, an outcome that is associated with a monetary award below a predetermined threshold amount, a plurality of consecutive outcomes that are each associated with a monetary award amount above a predetermined threshold amount, a plurality of consecutive outcomes that are each associated with a monetary award amount below a predetermined threshold amount, etc.

b) Awarding one or more additional plays to a player responsive to that player having wagered a particular amount of currency in wagering game play on one or more EGMs meeting particular criteria (for example, EGMs that are all owned by the tournament operator or affiliates thereof, EGMs that are all in a particular casino property, EGMs that offer a specified wagering game or one of a set of specified wagering games, EGMs located in a particular location of a casino (or other) property, EGMs offering a particular type of wagering game play (slots v. video poker, for example), etc.).

c) Awarding one or more additional plays to a player responsive to that player having played more than a specified period of time on one or more EGMs meeting particular criteria (such as the criteria discussed above), e.g., a player having played more than 60 minutes, 90 minutes, 120 minutes, etc. on a single EGM, a player having played more than 60 minutes, 90 minutes, 120 minutes, etc. in total across multiple EGMs meeting particular criteria (such as the criteria discussed above), etc.

d) Awarding one or more additional plays to a player responsive to that player having achieved a specified player loyalty program point total, level, tier, or ranking.

e) Awarding one or more additional plays to a player responsive to that player having engaged in a monetary transaction with one of one or more specified entities, e.g., when a player spends at least a specified amount of money at one or more specified businesses, when a player rents a hotel room from a designated hotel or resort, when a play purchases a meal at a designated restaurant, etc.

f) Awarding one or more additional plays to a player responsive to that player crossing into a specified geographic area as determined based on geofencing information associated with that player.

g) Awarding one or more additional plays to a player responsive to that player staying within a geofenced area, as determined based on geofencing data associated with that player, for a predetermined period of time.

h) Awarding one or more additional plays to a player responsive to a random determination, e.g., one or more tournament players may be randomly selected within a given time period and each awarded either a pre-set amount of plays or a random or partially random amount of plays, one or more tournament players that have not otherwise earned additional plays during a predetermined period of time may be randomly selected for a "wildcard" award of additional plays, etc.

i) Awarding one or more additional plays to a player at a predetermined time or at a predetermined interval. For example, players may be awarded additional plays on a recurring basis, e.g., one or more additional plays each day, each week, every other day, or according to any other scheduled dates/times.

j) Awarding one or more additional plays to a player responsive to the player logging into a social gaming application or social gaming website (where the player may play wagering games for non-cashable credits). In some implementations, such rules may be coupled with a rule requiring that the player log into a social gaming application or social gaming website of the course of multiple days, e.g., the additional plays may be awarded to a player when they log into a social gaming application or social gaming website and had also logged into the social gaming application or social gaming website the day before as well. It will be understood that "logging into" as used in this example may also constitute simply launching a social gaming application that is preconfigured to access the player's social gaming account automatically as well as visiting a social gaming website in which the player is automatically authenticated, e.g., based on cookies or other data that authenticates the player without the need to explicitly log in each time.

Perk Awards: The tournament configuration system may also include a GUI that allows for the input or selection of various parameters relating to how perks for a particular tournament are distributed or awarded to players that are participating in that tournament.

In some implementations, such parameters may, for example, specify the number and type of perks that may be provided to each player in association with their agreement to participate in the tournament. In some instances, players may not receive any initial perks in connection with their agreement to participate in the tournament but may instead earn them through later actions.

In many asynchronous tournament configuration systems, parameters governing the award of further perks to players beyond any initially provided perks (if any) for a particular tournament may also be input or selected by the tournament operator. Such parameters may, for example, take the form of various rules or trigger conditions that may, if met during a relevant earn period, cause the asynchronous tournament system to award additional perks to a particular player or players for a given tournament. Such rules may include, for example, rules that are similar to those discussed above for awarding additional plays. Perks may also be caused to be awarded by the tournament management system to players as part of the tournament enrollment process, e.g., players in an asynchronous tournament may be provided with a predetermined number of perks at the start of the tournament or, for example, upon their acceptance of an invitation to participate in such a tournament.

Tournament Game Selection: In some implementations, tournament configuration system may also include a GUI that allows the tournament operator to select one or more different games of chance that may be playable within the tournament framework in order for tournament players to increase their tournament scores. For example, some tournaments may feature only a single game of chance and all players in such a tournament would play the same game of chance, e.g., having the same game play, graphics and audio, same award frequency, same pay tables (or "point tables" in the context of tournament game play), etc. Other tournaments, however, may allow players to potentially select between multiple different games of chance to play within the framework of the tournament in order to earn tournament points. In some such tournaments, the different games of chance may offer effectively identical core game play experiences, although the presentation of that game play experience may differ dramatically between such games of chance. For example, three different slot-based games may be provided for potential player selection during a particular tournament—each such slot-based game may have identical odds of winning each potential award, bonuses, receiving particular multipliers, or receiving or triggering other score enhancement mechanisms, and so forth. However, the multimedia presentation of such slot-based games may be quite different, e.g., one such slot-based game may have symbols, graphics, and audio that have a Western theme, the second such slot-based game may have symbols, graphics, and audio that have an Asian mythology theme, and the third such slot-based game may have symbols, graphics, and audio that have an ancient Egyptian theme. In effect, such games may be identical except for the assets that are used to present the audiovisual effects that serve to present the game experience to the player, e.g., such assets may include different image files, audio files, animation files or settings, etc. Thus, players may choose between a variety of different visual styles for the games of chance that they play in the tournament framework, but the particular game that each player chooses will have no impact on the player's eventual tournament score.

In other implementations in which players may select between multiple games of chance, however, two or more such selectable games of chance may also offer different core game play experiences, i.e., the player's odds of achieving a particular outcome may vary depending on which game they select to play for a particular tournament play. For example, one selectable game may utilize a pay table (or score table) that offers larger award amounts but at a lower frequency of occurrence; another selectable game, in contrast, may utilize a pay table (or score table) that offers smaller award amounts but with a higher frequency of occurrence. By providing two or more selectable games for potential play within the tournament framework for a give tournament, players may be able to select a particular game that has a style of game play that they find appealing, which may make participating in a particular tournament a more desirable prospect to some players.

In some implementations, the tournament game selection GUI of the tournament configuration system may include controls that allow the tournament operator to cause one or more of multiple games that are designated as selectable for play in a given tournament to be treated as "locked" games for each player until particular conditions are met. For example, if four games are designated as selectable for play in a given tournament, three of those four games may further be designated as having a "locked" status for the players. A "locked" game would not be selectable by a tournament player for play in the tournament framework until that game have been designated as "unlocked" for that player by the tournament management system.

The tournament configuration system may, for example, provide one or more GUI controls that allow the tournament operator to specify one or more rules or conditions that may control how and when "locked" games are made available to a particular player or group of players. For example, such rules may include:

a) Unlocking a locked game for all tournament players at a designated time, e.g., one day into the tournament, two days into the tournament, etc.

b) Unlocking a locked game for all tournament players after any player in the tournament achieves a tournament score that exceeds a predetermined threshold amount, e.g., 1000 points, 5000 points, etc.

c) Unlocking a locked game for all tournament players after a set players in the tournament exceed a predetermined total tournament score (determined by summing all tournament scores for that tournament achieved by all of the players in that set of players); the set of players may be all players in the tournament or a proper subset of players in the tournament, e.g., the top 10 highest-ranked players according to their tournament scores.

d) Unlocking a locked game for a specific tournament player after the player satisfies a particular condition, e.g., such as one or more conditions similar to those discussed earlier with respect to earning of plays and/or perks.

e) Unlocking a locked game for a specific tournament player after the player satisfies a particular condition such as engaging in a financial transaction to purchase unlock of the locked game. For example, selection of a locked tournament game by a player may cause a game purchase GUI to be presented to the player, e.g., on their smartphone. If the player then proceeds to meet the requirements for purchase, e.g., by authorizing the purchase via the GUI, then the locked tournament game may be unlocked for that player.

f) Unlocking a locked game for a specific tournament player after geolocation data for the player indicates that the player entered a particular geofence, e.g., a geofence associated with a particular casino property. For example, an asynchronous tournament may be organized for a group of affiliated casino properties that each have a different overall theme that corresponds with a theme of one of several "locked" games for that tournament. In such an implementation, rules may be established that cause each such "locked" game to unlock for a particular player when that player enters a geofence associated with the correspondingly themed casino property; players that wish to unlock all of the "locked" games would thus need to visit all of the casino properties (or, more technically, enter the geofences associated therewith) in order to do so, which may help drive business to those casino properties. In some such implementations, tournament games that are unlocked for a player when the player enters a particular geofence may be locked for that player again when the player leaves that geofence. For example, a particular tournament game may only be playable by a player on their mobile device when the player (or, more specifically, their mobile device) is within a geofence associated with a particular casino or geographical region and may otherwise be "locked" for play by that player.

Player Management: The tournament configuration system may also include a GUI that allows for the input or selection players that may be invited to participate in a given tournament, as well as a GUI that allows for such invitations to be conveyed to some or all such players. For example, such a GUI may include controls that allow for the tournament operator to select potential tournament players from a pool of players that are enrolled in a player loyalty or player tracking system or that are otherwise listed in a database that the tournament operator has access to. Such controls may include, for example, controls to allow the tournament operator to rapidly identify players within that pool that meet particular requirements, e.g., players that have a particular ranking or status within a player loyalty system, players that spend an average amount per unit time, e.g., more than a specified amount per week, month, year, etc., at a particular casino property or set of properties, players that meet a particular demographic, e.g., that live in a certain geographic area, that are within a specified age range, that have been enrolled in a player tracking system for more than a predetermined amount of time, etc.

The tournament configuration system GUI for player management may also allow the tournament operator to specify settings that govern how the tournament management system sends invitations to the players selected for potential participation in an asynchronous tournament. For example, the GUI may include controls that allow for input or selection of parameters that may allow the selected players to be grouped into different sub-groups and further controls that may then allow for settings or rules to be entered that cause the tournament management system to send out invitations to the players of each subgroup only under certain circumstances. For example, each selected player may be assigned to a first group, a second group, or a third group. In such an example implementation, settings may be entered to cause the tournament management system to cause invitations to be sent to players in the first group at a first time and to then cause invitations to be sent to the players in the second group only when certain conditions are met, e.g., when sufficient players in the first group have indicated that they are declining the invitation to participate in the tournament. Similarly, further settings may be entered to cause the tournament management system to cause invitations to be sent to players in the third group only when sufficient players in the second group have similarly declined to participate in the tournament. In some implementations, such settings may, in effect, treat each potential player as a group of 1 and cause the tournament management system to send out invitations to a number of the potential players that is equal to the total number of players desired for the tournament. As players respond by accepting or declining these invitations, the tournament management system may cause a further invitation to be sent out to one of the potential players that has not yet received an invitation for each instance in which a player that was invited to participate in the tournament declines the invitation.

The tournament configuration system GUI for player management may also allow the tournament operator to specify settings that may enable or disable, for example, various additional options relating to player management for a given tournament. For example, in some implementations the GUI may include controls that allow a tournament operator to select or specify settings that may enable or disable a "maybe" response for player invitations. For example, a player invitation may include a mechanism for the invited player to provide feedback to the tournament management system as to whether or not they accept the invitation; an example such mechanism may include hyperlinks that, when clicked, may cause the tournament management system to register the invited player's response as either "accept" or "decline." In some implementations, there may be a setting to enable the further inclusion of a "maybe" response option (in some implementations, this may simply be included by default in all invitations and there may not be an explicit setting for enabling or disabling such a feature).

The tournament management system, on receiving data indicating that a player has selected the "maybe" option may cause one or more further invitations or reminders to be sent to that player at later dates until the player either selects "accept" or "decline" (it will be understood that "accept," "decline," and "maybe" may also be referred to using other equivalent terms, e.g., "Yes," "No," "Tentative," as well).

Another option that some tournament management systems may make available in connection with player management is the ability to configure a tournament such that invited players are each allocated one or more associated invitations (which are referred to herein as "indirect invitations" to contrast with the invitations that are sent to players at the direction of the tournament operator, which may be referred to as "direct invitations") that they may cause to be sent to other people, e.g., a family member, friend, coworker, etc., of that player to cause the other individual or individuals to be invited to participate in the same tournament. Such settings may allow the tournament operator to specify whether such an option is to be enabled for a particular tournament and, if so, to specify the number of such indirect invitations that will be allocated to each player that is directly invited to participate in the tournament. In some implementations, a further option may be selectable via the GUI to only allow directly or indirectly invited players to participate in a given tournament if both the directly invited player accepts the direct invitation and also uses at least a predetermined number of the indirect invitations they have been allocated to indirectly invite further players that then accept those indirect invitations. For example, an "invite a friend" tournament may require each invited player to also invite a friend to play in the same tournament, and entry into such a tournament may only be granted to the original invitee and their friend if both accept their respective invitations.

The invitations and other communications between the tournament management system and tournament players (or tournament operators) may be facilitated through a number of different mechanisms, including, for example, via email, text message, push (or pull) notifications delivered to devices that have a software application installed that facilitates tournament game play in some manner or that may serve as, for example, a player loyalty program portal or interface, etc.

Once an asynchronous tournament has been configured using the tournament configuration system, the configuration settings may be provided to a tournament management engine of the tournament management system. The tournament management engine may, for example, configure itself according to a particular set of tournament settings so as to manage an asynchronous tournament according to those settings. For example, the tournament management engine may be programmed or configured to:

a) Cause communications to be sent to players participating in the tournament to alert them of when different events in the tournament occur, e.g., a communication that informs the players that an earn period of the tournament has begun or will begin at some indicated future time, that the tournament is about to begin, that the tournament is about to end, etc.

b) Monitor the number of plays that each player in the tournament has been awarded or granted and also the number of plays that each player in the tournament has used (or, in some cases, simply monitor the number of unused plays that each tournament player has).

c) Monitor the number and type of perks that each player in the tournament has been awarded or granted and the number and types of perks that each player has used in the tournament (or, in some cases, monitor the number and type of unused perks that each tournament player has).

d) Receive communications from one or more other devices, e.g., tournament player mobile devices, EGMs that tournament players may be using, geolocation/geofencing service providers or services that may provide geolocation and/or geofencing information relating to tournament players, player loyalty or tracking system information regarding tournament players, etc., containing data that may be used to identify when particular events occur or conditions are satisfied that may relate to the tournament in question. For example, the tournament management engine may receive information from an EGM that a tournament player is using for non-tournament play that may indicate that the player has achieved a particular game outcome that the tournament configuration settings for a particular tournament may identify as being a criteria that, if met, would result in the player obtaining such an outcome being awarded with a perk, one or more plays within the tournament framework, or the unlocking of a locked game within the tournament framework. In another example, the tournament management engine may receive information from a player loyalty or tracking system that indicates that a particular player has visited a particular casino property a predetermined number of times within a predetermined time window, e.g., five times within a week-long time period, which may, according to the tournament configuration settings for a particular tournament, result in that player being awarded a perk, one or more plays within the tournament framework, or the unlocking of a locked game within the tournament framework.

e) Cause communications to be sent to players in conjunction with any awards of plays or perks to particular players or groups of players. For example, if the tournament management engine determines that a player has earned one or more additional plays or a perk, the tournament management engine may, in conjunction with updating the data pertaining to the number of plays available or the types and numbers of perks available to the player (or responsive thereto), also send a notification to the player to notify them of the award.

f) Track the tournament scores of each player that participates within a given tournament, e.g., by receiving information indicating the number of tournament points that are awarded to each tournament player as a result of a tournament play within the tournament framework by that player. For example, when a tournament player plays a game of chance within the tournament framework, e.g., by using one of the unused plays that they have earned or been awarded with, the score resulting from that play may be reported to the tournament management engine by the device on which the game of chance is played (or by a device that may determine the outcome for that game of chance, e.g., a remote server that determines outcomes for games of chance played within the tournament framework).

Asynchronous tournaments may be configured to provide for tournament game play in a number of ways. For example, in some implementations, asynchronous tournament game play may be provided through EGMs that have been configured to be able to enter a tournament mode in which game play is conducted according to control via the tournament management system. For example, when in tournament mode, the EGM may a) present only a game (or games) that is enabled for play in the tournament per the tournament game settings relevant to the tournament in question, b) notify the tournament management system of plays of the game when in tournament mode, c) notify the tournament management system of outcomes of plays of the game when in tournament mode, d) only permit game plays during tournament mode if the player's available plays are sufficient to permit it, and e) permit the player to select one or more perks that are available to the player in the tournament and apply the effects of the selected perk(s) to the player's game play on the EGM.

For example, such EGMs may have a GUI that may be accessed via, for example, a player tracking system that is incorporated into the EGM. Such a GUI may, for example, be enabled when the player's player tracking information identifies the player as being a participant in an asynchronous tournament and may include controls that allow the player to switch the EGM between non-tournament and tournament modes. In the non-tournament mode, the EGM may be usable as it normally would be, e.g., for wagering game play, and in tournament mode, the EGM may be available for tournament play.

In some other or additional implementations, asynchronous tournament mode game play may be provided through a tournament application that may be installed on a smartphone, tablet, or other device belonging to, or used by, the tournament player. In such implementations, the tournament application may provide access to tournament games in much the same way as an EGM might when in tournament mode. The tournament application may communicate with the tournament management system in a manner similar to how an EGM that is configured for tournament mode play communicates with the tournament management system.

In some implementations, asynchronous tournaments may permit tournament game play on both EGMs that are enabled to operate in a tournament mode and on mobile devices, e.g., smartphones, that have such a tournament application installed. Tournament players may thus engage in tournament game play on either a smartphone or other mobile device or on a casino-based EGM, depending on their preferences.

In some implementations, tournament applications installed on mobile devices or EGMs that are configured to offer tournament mode play may be configured to provide a GUI to players that allows the player to obtain information regarding a tournament they are enrolled in as a participant. For example, such a GUI may include information such as graphical or textual content that identifies the tournament, a timer that may, depending on context, show the amount of time remaining until the start of the tournament or, if the tournament is already under way, the amount of time remaining in the tournament, and controls that allow the player to access information regarding how to play in the tournament, what the tournament rules are, and what the prizes are that will be awarded during the tournament and/or at the tournament's end. The GUI may also include controls that may display, for example, the total number of plays that the player has available for use during tournament game play, and information regarding the number of perks that the player may have available for use during tournament game play. In some implementations, the information regarding perks may be displayed simply as a numeric value indicating the total number of perks available to the player (regardless of type of perk) and in other implementations, the number of each type of perk may be displayed. In some instances, the former may be presented as part of the GUI but may lead to a secondary GUI that displays the latter when selected by the player.

For asynchronous tournaments that offer the ability for the player to select a game for tournament play from multiple potential available games, or that may do so once the player has unlocked such additional available games, the GUI may also include controls that depict the games that are available for play (or that may be unlocked for play) in the tournament. Such controls may, for example, be configured to display information on each game, including, in some cases, information on how to unlock the associated game for play if it is locked. Games that are locked may, for example, be presented using a different graphical style than games that are unlocked and available for play in the tournament, e.g., shown with greyed-out controls or with banners indicating "locked" or "unlock," to indicate to the player that they are not available for play but may be made available for play.

It will be understood that asynchronous tournament systems such as those described herein allow for tournament players to engage in tournament play in a variety of different ways depending on the individual desires of the player in question. For example, players may engage in tournament game play on either EGMs or on their personal mobile devices, which may allow tournament players to play both in casinos and in locations other than in casinos.

Figure 5:
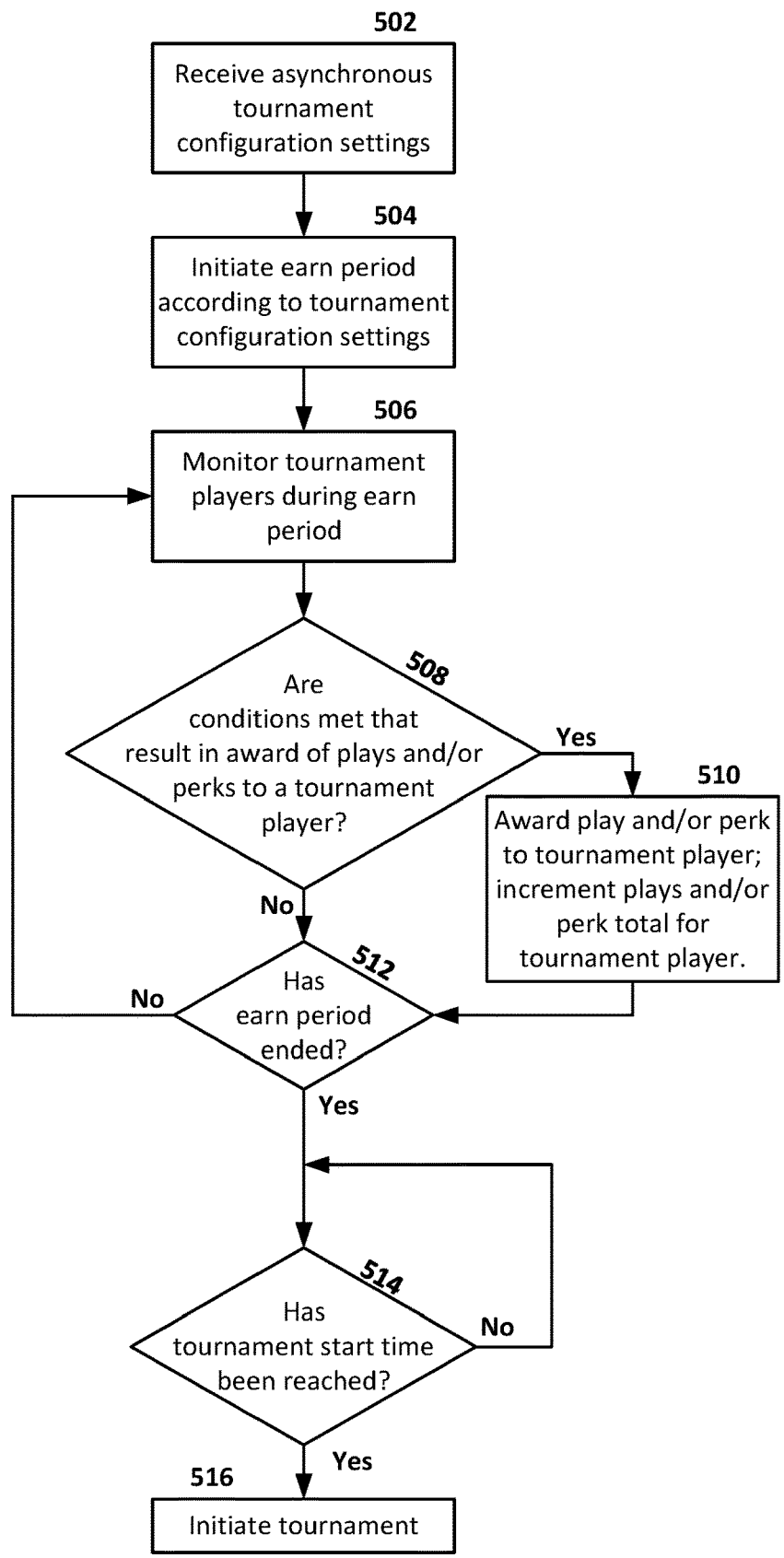
FIG. 5 depicts a flow chart of a technique for managing a pre-tournament earn period.
Figure 7:
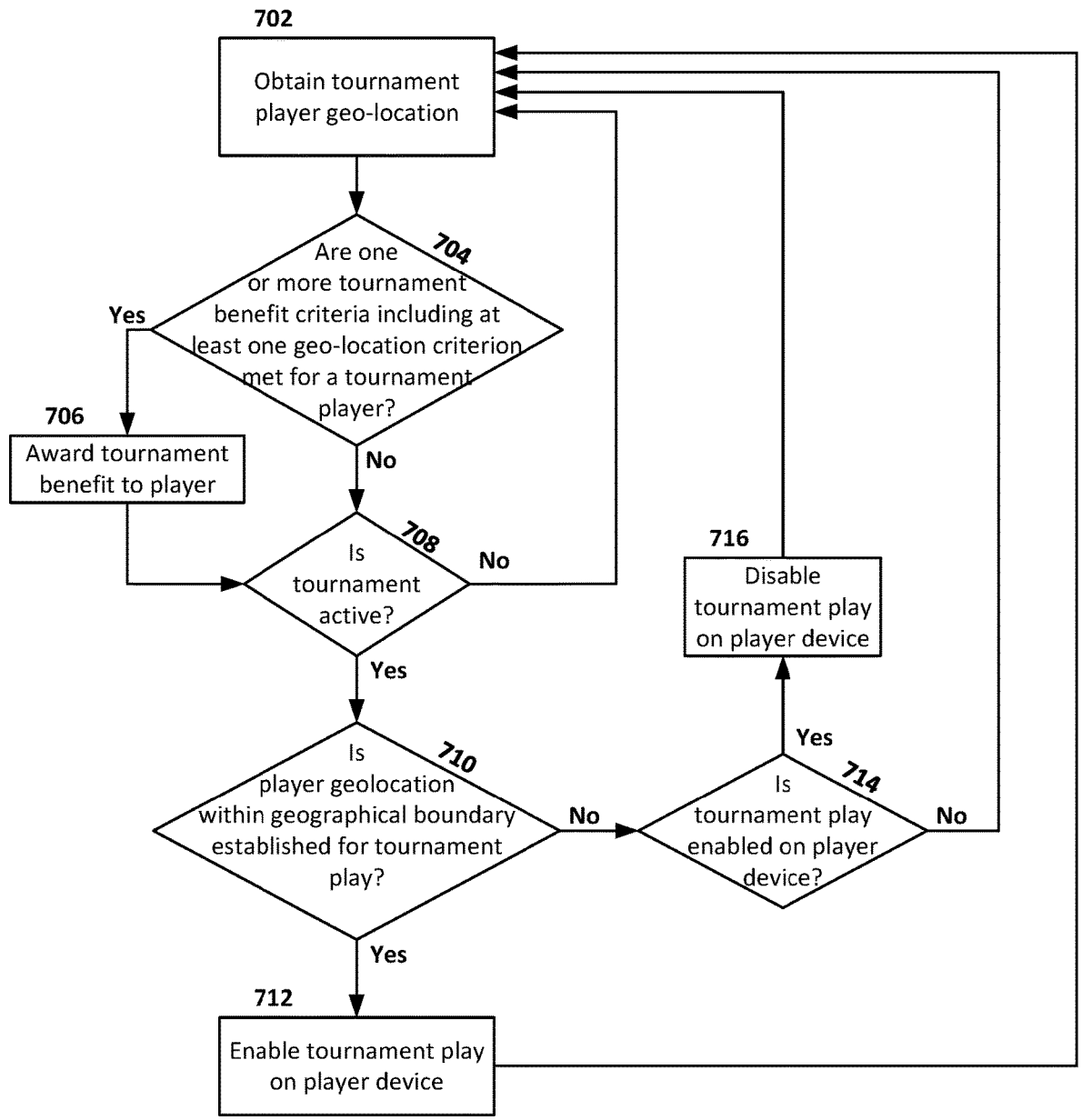
FIG. 7 depicts a diagram of a technique that may be used in parallel with the techniques of FIGS. 5 and 6 to incorporate geolocation information for the tournament players into the operation of the asynchronous tournament.

FIGS. 5 through 5-7, which are discussed below, provide a framework for several of the functionalities discussed above. For example, FIG. 5 depicts a flow chart of a technique for managing a pre-tournament earn period. In block 502, the tournament management system may receive tournament configuration settings for an asynchronous tournament. Such settings may define, for example, the start and end dates/times of the earn period, what tournament benefits able to be earned (plays and/or perks and/or game unlocks), and what conditions must be satisfied for a given player or players to earn such benefits.

Once such settings have been provided, the technique may proceed to block 504, in which the tournament management system may cause the earn period defined by the settings obtained in block 502 to be initiated at the earn period start time defined by the tournament settings obtained in block 502.

In block 506, the tournament management system may monitor players, e.g., via information obtained through sources such as player tracking systems, data collected from players' mobile devices, or other sources, in block 506 to determine in block 508 if any conditions have been met that would result in a particular player or players being awarded with a tournament benefit during the earn period according to the settings and conditions set forth in the tournament configuration. If it is determined in block 508 that one or more conditions have been met that would result in the award of one or more perks, tournament plays, and/or tournament game unlocks to a player (or players), the technique may proceed to block 510, where the tournament management system may cause data associated with the player (or players) to be updated to reflect the awarded benefit. For example, the tournament management system may update data associated with a particular player to indicate that the player has X additional plays and Y additional perks of a particular type as the result of a particular set of one or more conditions being met than the player had prior to such conditions being met.

After awarding such benefits to such a player or players in block 510 (or if it is determined in block 508 that no conditions were satisfied that would result in the award of such benefits), the technique may proceed to block 512, where a determination may be made as to whether or not the earn period should be ended. If it is determined in block 512 that the earn period should not be ended, then the technique may return to block 506 for further monitoring of tournament players. If it is determined in block 512 that the earn period should be ended, however, the technique may proceed to block 514, in which a determination may be made as to whether the tournament start time has been reached. If it is determined in block 514 that the tournament start time has not yet been reached, the technique may return to block 514 again (in some cases, after a short delay) and a further check may be performed. If it is determined in block 514 that the tournament start time has been reached, the technique may proceed to block 516, in which the tournament may be initiated.

It will be understood that the technique of FIG. 5 may be practiced with a variety of modifications. For example, multiple earn periods may be handled in parallel and/or sequentially by the tournament management system, as discussed earlier. Moreover, blocks 514 and 516 may be performed independently of the end of an earn period, e.g., the earn period for a tournament may start and/or end within the tournament itself.

Figure 6:
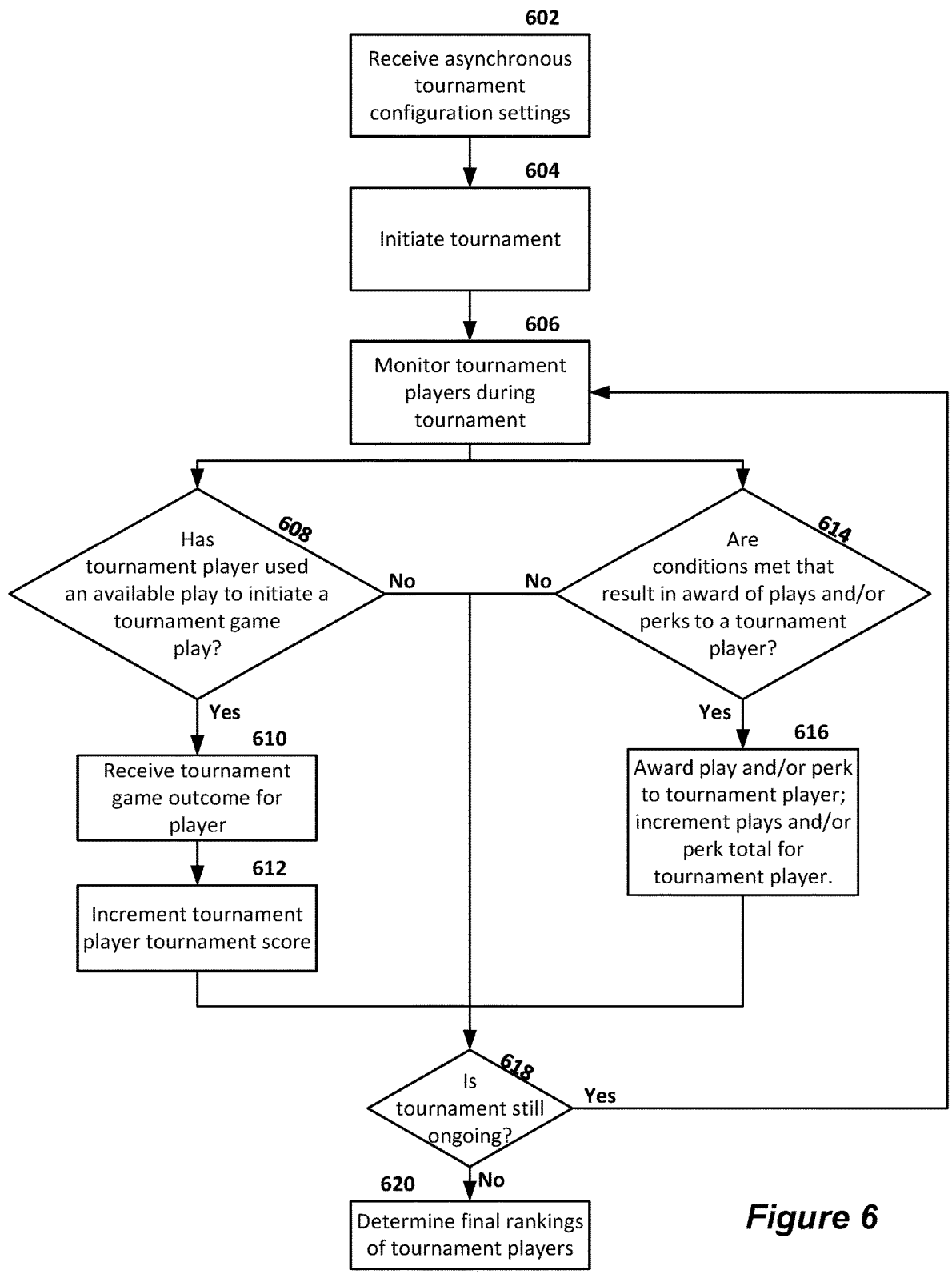
FIG. 6 depicts a technique for managing an asynchronous tournament.

While FIG. 5 depicts a technique for managing an earn period for an asynchronous tournament, FIG. 6 depicts a technique for managing an asynchronous tournament. In block 602, settings for the asynchronous tournament may be received or obtained, e.g., from predefined tournament settings provided by a tournament operator. In block 604, the tournament may be initiated at the designated date and time defined by the tournament settings. In conjunction with this, the tournament management system may cause notifications, e.g., push notifications sent to tournament players' cell phones, to be sent out to tournament players alerting them of the start of the tournament. Once the tournament has started, the technique may proceed to block 606, in which players in the tournament may be monitored for the duration of the tournament. For example, players may be monitored in block 606 for both tournament game play events, e.g., events that occur when such players are actively involved with playing a tournament game, and also non-tournament events, e.g., events that occur independently of tournament game play. The information that is collected in block 606 may then be used, for example, to determine when a particular player is actively engaged in active tournament play. For example, in block 608, a determination may be made as to whether a given player has used an available play to initiate a tournament game play. If not, then the technique may proceed to block 618. If it is determined in block 608 that the player has engaged in an actual tournament game play, then the technique may proceed to block 610, in which the tournament management system may receive information indicating an outcome for the tournament game play. Such information may include, for example, a particular game outcome and/or a point award that the player will receive within the tournament for that game outcome. If the latter, then the tournament management system may determine an corresponding point amount to award for the game outcome and transmit the point amount back to the device on which the player is playing. Regardless, the tournament player's tournament score may then, in block 612, be updated to reflect whatever score was obtained as a result of the game outcome for the tournament game.

The process by which a player initiates a tournament game play may, in some instances, actively involve the tournament management system. For example, when a player causes a tournament game play interface to be displayed, e.g., by selecting a tournament game for play on an EGM or on a mobile device, a GUI of the tournament game may be presented and various parameters relating to the player's tournament game play may be displayed. As part of the initialization of such a GUI, the device on which the GUI is to be shown may send a communication to the tournament management system identifying the player (and optionally the particular tournament that the player is attempting to play in), as well as potentially authentication information that identifies the device as one that the player has authorized to be used for play of the tournament game, e.g., player tracking information that identifies the player of the device as being a particular player associated with a particular player account that has been identified as being a participant in the tournament in question.

Once the device on which tournament play is sought to be played has authenticated itself to the tournament management system as being used by a particular tournament player, the tournament management system may then provide various parameters to the device that allows the device to configure itself for use by the player for the purposes of playing a tournament game. For example, the tournament management system may communicate to the device parameters that define the number of plays that the player has available for use within the tournament for the play of tournament games and/or the type and number of each type of perks that the player may have available for use within the tournament. The device may then allow the player to engage in tournament play and/or redeem perks within the tournament as desired as long as the player has sufficient plays and/or perks remaining. Each time the player plays a tournament game and/or uses a perk, the remaining balance of plays and/or perks for that player may be decremented accordingly. In some implementations, the tournament management server may simply hand off maintenance of the total numbers of plays and/or perks of each type available to the player to the device on which the player is playing and then obtain updated, decremented totals for multiple tournament plays and/or perk redemptions from that device in bulk at a particular time. In other implementations, the device may send a message to the tournament management system responsive to each such usage of a play and/or perk and the tournament management system may perform the requisite decrementing of the total number of plays and/or perks of each type as warranted by such usage and then provide updated parameters relating to the affected totals (or all of the totals) for that player to the device being used by the player; the device may then update the GUI to reflect the changes.

In some implementations, such as in the technique of FIG. 6, in addition to monitoring for tournament game play activity by tournament players, the technique may also, in parallel, monitor for conditions being met in block 614 that would earn one or more tournament players a benefit in the tournament, e.g., additional tournament plays, one or more perks, etc. If it is determined in block 614 that conditions are met that would result in an award of one or more plays and/or one or more perks and/or other tournament-related benefits, the technique may proceed to block 616, in which the tournament management system may award such a benefit or benefits to the tournament players for which the conditions have been met. It will be recognized that the operations of blocks 614 and 616 are, in effect, similar to the operations performed during an earn period, as discussed with respect to FIG. 5. In some implementations, an asynchronous tournament may be configured to not have such earn periods occur during the actual tournament or to have such an earn period not be coextensive with the entire tournament, in which case blocks 614 and 616 may be skipped for all or some of the tournament.

If it is determined in block 614 that the one or more criteria for awarding an in-tournament benefit have not been met, then the technique may proceed to block 618, in which a determination may be made as to whether the tournament is still ongoing. If the tournament is still ongoing, e.g., the tournament end date/time have not yet been reached, the technique may return to block 606 and further determinations may be made as to whether or not a tournament player is using a play in a tournament game and/or whether criteria have been met that would result in the award of a benefit within the tournament. If the tournament has completed, the technique may proceed to block 620, in which the tournament management system may determine the final rankings for the tournament players in the tournament and cause prizes to be awarded to the top-ranked tournament player or players.

FIG. 7 depicts a diagram of a technique that may be used in parallel with the techniques of FIGS. 5 and 6 to incorporate geolocation information for the tournament players into the operation of the asynchronous tournament. For example, in FIG. 7, the depicted technique may begin in block 702, in which geolocation data may be obtained for one or more tournament players of an asynchronous tournament. In block 704, a determination may be made as to whether one or more tournament benefit criteria—including at least one geo-location criterion—are met. For example, a determination may be made as to whether a particular tournament player is within a particular predetermined area, e.g. within a geofence surrounding a particular casino property, or whether a particular player is within a particular predetermined area and whether the player is using, for example, an application on a mobile device associated with the player to access tournament functionality. If the one or more tournament benefit criteria, including the at least one geo-location criterion, are met, then the technique may proceed to block 706, in which the tournament management system may cause a corresponding tournament benefit, e.g., one or more plays in the tournament, one or more perks usable in the tournament, etc., to be awarded to one or more tournament players.

In some implementations, the tournament management system may determine that while a player's geolocation data does not indicate that they are within a particular geofence that may be used as one or more criteria for determining whether the player is eligible to earn an in-tournament benefit, the player's geolocation data does indicate that they are within another geographical area or geofence that may cause the tournament management system to send the player a notification, e.g., alerting the player of an opportunity to either earn further in-tournament benefits or play in the tournament itself. For example, the player may be presented with a notification, e.g., via their smartphone, indicating that if they visit casino X which at the next freeway exit, they may be eligible to earn Y additional tournament plays or Z additional perks.

After the performance of block 706, or if it is determined in block 704 that the one or more tournament benefit criteria have not been met, the technique may proceed to block 708, in which a further determination may be made as to whether the tournament in question is active, i.e., underway. If it is determined in block 708 that the tournament is not active, then the technique may return to block 702 for the collection of further geolocation data for the tournament players. If it is determined in block 708 that the tournament is active, i.e., underway, the technique may proceed to block 710, in which a determination may be made as to whether the geolocation data for one or more tournament players indicates that the one or more tournament players are within a geographical boundary established for tournament play. For example, tournament play may be limited to a desired geographical area, e.g., a geographical area tied to one or more casino properties.

In some implementations, the geographical area that tournament play is limited to may be at least partially coextensive with, or entirely coextensive with, an area subject to a particular jurisdictional sovereignty. For example, in some implementations, the geographical area may be limited to the boundaries or borders of one or more states in which wagering game play is legal. In some further implementations, the geographical area may be limited to, or inclusive of, an area or areas that are subject to tribal jurisdiction or tribal sovereignty (subject to control of a native American tribe). For example, in some instances, tribal sovereignty may exist across a patchwork of different, noncontiguous regions, and the geographical area may be configured to overlap with such regions, either in part or in its entirety. In some such implementations, at least 90% of the geographical area (and in some cases, all of the geographical area) may overlap with the regions in which tribal sovereignty exists. This may, for example, help encourage tournament players to spend increased amounts of time within the areas of tribal sovereignty as opposed to other areas that are not under tribal sovereignty. This may result in increased revenues to businesses within areas of tribal sovereignty and may thus boost tribal revenues, e.g., via taxes, increased business value, and increased property values.

If the tournament management system determines that the geolocation data for the one or more players is within the geographical boundary established for tournament play, the technique may proceed to block 712, in which tournament game play on the player's device (the device that was the source of the geolocation data) may be enabled (or, if already enabled, kept enabled). For example, if the geolocation data is obtained from a player's smartphone, the tournament management system may cause an app on the smartphone to be switched between a tournament play mode and a non-tournament mode. In the tournament play mode, the app may allow the player to select and play tournament games to participate in the tournament. In the non-tournament mode, the app may, for example, show the player information regarding the tournament (number of plays remaining for the player, number and type of perks remaining for the player, time remaining before the tournament starts and/or ends, etc.) but not permit the player to actually play tournament games in the tournament. After enablement of tournament game play on the player's device in block 712, the technique may return to block 702, in which further geolocation data may be gathered. It will be understood that such transitioning between tournament play more and non-tournament mode based on geolocation may be controlled, for example, by the player's device, e.g., the player's device may track its own location and monitor whether that location crosses a geofence boundary set for enabling/disabling tournament play on the device and then enable or disable tournament play accordingly, or may be controlled via messages provided a remote element of the tournament management system, e.g., a server. For example, the server may obtain information from the player's device indicative of the geolocation of the player's device, or information from a geolocation service provider that provides information indicative of the player's device location, and determine that the player's device has crossed into, or out of, a geofenced area in which tournament play is to be active—the server may then send a message to the player's device instructing the device to enable (or disable, as appropriate) tournament play.

If it is determined in block 710 that the player's geolocation is not within the geographical boundary established for tournament play, the technique may proceed to block 714, in which a determination may be made as to whether tournament play is enabled on the player's device. If it is determined in block 714 that tournament play is enabled, the technique may proceed to block 716, in which the tournament management system may cause tournament play on the player's device to be disabled, e.g., by causing the tournament app on the player's device to enter non-tournament mode, before the technique returns to block 702 for further geolocation data collection. If it is not determined in block 714 that tournament play is enabled, the technique may simply return to block 702 for further geolocation data collection.

It will be apparent that the various types of conditions or criteria discussed in any of the techniques detailed above for the award of in-tournament benefits (extra plays, perks, and/or tournament game unlocks) to a player may be configured to be based on a variety of different types of information including, but not limited to, the player's location, game play history, purchase history, player loyalty program point total, player loyalty program tier or rank, specific game play, frequency with which the player visits a particular property or properties, amount spent on wagering games on one or more EGMs at a property or properties, etc.

Figure 8:
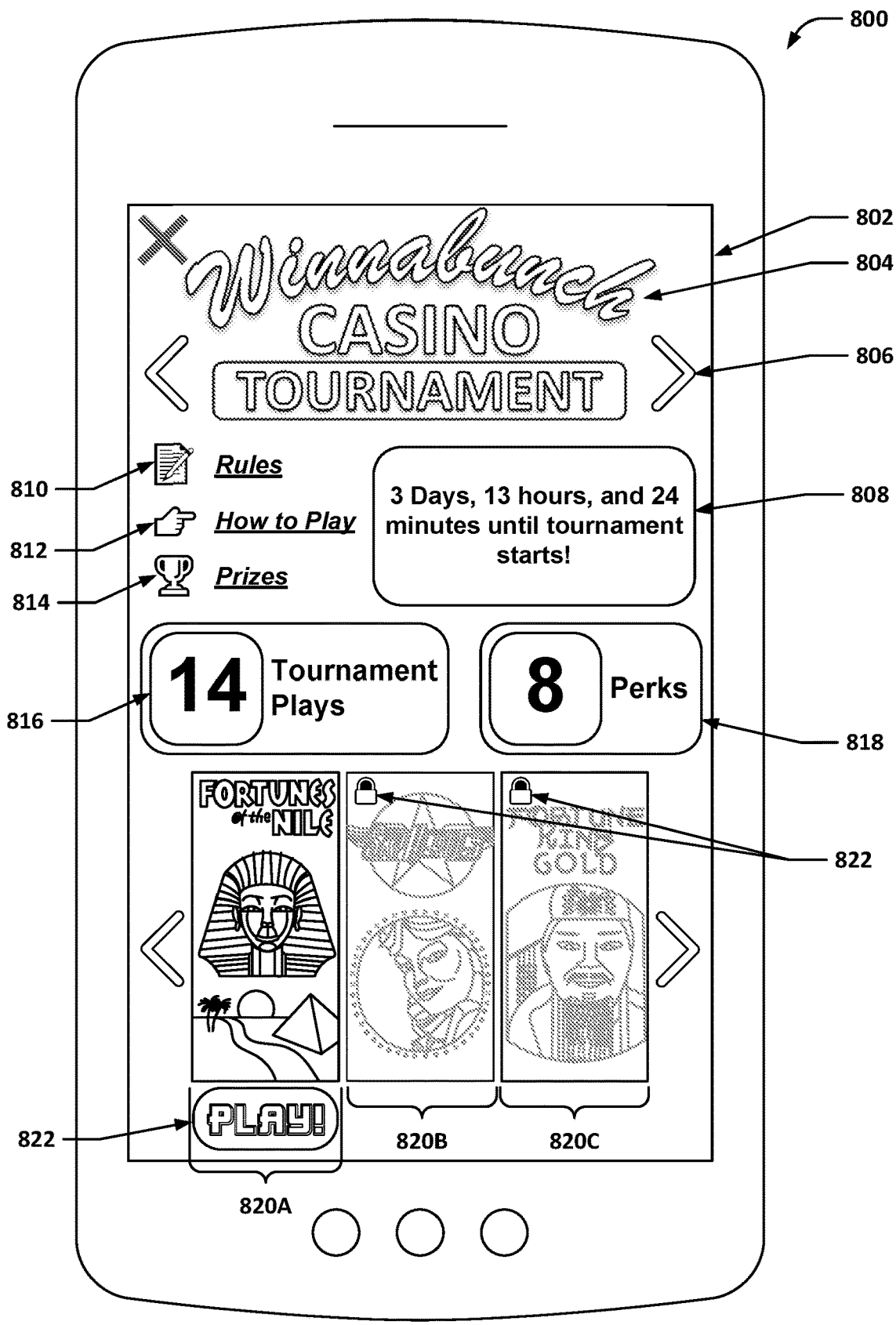
FIG. 8 depicts an example GUI for displaying tournament-related information.
Figure 9:
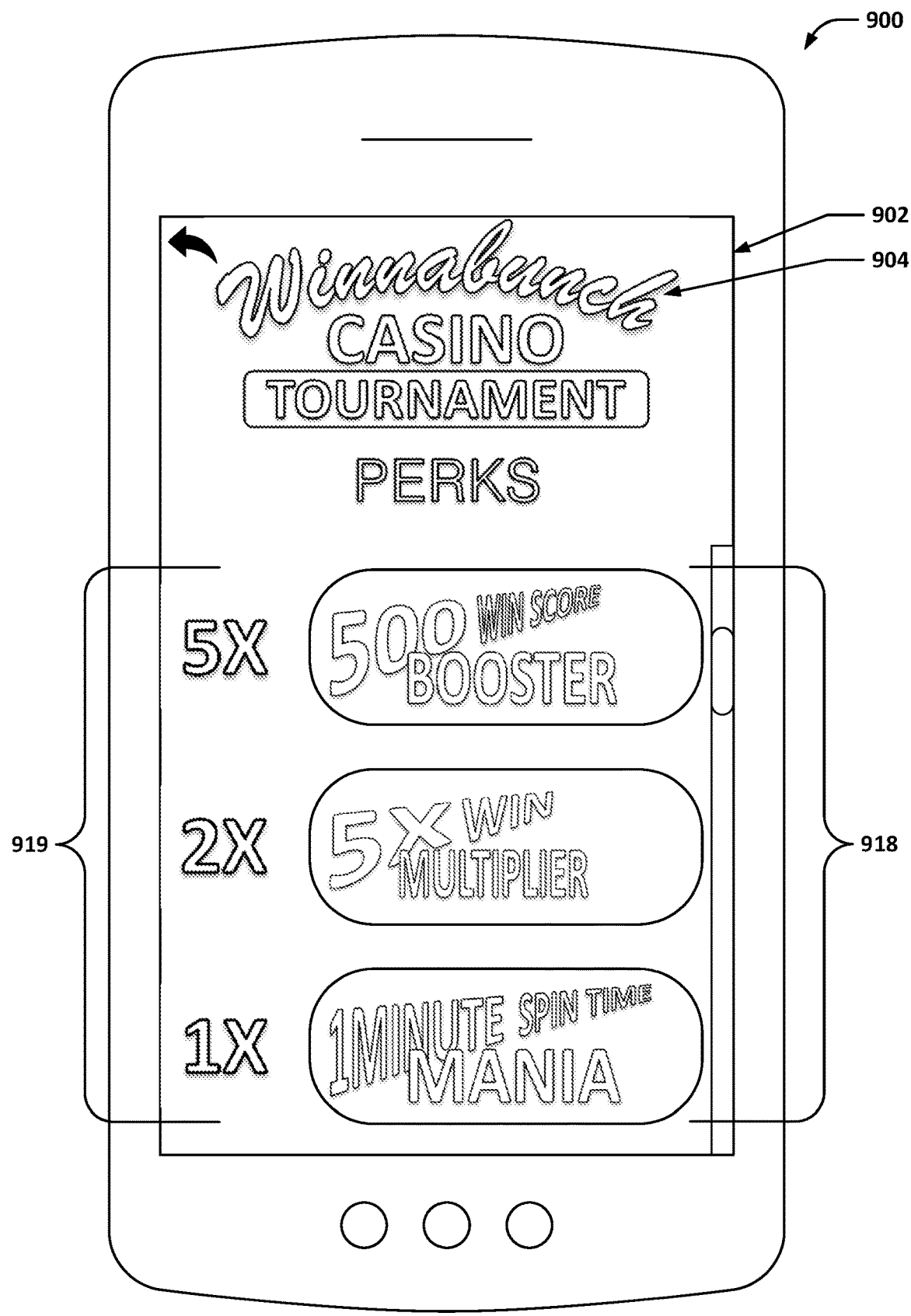
FIG. 9 depicts an example GUI for displaying perk-related information.
Figure 10:
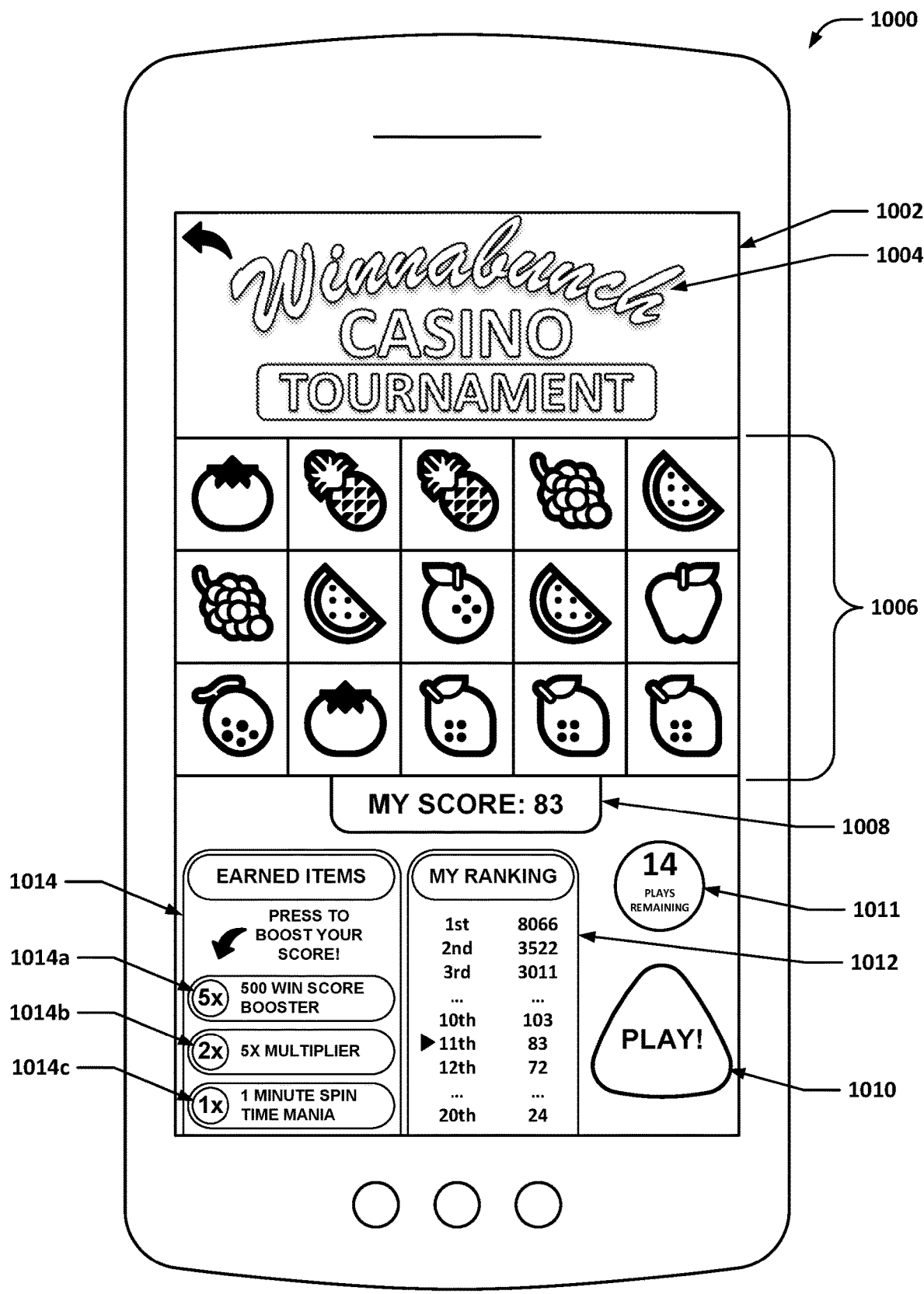
FIG. 10 depicts an example GUI for tournament game play.

FIGS. 8 through 10 depict various example GUIs that may be part of a tournament application that may be installable on a player's smartphone or other device. In FIG. 8, a GUI 802 is depicted on a smartphone 800 that includes tournament branding content 804, which may include content that identifies a specific tournament that a user associated with the smartphone, e.g., the smartphone owner, is enrolled in as a tournament player. In some implementations, left/right scroll button controls 806 (or up/down or forward/backward scroll button controls) may be provided to allow the user to cause the GUI to transition from displaying information for one tournament to information for another tournament. For example, if the player is enrolled in several different tournaments simultaneously, the GUI may be switched between different, but similar, screens to provide information on each such tournament.

Also shown in FIG. 8 is a countdown timer control 808, which may be configured to show the amount of time remaining before the start of the tournament identified by the tournament branding content 804. If the tournament has already started (or when it starts), the timer control 808 may be updated to instead depict the time remaining until the end of that tournament.

The GUI 802 may also optionally include controls for accessing information pages regarding the tournament identified by the tournament branding content 804, such as a rules control 810, a how-to-play control 812, and a prizes control 814. The rules control 810 may, if selected, bring up a portion of the GUI that lists and explains the rules for the tournament identified by the tournament branding content 804, e.g., the start/end time for the tournament, whether tournament play is constrained to a particular geographical area, etc. The how-to-play control 812 may, if selected, bring up another portion of the GUI that lists an explains how to play in the tournament, e.g., how to select a tournament game for play, how to redeem earned in-tournament benefits, etc. The prizes control 814 may, if selected, bring up a portion of the GUI that lists what the prizes are for the tournament in question, e.g., what awards will be provided to players that have specific overall tournament rankings at the conclusion of the tournament.

The GUI 802 may also include a plays control 816 that may indicate the number of plays in the tournament identified by the tournament branding content 804 for the player associated with the device used to display the GUI 802. For example, the plays control 816 in FIG. 8 indicates that the player for which the GUI 802 is being displayed has 14 tournament plays available, i.e., they may play a tournament game for the indicated tournament 14 times before needing to obtain additional plays to continue tournament game play. Thus, the player would have 14 opportunities to increase their tournament score through tournament game play. The plays control 816 may be configured to change the amount of plays shown depending on actions of the player—for example, if the player uses X plays in tournament game play, the amount of plays shown may be adjusted downward by X. If the player obtains Y additional plays, e.g., as a reward for meeting certain criteria during an earn period, the number of plays shown may be adjusted upward by Y.

The GUI 802 may also include a perks control 818 that may be used to display a total number of perks available for use in the tournament by the player for which the GUI 802 is being displayed. In this example, the player has 8 perks available. In some implementations, such as that depicted, the perks control 818 may simply show the total number of perks of any type that are available for use by the player in the tournament. In other implementations, however, the perks control 818 may show more detail regarding the perks that the player has available to them, e.g., the number of each type of perk or the number of each category of perk. For example, if the player has two 5× multiplier perks, a 10× multiplier perk, a 500 point score booster perk, and three 1000 point score booster perks, the perks control 818 may summarize these individually, e.g., as listed here, or may summarize them at an intermediate level, e.g., by category: "3 multiplier perks, 4 score booster perks."

In some implementations, the perks control 818 may, if selected cause another portion of the GUI that summarizes the perks available in more detail to be displayed, e.g., as shown in FIG. 9. In FIG. 9, a list of available perks 918 is shown in a GUI 902 (which may be part of the GUI 802) along with the quantity 919 of each perk that the player has earned. In some implementations, perks may also be displayed that the player can potentially earn but which the player currently has none of, i.e., where the quantity 919 is zero. In some implementations, the GUI 902 may show information to the player regarding the perks shown, such as how to earn further such perks. For example, selecting one of the perks 918 shown in the GUI 902 may cause a pop-up notification to be displayed that includes information that instructs the player how to potentially earn additional such perks, e.g., "visit casino X to potentially earn more!"

The GUI 802 may also include, in some cases, a plurality of tournament game controls 820, such as tournament game controls 820A, 820B, and 820C. The tournament game controls 820 may each represent a tournament game that may be playable within the tournament indicated by the tournament branding content 804. Some of the tournament game controls may be disabled or locked, e.g., as indicated by the padlock symbols 822 in FIG. 8 (but which may be indicated as disabled or locked in a variety of ways, e.g., through being greyed out, being made non-responsive to touch input, or having banner text across them that says "locked"). Such "locked" tournament games may be unavailable to a particular player until they have been unlocked by that player, e.g., such as discussed earlier herein. In some implementations, content may be displayed in association with the locked tournament games, either as part of the GUI 802 or responsive to a player input (such as touching one of the locked tournament game controls 820), that details how that particular tournament game may be unlocked by the player, e.g., "unlock this tournament game through the store" or "visit casino X to unlock this tournament game."

The GUI 802 may also include play button controls 822 that may be displayed for tournament games that are available for play by the player in the tournament. Selection of a play button control 822 may cause the associated tournament game to be launched for play by the tournament player that is using the device showing the GUI 802. In some implementations, similar functionality may be provided without explicit play button controls 822, e.g., selection of an unlocked tournament game control may cause that game to be launched for play by the player.

Once a tournament game is launched, a tournament game GUI may be displayed, such as is shown in FIG. 10. In FIG. 10, a tournament game GUI 1002 is shown on a device 1000, e.g., a smartphone. The tournament game GUI 1002 may include, as with the GUI 802, tournament branding content 1004 that identifies which tournament the tournament game is associated with. The tournament game GUI 1002 may also include a game play area 1006 which may be used to display game play content. In this example, the game play area 1006 displays symbols for a 5×3 slot game layout, but it will be understood that the game play area 1006 may display whatever game content is relevant to the particular tournament game being played, e.g., if the tournament game is video poker, then game content relating to video poker may be displayed.

The tournament game GUI 1002 may also include a tournament score control 1008 that may list the current player's tournament score (which may reflect the total of all past tournament plays (as modified, if applicable, by any previously redeemed perks)). The tournament score control 1008 may be incremented upward during tournament play to reflect increases in the player's tournament score.

The tournament game GUI 1002 may also include a play button control 1010 that may be selected by the player to cause a tournament game play to occur, e.g., to use one of the tournament plays 1011 available to the player to be used in an attempt to increase the player's tournament score, as shown in tournament score control 1008. The tournament plays remaining may be shown in the tournament plays control 1011, which may provide similar information to that provided by the plays control 816 discussed earlier with respect to the GUI 802.

The tournament game GUI 1002 may also optionally include a leaderboard control 812 that may show the player various leaderboard-related information, e.g., such as the top scores in the tournament, the player's score, the scores of players bracketing (or just ahead of) the player, the lowest-ranked score, etc. In this example, the player's score is indicated by the presence of a triangular icon next to their score, although other mechanisms for displaying the player's score may be used as well.

The tournament game GUI 1002 may also include a redeemable items control 1014 that may display controls that allow for the player to redeem various in-tournament benefits (perks) that they may have earned. For example, the redeemable items control 1014 includes a redeemable item control 1014*a* that displays the number of 500-point score booster perks that the player has available. In this case, there are five such 500-point score boosters available to the player; each time the player selects the redeemable item control 1014, the number of such score booster perks available will be decremented by one and the player's tournament score may be boosted by the indicated amount. For example, if the player using the tournament game GUI 1002 of FIG. 10 were to select the redeemable item control 1014*a* five times to apply all five score boosters they have available to them, their tournament score would increase from 83 to 2583.

The redeemable items control 1014 of FIG. 10 also includes a redeemable item control 1014*b*, which displays the number of 5× win multiplier perks that are available to the player. Selection of the redeemable item control 1014*b* may cause the points result of the next play initiated by the player using the play button control 1010 to be multiplied by five before being added to the player's tournament score.

The redeemable items control 1014 of FIG. 10 also includes a redeemable item control 1014*c*, which displays the number of 1 minute spin time mania perks that are available to the player for redemption. Selection of the redeemable item control 1014*c* may cause the tournament game to enter a mode where presses of the play button control 1010 during a particular window of time, e.g., 1 minute following redemption of a spin time mania perk, do not cause any decrement of the player's available plays for the tournament.

It will be appreciated that while the above examples have focused on the use of a smartphone app for the purposes of facilitating tournament play by tournament players, similar interfaces and functionality may also be provided on traditional EGMs, e.g., gaming machines that are installed on the floor of a casino or other property and not "mobile" as with a smartphone or tablet device. While the mobile implementation of the concepts above allows tournament players to play in the tournament at their convenience and in a variety of settings, tournament players, if on-site at a casino or other gaming property, may wish to access tournament game play via a traditional gaming machine (perhaps they wish to take advantage of a larger display, an enhanced audio-visual experience, or other amenities that may be provided in the casino setting). In some implementations, EGMs may be configured to offer similar GUIs to what may be available via smartphone tournament apps, such as what are described above. In some such implementations, such EGMs may provide controls to players that are enrolled in a tournament to allow the player to switch the EGM to a tournament mode, in which case a GUI similar to those discussed earlier may be provided.

Tournaments such as the tournaments discussed above, e.g., that provide players with asynchronous play, may be particularly effective tools for driving business to particular establishments, thereby increasing potential revenues at such establishments. By allowing for pre-tournament and in-tournament earning of additional tournament plays and/or perks through the satisfaction of various conditions, such tournaments may encourage tournament players to attempt to meet such conditions. Such players may thus, for example, be encouraged to spend money at particular establishments, visit particular locations, or otherwise perform various actions that the tournament operator wishes to encourage through judicious selection of various tournament configuration parameters, such as is discussed above.

It will be understood that reference herein to a GUI encompasses both single-screen and multi-screen GUIs, e.g., GUIs where the entirety of the GUI is visible on a single screen and GUIs where the GUI may only be partially visible on a single screen at once and may replace all or some of the graphics shown on such a screen at a particular time with completely different graphics at a later time. For example, a GUI may display a menu interface that displays a series of menu options, and may then, responsive to selection of one of the menu options, show a completely different menu interface; such menu displays may both be considered to be part of a common GUI even if displayed non-contemporaneously.

It will be understood that the tournament features discussed herein may, in some implementations, be provided by various devices that may act, for example, in concert. For example, a tournament management system may be provided using one or more servers that communicate with one or more EGMs and/or player mobile devices, each of which may include one or more processors and one or more memory devices that store computer-executable instructions for controlling various ones of the processors to perform certain specific tasks, for example, as discussed previously. In recognition of the potential flexibility in how such systems may be structured, the term "collectively," as used herein with reference to memory devices and/or processors or various other items should be understood to indicate that the referenced collection of items has the characteristics or provides the functionalities that are associated with that collection. For example, if a server and a client device collectively store instructions for causing A, B, and C to occur, this encompasses at least the following scenarios:
  a) The server stores instructions for causing A, B, and C to occur, but the client device stores no instructions that cause A, B, and C to occur.
  b) The client device stores instructions for causing A, B, and C to occur, but the server stores no instructions that cause A, B, and C to occur.
  c) The server stores instructions for causing a proper subset of A, B, and C to occur, e.g., A and B but not C, and the client device stores instructions that cause a different proper subset of A, B, and C to occur, e.g., C but not A and B, where instructions for causing each of A, B, and C to occur are respectively stored on either or both the client device and the server.
  d) The server stores instructions for causing a subset of A, B, and C to occur, e.g., A and B but not C, and the client device stores instructions that cause a different subset of A, B, and C to occur, e.g., B and C but not A, where instructions for causing each of A, B, and C to occur are respectively stored on either or both the client device and the server.
  e) The server stores instructions for causing A and a portion of B to occur, and the client device stores instructions that cause C and the remaining portion of B to occur.

In all of the above scenarios, between the server and the client device, there are, collectively, instructions that are stored for causing A, B, and C to occur, i.e., such instructions are stored on one or both devices and it will be recognized that using the term "collectively," e.g., the server and the client device, collectively, store instructions for causing A, B, and C to occur, encompasses all of the above scenarios as well as additional, similar scenarios.

Similarly, a collection of processors, e.g., a first set of one or more processors and a second set of one or more processors, may be caused, collectively, to, perform one or more actions, e.g., actions A, B, and C. As with the previous example, various permutations fall within the scope of such "collective" language:
  a) The first set of one or more processors may be caused to perform each of A, B, and C, and the second set of one or more processors may not perform any of A, B, or C.
  b) The second set of one or more processors may be caused to perform each of A, B, and C, and the first set of one or more processors may not perform any of A, B, or C.
  c) The first set of one or more processors may be caused to perform a proper subset of A, B, and C, and the second set of one or more processors may be caused to perform a different proper subset of A, B, and C to be performed such that between the two sets of processors, all of A, B, and C are caused to be performed.
  d) The first set of one or more processors may be caused to perform A and a portion of B, and the second set of one or more processors may be caused to perform C and the remainder of B.

It will be understood that the asynchronous tournament features discussed above may be provided using a variety of interfaces and mechanisms. For example, the various GUIs that may be presented to a tournament player may be provided via a tournament app that is installed on the tournament player's mobile device, e.g., smartphone, but the actual tournament management may be provided using, for example a tournament backend server, such as was discussed earlier with reference to FIG. 4. The tournament backend server may, for example, communicate with the tournament apps (or with EGMs that have similar tournament functionality) in order to receive information regarding player actions taken with respect to the tournament app and to send information or commands to the tournament app that may enable or disable particular features (such as tournament play mode), alert the player as to awards of spins and/or perks, lock or unlock tournament games for play, provide information shown in any of the controls of a GUI displayed by the tournament app, etc. Such messages may also include messages indicating that the player has engaged in tournament game play via the tournament app, as well as messages indicating outcomes produced through such tournament play. The backend tournament server may then use such outcome information to determine updates to the tournament player's score and may, in turn, send a message back to the tournament app used by that tournament player to cause the tournament app to reflect the updated tournament score for that tournament player (or updated tournament scores for other players, e.g., as may be shown in a leaderboard).

The tournament backend server may also receive messages from devices displaying other GUIs, e.g., configuration GUIs used by the tournament operator to configure the tournament and/or update the tournament's settings, that convey information regarding such tournament settings, which the tournament backend server may then store in memory and use when actively managing such a tournament. The tournament backend server may additionally receive messages from one or more devices, e.g., player tracking systems, that may relate to the various rules that may be used by the tournament backend server to determine when tournament plays and/or perks may be awarded to players. In short, it will be understood that the functionalities discussed herein may be provided using any combination or permutation of computing systems that may, as needed, send messages to one another to facilitate providing such functionalities.

It will be further appreciated that while the above discussion has focused on asynchronous tournaments, the concepts discussed above may also be applicable to synchronous tournaments, e.g., the concept of earning perks in an earn period that may be redeemed during later tournament play may also be implemented during synchronous tournaments.

It will also be appreciated that asynchronous tournaments may be configured in a large variety of different ways, including some team- or group-based tournament scenarios. Discussed below are a number of additional team- or group-based tournament scenarios; it will be appreciated that a gaming system, e.g., one or more multiplayer or tournament management servers that may be communicatively connected with a plurality of EGMs and/or mobile devices, may be configured to provide functionality that supports such scenarios.

Team- or Group-Based Tournament Scenarios

Group tournament: In group tournaments, different player groups go head-to-head against other player groups for leaderboard standings.

"Best ball" or "best score"-type tournaments: In this type of team-based tournament, predefined teams of players may compete against each other, with the best score or scores of players for each team being used as the team score for leaderboard ranking determination. The best score or scores for each team may be evaluated, in various implementations, over varying timeframes or events. For example, in one implementation, the score of the player with the best overall individual score for each team for the entire tournament may be used as the team score. In other implementations, the team score for each team may be determined by summing together the highest score achieved, during each of several different events or stages in the tournament, by any of the players of that team. For example, a tournament may be configured to have five rounds of play, with each team's score for each round being totaled up to determine overall team rankings in the tournament. For each round of the tournament, each team's score for that round may be determined by determining the highest score achieved by a player of that team during that round and using that highest score as the team score. Player scores for a particular round may be determined in a number of ways. For example, in some implementations, each player may be allowed to play one tournament session in a given round, and the player's score from that tournament session (assuming they actually participate in a tournament session that round) may be used as that player's highest score. In another implementation, each player may be allowed to participate in multiple tournament sessions during a particular round, and the player's highest score from any one of those individual tournament sessions may be used as the player's highest score for that particular round. In another implementation, each player may be allowed to participate in a fixed number of tournament sessions within a particular round, and the sum of the player's scores in each of those tournament sessions may be used as the player's highest score. In yet another implementation, each player may be allowed to participate in multiple tournament sessions in a round, and the sum of the player's N highest scores for those tournament sessions may be used as the player's highest score (where N is a positive integer less than or equal to the maximum number of tournament sessions that each player is allowed to participate in for that round). In yet other implementations, each player's "highest" score may be an average score rather than a total score, e.g., the player's average score for the tournament sessions that they participate in for a given round, or the average of the player's highest N scores for the tournament sessions that they participate in for a given round.

A tournament session (for clarity, reference to "session" herein is to be understood, unless otherwise indicated through context, to refer to a "tournament session"), as the term is used herein, refers to an event in which a group of players engage in competitive multiplayer play against each other on wagering game machines and/or in online or mobile wagering game play in the context of a gaming tournament for a certain time period (or, in some instances, for a certain number of spins/plays of the underlying wagering game, as discussed later below). The play of each player during a tournament session is generally continuous and the composition of each group of players within a tournament session typically does not change during the tournament session. A tournament may often have multiple tournament sessions, and may often offer multiple rounds of tournament sessions, with player's eligibility to proceed on to the next round and to participate in one or more tournament sessions of that next round being predicated on the player's performance in one or more sessions of the current round or of the current round and previous rounds.

It will be understood that "teams," as the term is used herein, may refer to any of a variety of types of groups of players that have, for one reason or another, elected to play (or been assigned to play) together as a unit. The members of such teams may be selected based on self-selection (players electing or choosing to join particular teams), membership in a particular external group (such as a rotary club, homeowners association, retirement home, etc.), membership in a particular clan (with reference to gaming clans, e.g., groups of people that share a common interest in gaming), etc.

Tournament within a tournament (or "sub-tournament"): In some tournament implementations, groups of players may establish mini-tournaments within the framework of a larger tournament that have, as participants, a subset of players from the larger tournament. For example, a given tournament may include several hundred players, but a subset of those players may, via an application offered on a smartphone, for example, request to have a mini-tournament defined that includes a subset of those players, e.g., a subset that includes only a group of friends, a subset that includes only an extended family, etc. Such mini-tournaments may typically be configured via request of a particular player in the tournament; the player may then invite or designate others to be part of the mini-tournament. In some implementations, mini-tournaments may also or alternatively be configured by a tournament operator. The systems that manage such mini-tournaments may, in some implementations, be configured to allow players that are part of a mini-tournament subset to invite other players to join (or to simply add such players to) the mini-tournament subset. In some implementations, such systems may also or alternatively be configured to allow players that are not in a particular mini-tournament subset to join (or request to join) such a mini-tournament subset. For example, a tournament operator may configure two mini-tournaments for a given, larger tournament: a mini-tournament for dog lovers and a mini-tournament for cat lovers. Tournament players may choose, e.g., through browsing a list of available mini-tournaments presented in an application on a smartphone, a particular one of those mini-groups to join based on their self-selected pet affinity.

Mini-tournaments may be used to allow the subset of players to "compete" against each other in the tournament without the involvement of players in the tournament that are not in the subset. Thus, for example, leaderboards, rankings, and notifications relating to achievements of players for a mini-tournament may be restricted to only utilize data relating to the players within the mini-tournament subset. For example, rankings may be determined for the mini-tournament based only on the scores of the players in the mini-tournament subset. Similarly, leaderboards may show only graphical indicators for players that are in the mini-tournament subset. Thus, a player in a tournament may have multiple rankings—an overall tournament ranking, and then a ranking within each mini-tournament of that tournament that the player is participating in. For example, a player that is ranked $75^{th}$ in the overall tournament may be ranked $3^{rd}$ in a first mini-tournament in which they are participating and $1^{st}$ in a second mini-tournament in which they are participating, all based on the same score of the player.

The systems that track and manage mini-tournaments may, for example, provide data from the overall tournament dataset, e.g., player points, rankings, trophy winnings, etc., that may be filtered and/or recalculated to determine equivalent statistics for use in mini-tournaments. For example, the player points may be filtered to only include player points for players in the mini-tournament, and then a new mini-tournament ranking for the players in the mini-tournament may be calculated or determined based on those filtered player point values.

Mini-tournaments may, in some implementations, have actual monetary or physical rewards associated therewith. For example, the mini-tournament management system may allow the players for a particular mini-tournament to fund a group prize pool, e.g., by each contributing some amount of money or funds, that may be used to fund awards that are given to the highest-ranking players within the mini-tournament subset of players. In some such implementations, such funding may be provided by an alternate source, e.g., the tournament operator. Mini-tournaments may also or alternatively feature non-monetary awards, e.g., virtual badges, avatars, etc., that may be awarded to mini-tournament participants based on their placing within the mini-tournament. The performance of players in a mini-tournament may be provided via, for example, a smartphone application or other mechanism. In some implementations, the mini-tournament concept may be combined with the team-based concept discussed above, e.g., a mini-tournament may be defined for the members of a particular team, thereby allowing the group of players to compete against other teams as discussed above, but then also compete against each other within the confines of the team roster. Such implementations may allow for players to earn bragging rights within the team, or to identify players that may be having a poor experience in the tournament so that other team members may attempt to cheer them up. In some implementations, mini-tournaments may also be set up to include teams as members of the subset of "players" that are involved in a mini-tournament. For example, a player may request that the mini-tournament management server form a mini-tournament that includes their own team and one or more designated rival teams. This may allow the player to see how their team is performing against those rival teams.

In some implementations, a mini-tournament may be configured to include players and/or teams that are not made aware that they are in that particular mini-tournament. For example, a player may request of the mini-tournament system that a mini tournament be created with one or more particular individuals or teams as members of the mini-tournament, but may enable a setting that makes the selected individuals or teams be included in that mini-tournament in a one-way manner, i.e., the player is able to see information that indicates that such selected individuals or teams are part of the mini-tournament as well as information that indicates how such individuals or teams are performing in the mini-tournament relative to each other, but the selected individuals or teams may have no or almost no indication that they are participating in that mini-tournament and may be unable to see how they are performing within the mini-tournament (unless those individuals or teams set up their own mini-tournament that replicates the subset of players in the mini-tournament).

Invite-a-Friend tournament: In some tournament implementations, players may be provided with the ability to invite one or more friends to participate in the tournament with them. In such implementations, players that are invited to participate in a tournament may also be provided with a mechanism for inviting one or more other people to participate in the tournament with them—for example, players may be provided with an interface that allows them to specify the name and contact information (phone number or email address, for example) of one or more friends; the tournament management system may then cause an invitation to participate in the tournament to be sent to the additional invitee(s). In some implementations, the additional invitee(s) and the original invitee that invited them may be placed together into a team, e.g., per the above discussion regarding team tournaments.

Private-group tournament: In some tournament implementations, tournaments may be offered as a service to a group of players. For example, in many instances, tournaments may be funded by a casino or other operator using marketing funds or other resources available to the casino. In such cases, the casino or operator may generally determine or influence which players are selected for participation in the tournament. In a private-group tournament, a group of players, e.g., a group of friends, may enlist the services of a tournament operator, e.g., a casino, in setting up a tournament that is funded, for example, by the members of the group. For example, a group of 20 friends may each agree to contribute $20 to a prize pool for a private-group tournament in order to participate in the private-group tournament; this prize pool is then used to fund prizes for the X highest-ranked players in the private group tournament (it will be understood that such tournaments may, in some cases, consist of as little as a single tournament session, in which case this becomes the X highest-ranked players in the tournament session). A casino or other tournament operator may offer such private-group tournaments for either a nominal fee and/or a fee based on a percentage of the prize pool. In other implementations, instead of a private group tournament mode in which players play without using actual money wagers, a private group tournament mode may be used in which the players play using actual money wagers. In such an implementation, a group of players may request that a private group tournament be configured for their participation, with each player contributing some amount towards the funding of a tournament prize pool. The players would then compete with each other through engaging in real-money wagering on EGMs (or any pre-agreed upon wager-based game, e.g., table games, sports bets, etc.). At the conclusion of such a private group tournament, the results achieved by each player, e.g., their total winnings, during qualifying play in the tournament (such as play on the agreed-upon format of wagering game) may be used to rank the players and determine which of the players are to receive a portion (or all) of the prize pool. Since the wagering game play that determines the outcome of such a private group tournament is revenue-generating for the casino operator, the casino operator may, in some implementations, simply offer such a private group tournament mode feature gratis, as the transactional cost of offering it may be offset by the increase in revenue that is realized through the real-money wagering game play that will be encouraged through the existence of the private group tournament. In other implementations, a casino may also charge a nominal or percentage fee (of the prize pool) for offering such a service. For example, a casino may charge a fee based on 5% of the total prize pool. In some implementations, tournaments such as the above may be initiated by a casino operator, e.g., without any particular specific player request being made. In such implementations, such tournaments may be configured to allow any player that is willing to contribute to funding the tournament to participate. Such private group tournament functionality may, in some implementations, be provided via an application on the player's smartphones (or other devices) that allow the players to select options that establish the private group tournament, manage funding of the private group tournament, and/or manage distribution of prizes arising from the private group tournament. In other words, the application may allow players to self-configure or initiate a private group tournament on-demand, without needing active involvement by the casino.

In some implementations, tournaments may be configured to support a mode in which players participating in the tournament may be provided with the ability to configure additional contests, e.g., similar to mini-tournaments, that are limited to the players that choose to participate but which have results determined based on events in the overall tournament. For example, two friends that are competing in a tournament may wish to make a private wager between them as to a particular wagering proposition based on developments within the tournament, e.g., the identity of tournament winner, whether or not a particular tournament participant will place within the top X ranking positions at a particular time (such as the conclusion of the tournament or the mid-point of the tournament), whether the highest score in the tournament will be within a particular range, whether the highest score in the tournament will exceed a particular quantity, whether a first one of the friends will score higher than the other friend, and so forth. In systems that support this mode, players may be provided with a graphical user interface that allows them to identify one or more other players and propose a side wager (both the amount and the proposed wagering proposition); the system may then cause the other players to receive a notification or other indication of the proposed wager and may cause a GUI to be provided to each of the other players to allow each other player to accept the proposed side wager. If the other player (or one or more players if there are multiple other players) accept the side wager, then the tournament management system may, for example, cause funds to be debited from the original side-wager initiating player and the players that accepted the side wager commensurate with the proposed wager amount, and may hold that amount in escrow until a determination can be made as to which player won the wagering proposition (if any).

League: Some gaming leagues may use tournament systems in which teams of players may compete against each other in a tournament setting over an extended time frame, e.g., several days or weeks, with each team playing each of the other teams, or a subset thereof, at least once during that time frame. In league play, players in the tournament may, in some implementations, participate both on-site in a facility operated by the tournament operator, e.g., casino, and remotely, e.g., via an application on a mobile phone. In tournament league play, the tournament management system may require that at least a predetermined number of players, e.g., 3 of 5 team members, participating in the league tournament must go to the on-site location (or one of two or more on-site locations) on a given day and participate in the tournament at that location. The remaining players on each team may participate remotely, e.g., via play on a smartphone, or may be able to skip playing entirely. If a sufficient number of players are not present at an on-site location, then the team would forfeit that match.

In some implementations, each team may be required to face off against another team in a tournament session (or in separate tournament sessions conducted at generally the same time), with each team's score for that tournament session determining which team "won" the tournament session. The team score may, for example, be the highest score of a player on each team (or the highest X scores, e.g., highest two or three scores) or may be the total score of each team from the tournament session. In another implementation, team scores may be based on individual matchups between players on each team, e.g., each player on a team faces off against a counterpart on the opposing team, and each team then receives a point for each team member that wins their individual face-off match, with the total number of such points earned from all of the team players engaged in that match being used to determine the winning team for that match. In some implementations, team scores may be based on the top X scores for on-site players for each team plus the top Y scores for off-site players for the team. At the conclusion of the time frame, the teams may be ranked according to their overall win/loss ratio (or total numbers of wins and/or losses) or total points accumulated during the duration of regular league play. An optional playoff tournament may then be conducted for qualifying teams from the league, e.g., the top 16 teams may face off against each other in an elimination bracket tournament event.

Poker league: A video poker league could be time or hand-based. Play for x minutes (or x number of hands) and scores get added for team total or individuals play head to head for individual wins (Ws)/losses (Ls) and the team with the most points or most Ws at the end of the "season" wins (both Ws and Ls may be counted cumulatively for the season). This may also be done for live poker using the number of hands and the number of chips each player has at the end of the session as opposed to points. Again, this would be tracked over multiple matchups between various teams over the course of a "season."

Additional Tournament Styles:

In some implementations, tournament management systems may, as set forth in U.S. patent application Ser. No. 16/946,117, be configured to provide tournaments in "elimination" or "bracketed" formats. In such formats, tournament participants may be required to compete against other tournament participants in one or more tournament rounds. In each round, each player may be provided with the opportunity to participate in one or more tournament sessions; each player's eligibility to participate in the subsequent tournament round may be generally predicated on their performance in the one or more tournament sessions of the current round that they may participate in. For example, in some implementations, each player may be permitted to play in only one tournament session (each tournament session, for example, having a plurality of players participating) in a particular tournament round, and only the X top-ranked players of each tournament session within that tournament round may be allowed to participate in the subsequent tournament round (where X is a positive integer, e.g., 1, 2, 3, 4, 5, 6, 7, 8, etc.). In yet other implementations, players may be permitted to play in one or more tournament sessions within a particular tournament round, and any player that places within the X top-ranked positions within any of those tournament sessions may be permitted to participate in the subsequent tournament round. In an alternative such implementation, a player's ranking within the tournament session or sessions of a tournament round may not be taken into consideration at all for determining whether that player is allowed to advance to play in the subsequent tournament round—in some such alternative implementations, the players participating in a tournament round may be ranked against each other based on, for example, the total amount of points that each such player scores within the tournament session(s) in which they participate in that tournament round; in other such alternative implementations, the players participating in a tournament round may be ranked against each other based on, for example, the highest point total that each player scored within a single tournament session that that player participated in within that tournament round. Thus, each tournament round will typically result in a smaller group of players advancing on to participate in the next tournament round, until there are a sufficiently small enough number of players to, for example, all participate in a single tournament session.

It will be understood that some tournament management systems may be configured to cause some players to be eligible to participate in a subsequent tournament round even if that player did not qualify to participate in that tournament round based on the general criteria used to determine if players are qualified to participate in that tournament round. For example, some tournament management systems may be configured to randomly award one or more players with, for example, "mystery prize boxes" (which may be in the form of virtual awards, physical vouchers, etc.) or similar awards that may grant such players a "wild card entry" that the player may redeem in order to be allowed to participate in a tournament round that the player would not otherwise be allowed to participate in, e.g., due to not qualifying. In some such implementations, the tournament management system may award such mystery prize boxes spontaneously, i.e., without requiring the player to be participating in any particular activity at the time of the award. In other such implementations, such mystery prize boxes may be awarded to players as a result of tournament game play (or non-tournament wagering game play) or other specific activity that the player engages in. For example, a player may obtain a particular winning outcome while playing in a tournament session; this particular winning outcome may cause the player to receive a "mystery prize box." The actual benefit that is represented by the mystery prize box may, however, be kept hidden from the player until a later time. The tournament management system may then cause the player to be informed of the benefit that is represented by the mystery prize box at a later time, e.g., in response to particular conditions being met. It will be understood that the benefit represented by mystery prize boxes (or any similar award) may be determined either at the time that the mystery prize box is awarded (in which case the nature of that benefit may be kept hidden) or at a later time, e.g., just prior to the player being informed of the benefit that the mystery prize box represents. In some implementations, tournament management systems may be configured to associate different benefits with a plurality of mystery prize boxes that may have been awarded to different players. For example, the tournament management system may, at the conclusion of one tournament round and prior to or during the subsequent tournament round, identify players that won a mystery prize box but did not qualify to participate in the subsequent tournament round; the tournament management system may then randomly select a predetermined number of players meeting those criteria and cause the mystery prize boxes associated with those players to become associated with a benefit that allows the mystery box awardee to, by redeeming the mystery prize box benefit, participate in the subsequent tournament round despite not qualifying in the normal manner. The tournament management system may cause such players to be notified of this benefit, e.g., by causing a notification to be sent to such players, e.g., via text message, smartphone notification, in-app notification, or other such communication.

In some implementations, tournament management systems may be configured to provide tournaments in a "pub-style" format in which multiple tournaments can be played at the same time. In a less-structured environment, such as a pub, a daily, weekly, etc. leaderboard would display video poker, slots, and keno leaders. These scores may be based on win amounts rather than points. Leaderboards may show Top Winners of the Day, Week, etc., and may switch and cycle through the leaderboards for the various games.

In some implementations, tournament management systems may be configured to provide tournaments on a daily basis, e.g., different tournaments for different days of the week.

In some implementations, a tournament may be persistent over an extended timeframe as opposed to occurring in a limited time slot. For example, a typical tournament may last several hours, e.g., from 3 to 6 o'clock on a given day, whereas persistent tournaments may last for days, weeks, months, quarters, or even years. Players must simply participate within the timeframe for the tournament, and any play during the timeframe of the tournament may qualify or count towards the player's score in that tournament.

In some implementations, tournament management systems may be configured to provide tournaments in which some players, e.g., players of a particular loyalty program status, high-roller players, etc., may be provided with a way to participate in the tournament that does not require that they, for example, be physically present at the EGMs that the rest (or most of the rest) of the players use to participate in tournament sessions. For example, in a typical tournament, several collocated banks of EGMs may be reserved for use by tournament participants during one or more tournament sessions. Players that are participating in the tournament may, for example, be requested to line up in advance of the start of the tournament session in which they are scheduled to participate. Since tournament sessions may often be very short in duration, e.g., two or three minutes, players may be asked to start lining up several tournament sessions in advance of when their tournament session is scheduled to start to ensure that all scheduled tournament session participants are present when their tournament session is about to start. When a given tournament session is about to begin, the players that are participating in that tournament session may be asked to each go to one of the EGMs of the EGM banks that are reserved for tournament use and log in, e.g., using a player tracking card or other player identifier. When all such players are logged in, the tournament session may begin. When the tournament session concludes, the players may be asked to get up and make room for the next group of tournament session players to use the EGMs in the bank(s) of EGMs. As noted above, some tournament management systems may be configured to permit some players to participate in a tournament session from a location other than one of the EGMs in the reserved bank(s) of EGMs. Such players may, for example, be referred to herein as "VIP player," although it will be understood that such players may be permitted to participate remotely based on any criteria that the tournament operator deems sufficient and need not actually be considered to be "VIP." In such implementations, the tournament management server may be configured to allow such players to participate remotely in the tournament session, for example, at another EGM located elsewhere on the premises from where the tournament is being conducted (or even an EGM located at another property entirely, but which is able to communicate with the tournament management server, e.g., via a network). In such cases, the tournament management system may, for example, send instructions to the VIP player's EGM prior to the start of the tournament session in which the VIP player is to participate to cause the VIP player's EGM to configure itself in a manner similar to how the EGMs in the reserved bank(s) of EGMs are configured. The VIP player may then be allowed to participate in the tournament session remotely and concurrently with the players that are participating in the tournament session using the EGMs in the reserved bank(s) of EGMs. This allows the VIP player to, for example, avoid standing in line and/or avoid having to get up and leave the EGM on which they are playing (which they may view as a "lucky" EGM)—the VIP player may thus switch from playing "real-money" wagering games (revenue mode) to tournament play and back to real-money wagering games very quickly and without leaving their EGM. A VIP player may also be permitted to request entry into the next available tournament, in some instances, thereby allowing the VIP player to, for example, request entry into the next tournament session after they cash out or run out of credits on the wagering game they are using (such entry may be "on-site," e.g., with the VIP having to relocate to another location where there are specific EGMs reserved for tournament mode play, or may be remote, e.g., as discussed above). In some implementations of the above, there may be an "empty" EGM in the reserved bank(s) of EGMs that is, for example, "slaved" to or otherwise configured to replicate the game play experienced by the VIP player during the tournament session, thereby allowing spectators to see what the VIP player is seeing, and share in the excitement of watching that player's game play.

In some implementations, tournament management systems may be configured to provide tournaments in which any of the players may participate from any EGM (or from a large number of EGMs scattered at different locations around the tournament venue). In some such implementations, the tournament management system may be configured to allow players to participate in tournament sessions that are scheduled for particular times from such EGMs, e.g., players that are scheduled to participate in a 10:00 AM tournament session may be logged in using their player tracking cards at a plurality of different EGMs located at different locations in a casino. The tournament management system may, slightly before the 10:00 AM tournament session start time, identify the EGMs that the predetermined participants for that tournament session are using and then cause those EGMs to notify the players thereof that their tournament session is about to start. The tournament management system may then cause those EGMs to enter into a tournament mode, at which point all of the players for those EGMs may be able to play against each other for the duration of the tournament session. Subsequent to the conclusion of the tournament session, the tournament management system may cause the player's respective EGMs to revert into a revenue-generating state, e.g., into the state that such EGMs were in prior to the start of the tournament session. In some such implementations, players may be allowed to participate in the tournament session in a non-contemporaneous manner, e.g., every player is able to play their own independent tournament session at a time of their choosing (of course, in such implementations, it would not be possible to provide real-time player ranking information for players that have not yet played their respective tournament session). The results thereof may then be evaluated across all of the players once all of the players for a given tournament session have completed their individual tournament session (or once a predetermined period of time has elapsed in which the players are to play in their respective tournament sessions).

In some implementations, tournament management systems may be configured to provide tournaments in which tournament sessions are spin-based instead of time-based. For example, in a typical tournament, players participating in a tournament session may be given a fixed window of time, e.g., 2 minutes, in which to attempt to earn as many points as possible. In other implementations, however, a tournament management system may be configured to provide tournaments in which tournament sessions instead have spin-based durations, e.g., every player gets 100 spins, regardless of whether it takes the player 2 minutes to complete them or 20 minutes to complete them (there may be an upper limit of time placed to ensure that a tournament session has a set end point, however). Such implementations may allow players to participate in a tournament in a more sedate, less frenzied (and thus less conspicuous) manner, and may also be less disruptive to casinos or other operators, as it may not be as necessary to reserve large areas of the casino floor for simultaneous tournament play.

Instant ("pop-up") tournament: In some implementations, a casino can decide there is going to be a tournament at any given moment in time, with little or no advance warning to potential participants (e.g., the tournament may start immediately, or in 10 minutes, or in an hour). The tournament may generally occur as an unplanned event (no significant advance notice so only potential players on-site may find out about it and have enough time and opportunity to enter). For example, when players in a certain group and/or tier are within the geofence of the casino, they may receive messaging that a tournament will begin in X minutes and instructions on how to play to win entry into the tournament (or extra tournament session entries therein). This may generally be in a scenario where all EGMs (or some subset) on the casino floor were set up to have this feature. Examples of such notifications may include:

1. Players could be gambling away on EGMs and get an option to play in a tournament in 10 minutes.
2. Players could be presented with an option to play in a tournament when they insert their player tracking or loyalty account card.
3. Players may receive a mobile notification that there will be a tournament on any of a specified type, group, or theme of EGM, for example, in 10 minutes, encouraging the players to find such an EGM in order to join in.

Such tournaments may be a marketing-funded (free to play) tournament or a pay-to-play tournament where there is a bet-up amount or set entry fee to play in it. In some instances, the players that participate in a pop-up tournament session may simply have the win amount that they earn in normal play over the next X minutes (duration of the tournament) be the amount used to determine where they place in the tournament.

Pay-to-enter Tournament: In such tournaments, individual players pay to participate in the tournament and some percentage of what they pay goes to the prize pool for the tournament. This type of tournament could be played over time (week, month). Any time the player plays, a percentage of their play goes to the pool (and a percentage goes to the operator for administering it) and their scores are logged. At the end of the time period, the pool is paid out to the highest scorers over that time. Entry into such tournaments may generally be open, as long as the participant pays the entry fee.

Percentage-of-Base-Play-Funds tournament: In such tournaments, a casino or other tournament operator may fund the starting prize pool with a seed amount of funds and participants in the tournament may contribute additional funds, either as an entry fee or as a percentage of tournament players' base-game play.

In some implementations, tournament management systems may be configured to provide tournaments in which the players' ranks within the tournament as a whole may be based on the lowest score that a player achieved while playing in tournament sessions for the tournament combined with the highest score that the player achieved while playing in tournament sessions for the tournament.

The tournament management system could be used to handle the administration of other types of tournaments as well as slot tournaments, such as video poker tournaments or novelty tournaments like beer pong, skill-based or arcade games, etc.

For example, tournament systems may also be configured to handle the administration of video poker tournaments as well as slot tournaments. Like a slot tournament, a video poker tournament may be time or hand-based, e.g., play for x minutes (or x number of hands), and scores may determine rank within the tournament. Similar types of features could be implemented in poker play as with slot play—sticky wilds, multipliers, etc.

Tournament systems may also be configured to handle the administration of a table game, e.g., poker, tournament as well as slot tournaments. For example, such tournaments may be implemented in live poker using number of hands and the number of chips each player has at the end of the session as opposed to points.

Additionally, in some implementations, the tournament management system may be configured to obtain video feed of a live host that commentates on the tournament; the tournament management system may simultaneously broadcast that live video feed to displays at multiple venues and also, in some implementations, allow tournament session play in multiple venues simultaneously, commentated by the same host. Thus, spectators as well as tournament participants may feel that they are watching and/or participating in a game show. The host could be shown on a main screen or even in an inset on the EGMs (such as the EGMs being used in the tournament) and could vocally reference achievements or activities at any of the specific participating locations (e.g., "Danny G just took 1st place in his session at Lakeside. Congratulations, Danny!").

Boosts for Earned Entries:

In some implementations, tournament management systems may be configured to provide tournaments in which players are awarded "boosts" that can improve their tournament session outcomes based on a variety of factors. For example, in some implementations, players may, for example, be provided with a tournament entry that includes automatic entry into a single tournament session (with subsequent tournament session entries generally being contingent on how the player fares in the preceding tournament session(s) that they play in); if the player does not do sufficiently well in this tournament session, then they may not be able to progress to a subsequent tournament round (in some tournaments, players may be provided with multiple tournament session entries as part of their tournament entry, but in this example, only one tournament session entry is provided in conjunction with the tournament entry). However, in some such implementations, tournament management systems may be configured to allow players to earn the opportunity to participate in additional tournament sessions for a given tournament round, e.g., through purchasing one or more additional opportunities to participate in such tournament sessions, winning a prize that allows the player to participate in a further tournament session, reaching a certain level of paid play in a set time period, etc. In such cases, some tournament management systems may be configured to, for each additional tournament session that a player may earn beyond the initial tournament session, cause the player to receive a benefit during that additional tournament session (or multiple tournament sessions, in some instances); for example, the player may receive an increased RTP (e.g., through modifying the reel strips used for the player's EGM and/or providing a sticky wilds feature or other RTP enhancement) or other parameter that causes the player to experience winning more frequently and/or in larger amounts as compared with the RTP or parameter value prior to the application of the benefit. In some implementations, such benefits may "stack," e.g., the tournament management system may be configured to increase the effect of the benefit for a player for each such additional tournament session earned. In some such implementations, the benefit that is provided to players that earn additional tournament session plays may be to allow all of the points scored during such additional tournament session(s) to be added to the player's score for the purposes of determining their overall ranking during the tournament. In some implementations, the benefit that may be provided by the tournament management system to players that earn additional tournament session entries may be in the form of increased odds of getting boosts, e.g., player-specific multiplier effects, instant-reveal prizes (which are shown to the player immediately upon being won), mystery prize boxes (which may be indicated to the player as being won immediately, but which may have a benefit that remains hidden to the recipient until a later time), etc.

Trophies

As discussed in U.S. patent application Ser. No. 16/946, 117, some tournament management systems may include functionality that includes award of "trophies" (which may also be referred to as "awards," "badges," "medals," etc.). In some such implementations, trophies that players are awarded or that are earned by players may give those players an entry into a special drawing after the tournament ends. The drawing may be a standard drawing, e.g., for a cash prize or voucher redeemable for services or goods, where winning names are randomly selected from the entries for specific prizes, potentially of different values. Such selection could be done manually, e.g., drawing a name, but could also be done by the operator-configured tournament management system. For example, such a system may be configured to:
  a) Provide a player with drawing entries commensurate with the number of trophies that the player earned during the tournament (even if multiple trophies of the same type are earned, e.g., the player may get the same trophy in multiple tournament sessions).
  b) Provide a player with drawing entries commensurate with the number of unique types of trophy that the player earned during the tournament (thus, if the player earned three instances of the same trophy across three different tournament sessions, these would only earn the player one entry into the drawing).
  c) Provide a player with a maximum of one drawing entry if the player earned any trophy in the current tournament.

In some implementations, trophies may be awarded that award points during tournament play or social casino points to be used later. In some implementations, trophies may serve as a form of "mystery prize box" (see discussion elsewhere herein) that provides a surprise benefit under certain conditions. For example, a player could walk into a restaurant on-property and be notified that the trophy they won entitles them to 20% off their bill.

Mobile

As discussed in U.S. patent application Ser. No. 16/946, 117, some tournament management systems may include functionality that allows for tight integration with mobile device-implemented applications, e.g., on devices such as smartphones owned by players or potential tournament players.

Such mobile device-implemented applications may, as discussed in U.S. patent application Ser. No. 16/946,117, take the form of "concierge" applications, e.g., applications that have a primary purpose of facilitating customer service requests (such applications may allow players to access maps, reserve EGMs, order drinks or food, interact with casino staff, contact other players, see where particular wagering games may be found, etc.), and/or online wagering game applications (such as social gaming applications). Such applications may be configured to provide one or more of the functionalities discussed below that allow a player to:

1) Receive status perks awarded for social casino play that may be used on-site at a venue, e.g., casino (e.g., express entry to buffet, choice of where player may sit/which EGM player may use during tournament session, etc.).
2) Earn player loyalty program points for in-app monetary purchases.
3) Earn tournament entries/invitations for tournament hosted at a casino or other property via social casino play.
4) Receive tournament entries/invitations and/or details. Such invitations may be to overall tournament without necessarily providing the player with a further ability to pre-select tournament options, or may provide an interface to show available tournament session dates/times and allow the player to select a preferred tournament session time/date, at which point the tournament management system may cause that player to be assigned to the tournament session for that selected date and time slot, and/or a specific EGM that the player will be allowed to use during the tournament or during one or more tournament sessions.
5) Accept tournament invites. For example, players may opt-in, opt-out, or select a "maybe" or "tentative" button or input which may cause the tournament management system to cause future communications regarding the tournament to be periodically sent to the player until the player declines or accepts, which may give the tournament operator further insight and visibility as to which players plan to attend a particular tournament.
6) Select a particular tournament session time slot or a particular EGM for use during a tournament session. This may be similar to the functionality discussed above with respect to receiving tournament entries or invitations, but may be separately presented or otherwise separated from tournament invitation/entry communications. For example, after a player has confirmed that they intend to participate in a tournament, the player may navigate to a "My tournaments" interface on a smartphone application and select a particular tournament and be offered a further graphical user interface that allows the player to make one or more selections regarding, for example, time/date of their tournament session, the player's preferred EGM or seating position, etc.
7) Display a bar code, quick-recognition (QR) code, or other machine-readable code that may allow the player to simplify the "check-in" or "sign-in" process that some tournament management systems may require players to undergo prior to those players being allowed to participate in their respective tournament session(s). Tournament management systems may be communicatively connected with machine-readable code readers that may allow the tournament management system to obtain scans of such codes. For example, such codes may be read by code readers that are located in kiosks or in the EGMs used for play during a tournament session. In some implementations, a tournament host tablet or similar portable device used by a tournament overseer or emcee may be used to scan such machine-readable codes and communicate back to the tournament management system that the player associated with that code is present and ready to participate in their assigned tournament session (or in an upcoming tournament session).
8) Invite friend(s) to join them in a tournament. As mentioned earlier, some tournament management systems may be configured to allow one or more tournament invitees to invite one or more friends or other acquaintances of the invitee(s) to join the invitee(s) in participating in the tournament.
9) Receive a welcome message when the player arrives on or at the property where a tournament is taking place. For example, the mobile device application may use location services to determine where the mobile device is (and thus infer where the player is) and cause a welcome message to be displayed when the player arrives at the relevant location. Alternatively, the application may cause such geolocation data to be sent to the tournament management system which may make a separate determination as to whether the player (or, more correctly, the player's mobile device) is present at the relevant location and, if so, cause such a message or notification to be provided to the player. Such locations may, for example, include a parking lot associated with the tournament venue, a building entrance associated with the tournament venue, or other relevant locations. The welcome message may, for example, include content congratulating the player on winning entry into the tournament.
10) Access a user interface that allows the player to join an earlier tournament session if the player arrived early, allowing said player to skip the line and go straight to the reserved seat/session. For example, users of the app may be provided with an opportunity to skip the line and play immediately by offering those players a new time slot based on their arrival at the property (thereby it is a benefit to have the app and be a registered player). If they registered in advance, they can play more or less immediately even if they arrive at a different time.
11) Reserve a specific seat or EGM for use by the player during a tournament session (as discussed above) as well as an optional additional specific seat for a guest of the player, e.g., another person that the player has invited to participate in the same tournament, e.g., potentially as a teammate for a two-player team implementation of a tournament. In some such implementations, the tournament management system and/or mobile device application may cause such options to only be available to a player if the player has achieved a particular level of loyalty status in a player loyalty program.
12) Use a "Floor Focus" feature to locate a tournament area, favorite machines, hot/lucky zone, and other amenities on a map of the property where the tournament is being played.
13) Receive tournament updates/reminders/notifications/information, such as:
    a) When the player's allotted time for participating in the tournament is (the day(s), start time(s), session time(s), end time, etc.)
    b) Real-time availability/wait time (e.g., if a tournament does not offer pre-selection or pre-assignment of players to tournament sessions, or if a player has not availed themselves of such features, players may queue up and be assigned to open spots in tournament sessions as they become available). This allows players to wait to queue up until the wait times are less.
    c) How to earn additional tournament session entries, e.g., through purchase, through achieving particular milestones in wagering game play or social gaming play, etc.
    d) When the player has earned an additional tournament session entry.

e) When/if the player has earned or been awarded a "wild card entry," which may allow the player to enter (or, more usually, re-enter) a tournament by participating in a tournament session that they did not qualify for as a result of their normal tournament play/performance.
f) When the player's session is about to start, and/or which seat or EGM is assigned to the player.
g) When/where prize drawings for the tournament or final award collection for the tournament is to take place.

14) Check the number of tournament session entries that the player has for a particular tournament or for one or more tournaments.
15) Check leaderboards for player rankings, the player's own score/rank/trophies/status, final tournament results, prizes, other players' scores/rank/trophies/status, etc. (for example, the performance of another player that the player is following, e.g., due to a follow-the-leader feature, the performance of a group of players (such as a team that the player is part of, or a team that the player has a rivalry with), or friends of the player).
16) Play a tournament session on the mobile device if the mobile device's geolocation data indicates that the mobile device is at the property where the tournament is being conducted. Alternatively, similar functionality may be provided without using geolocation data but by instead providing such functionality only to mobile devices that are logged on to a local wireless network associated with the property where the tournament is being conducted. This feature may allow players to still participate in tournament sessions but without requiring that they be at a specific EGM (thus allowing them to avoid queuing up or otherwise having to be potentially inconvenienced by going to a specific location).
17) Track a session leader for a "follow-the-leader" metagame. For example, players that participate in a tournament session may be provided with an interface that allows them to track the performance of another player that won that tournament session. Such a feature, which is discussed in U.S. patent application Ser. No. 16/946,117, may allow the player to potentially benefit from the performance of the "leader" player. Regardless of whether the player stands to benefit materially from the performance of the leader, the ability to follow the performance of that leader player may provide the player with a feeling of pride or otherwise boost the player's self-esteem. For example, the player, while discouraged to have not been a winner in that tournament session, may nonetheless derive satisfaction in seeing, for example, that the leader of their tournament session either proceeded to win in subsequent sessions ("I may have been vanquished by the leader, but at least I was vanquished by one of the best!") or may suffer a loss (in which case the player may feel that they have been avenged). For example, the mobile device application may allow a player to:
a) "Follow" another player's performance (such as the performance of the top-scoring (other) player (which may also be referred to as a "champion") in a tournament session that the player participated in earlier) in the tournament by checking their phone throughout the day; the tournament management system may be configured, in some instances, to cause the mobile device application to periodically provide notifications to the player of opportunities for potential awards that may be obtained contingent on the "followed" player's performance and the "following" player's continued presence at the venue where the tournament is being conducted (or some other specified venue). Such tournament management systems may also be configured to actually provide such awards to players when such conditions are met. Such notifications may, for example, include messages such as "your group's champion, Larry, has now progressed to the next level" or "your group's champion finished in the top 10 places of the tournament—all of their followers get to share in their winnings!"
b) Send "likes" or other indications of approval, e.g., laudatory messages, messages of encouragement, virtual applause, etc. to the "followed" player, which may, in some cases, also impact his or their visibility or ranking. For example, a tournament management system may be configured to graphically emphasize an avatar or other graphical indicator representing "followed" players in leaderboards or other displays based on how many "likes" or other indications of approval those players have each received. In some such implementations, such emphasis may, for example, include the size of the avatar or graphical indicator relative to those of other players, or the size and/or intensity of a graphical effect, such as a halo, glow, or flames that are applied around the edges of the graphical indicator.
c) Allow players to see video or live spins of the followed player's game play.
d) See a secondary prize won by the player if the "followed" player wins the tournament.
18) Post a trophy or trophies to a social media account.
19) Invite friends to download and play a social casino application on mobile devices of those friends.
20) Place a back bet on a specific tournament player (e.g., a player too young to play in a senior tournament bets on someone who is playing and then has a stake in the outcome).
21) Self-identify friends (and/or rivals, e.g., for clans)—such functionality may, for example, provide support for creating teams or groups of players that may participate in team-format tournament events, as discussed earlier.
a) See a private group leaderboard, such as a leaderboard for a mini-tournament within a tournament, as discussed earlier.
b) Track a group of players to see, for example, how a team is doing or who is leading within the group (tournament within a tournament; see earlier discussion)
c) Find out if friend(s) (people the player has identified as "friends" or similar status to the application) are on property and locate/arrange to meet up.
d) Set up teams, clans, leagues.
22) Receive instant/time-sensitive offers based on achievement level (e.g., a player earns VIP status for the day, allowing them to quickly earn tournament entries by playing the latest new slot games).
23) Receive/track a geo-fenced mystery treasure chest (mystery prize box) won in a tournament session that can open at a specific time as long as the player is still on property or when they are in a specific place).
a) Some implementations of such a chest could award points on property that boost the player's score in the tournament.
b) Some implementations of such a chest could award points to play in a social casino application or that could be used on the player's next visit once the player leaves property.
c) Some implementations of such a chest could award both on-site and off-site prizes, e.g., if revealed to the player when the player is on-property, then one benefit, and if revealed when the player is off-property, then a different benefit. In some cases, such a chest could provide both benefits, but at different times (for example, when on-property, the on-property benefit, and after the player leaves the property, a second award of the off-property benefit).

24) Receive tournament-related digital-only prizes (e.g., the tournament operator could award digital-only prizes to players who ranked just lower than the players whose rankings entitled them to a cashable prize in the overall tournament).

25) Receive real-time offers and promotions based on live-ops behavior analysis/player management (operators can use a variety of tools to enhance a player's visit). For example, if a player has the app, they can be tracked throughout the property and receive real-time offers and promotions as they move throughout the property based on their behaviors.

Examples a) If they are losing on one bank of a specific slot title after playing for a while, an offer can be made to them to try a different bank of EGMs or a different game.
b) If they have been on-site a long time, they can be sent a discount for a restaurant.
c) If, for example, they have been playing Buffalo, they may earn another entry into the Buffalo-themed tournament.

26) Receive other special offer/points earned for playing in a tournament or for completing other engagement tasks, such as checking the leaderboard in the app during the tournament.

27) Check player loyalty program tier status and how to level up (time/play/purchase amount to reach next level, as well as if there are any time-based limitations or requirements for doing so).

28) Participate in an on-site or multi-property scavenger hunt to enhance engagement and loyalty, earn rewards, etc.

29) Share interactive (social, video) and screen capture (screen shots), including game replay.

30) Tie social mobile games to real-money tournaments—you're in the tournament/player tracking system because you've linked your online account to the tournament management system (or to the systems of the tournament operator, e.g., a player loyalty program provided by the operator).

31) Create and connect an avatar in a loyalty or social casino app for use there and in metagames, such as tournaments and other community games, for consistent and recognizable representation. For example, if a player has an app associated with the tournament operator and selects an avatar for themselves in the app, the avatar can also be used as a visual representation of them in tournaments and in community or social games. The avatar may be something the player can customize within the app based on accumulated points or by purchase, etc. The app may also let them customize their avatar for a specific game based on status—they may, for example, create their own buffalo with its own accessories that displays in a graphical leaderboard of a buffalo race during a tournament.

Mobile Notification/Engagement:

The mobile device application discussed above, as well as in U.S. patent application Ser. No. 16/946,117, may also provide various features that are configured to drive player engagement and provide useful notifications to players. For example, such applications may be configured to provide:

1) Ongoing patron or player engagement by providing a variety of notifications, such as notifications to let a player know when they meet a threshold for earning an additional tournament entry, anticipation messaging notifications leading up to a tournament (highlighting an upcoming tournament, counting down the days until the tournament, etc.), notifications of when a tournament/session begins or is about to begin (e.g., a 15-minute, 10-minute, and/or 5-minute warning), notifications of when there is a change in a leaderboard (such as a change that causes the player to move up or down a rank on the leaderboard), notifications of tournament results, notifications of any prize won by the player (including notifications that may include celebration messaging and/or instructions on how to claim it).

2) Reminders to check the leaderboard(s) as a tournament nears its end or if the ranking changes.

3) Daily push notifications to visit the casino to play wagering games to earn a possible additional entry.

4) For example, if there is a weekly tournament, notifications could be provided that a player could earn one or more additional tournament session entries per day if they come into the casino on such days.

Notifications that are sent may be sent to an email or app inbox, be delivered as a text message, be pushed to a device as a notification or some combination of these methods. Some notifications may only be sent/received based on user location (onsite vs. off-site or specific area within property, e.g., near bar or restaurant, near showroom, near type of new machines, etc.).

Tournament Game Play Enhancements:

In some implementations of tournament management systems and/or mobile device applications (such as those discussed above), various enhancements may be offered.

For example, in some such implementations, tournament management systems may be configured to provide post-tournament session functionality that may be used to encourage players to engage in activities that may be particularly of interest to the tournament operator, e.g., players may be informed that a particular type of EGM, such as an EGM with a new cabinet style or EGMs offering a particular game, may be played in order to earn another tournament entry or tournament session entry (in some examples, this may be coupled with a time limit in which the particular action must be taken by the player in order to receive the tournament entry or tournament session entry). In some implementations, the player may be informed that a particular type of EGM may be configured to have increased chances of earning another tournament entry or tournament session entry as a special prize that may be awarded during play on those EGMs. The tournament management system may be configured to cause such EGMs to offer such enhanced chances of providing such awards to such players. Other potential examples of such post-tournament session functionality may include informing a player that achieving (or exceeding) a predetermined amount of winnings for a wagering game spin or play, or reaching a predetermined amount of coin-in while playing a wagering game (or doing so over a predetermined period of time) may result in earning another tournament entry or tournament session entry. The tournament management system may be configured to monitor for instances in which players meet such criteria and may then cause the appropriate award of another tournament entry or tournament session entry to be provided to those players.

As mentioned in U.S. patent application Ser. No. 16/946,117, in some implementations, EGMs configured for use in tournaments managed by tournament management systems may be configured to offer virtual button decks that may feature two, side-by-side "play" buttons to allow players to more rapidly push a play button without becoming as fatigued (as both hands may be used in alternating fashion, rather than having all button presses be with one hand; the close proximity of the buttons to each other, e.g., within a handspan of each other, may also allow a player to play double-handed without having their hands spaced widely apart, e.g., 18+ inches apart—this may make it less fatiguing to rapidly press such buttons). In some such implementations, a countdown display may be provided on the virtual button deck; such a countdown may provide insight as to the amount of time remaining before the start of a tournament session. In some implementations, tournament management systems may be configured to determine which player is the first player to press a play button after the start of a tournament session, which may cause the tournament management system to provide a benefit to that player, e.g., a trophy, a temporary bonus (such as a score multiplier for an interval of time, e.g., 5 or 10 seconds), or other benefit. In such implementations, having the countdown timer shown on the button deck may allow the players to focus entirely on the buttons and being the first player to press the "play" button. In some implementations, EGMs may be caused, when in tournament mode, to provide dual "play" buttons that may be caused to, after either such button is pushed to start a spin or play, transition both buttons to cause their displays to say "stop" instead of "play." If the player pushes either such button while "stop" is displayed, the EGM may cause the animation for the wagering game play or spin to stop (either abruptly, or at least much quicker than normal); once the play or spin animation is stopped, the buttons may be caused to revert back to displaying "play," and the next press of either of the buttons will start a new spin or play, along with the buttons being transitioned to display "stop" again instead of "play." This sequence of button text transitions and spin or play starts and stops may be repeated throughout the duration of the tournament session.

Other Themed Presentations

A graphical leaderboard, as discussed in U.S. patent application Ser. No. 16/946,117, may also be configured to be shown from a first-person perspective (from the player's viewpoint, looking forward seeing buffalo rears or buffalos passing from the side, or race cars (with a rear view mirror showing approaching players)), as a thermometer-type meter where there is a "race to the top" filling up a container or adding degrees of success, etc.).

Another themed aspect could be that there are different achievements to move to various levels where if, within the timeframe of a video poker tournament, a player gets, for example, four 3-of-a-kinds, they take over a small castle or roadside inn, then if they get three full-houses, they take over a 3-star motel or castle with moat, if they get two four-of-a-kinds, they get a kingdom or 5-star hotel, etc. Once all achievements for a given level are completed, the player moves on to the next level with a new set of achievements to pursue.

Mystery Box Feature

In some implementations, a tournament management system may be configured to cause EGMs offering tournament game play to include opportunities for players to win "mystery prize boxes" (which may also be referred to herein simply as "mystery boxes." For examples, such EGMs may be configured to utilize a set of reel strips that may have one or more reel strips with a mystery box symbol on it. For example, an EGM offering a five-reel wagering game for tournament play may have three reel strips that each have a mystery box symbol on them. In some such implementations, the locations of the three reel strips within the five reels may be randomly determined for each spin (for example, reels 1-3 may have the three mystery box symbols in one spin, and then reels 1, 3, and 4 may have the three mystery box symbols in the next spin, and reels 2, 4, 5 in the spin after that).

In some such tournament systems, there may be different tiers of mystery boxes, e.g., equal to the number of reel strips in an EGM that have mystery box symbols. Players that land or obtain a mystery box on one or more of the reels of their EGM after a spin may be awarded a mystery box from a tier level corresponding to the number of mystery box symbols that are on-screen at the conclusion of the spin. For example, a player that lands only a single mystery box symbol for a given spin may be awarded a third tier (in this case, the lowest tier) mystery box. A player that lands two mystery box symbols for a given spin may be awarded a second-tier mystery box, and a player that lands three mystery box symbols for a given spin may be awarded a first-tier mystery box (the highest tier, in this example).

When a player achieves an outcome during play that results in a mystery box being awarded, an appropriate celebration animation may be played, with appropriate sound effects and voice-over ("You won a mystery box!"). In some implementations, the benefit that is associated with the mystery box may be displayed to the player immediately after (or as part of) the celebration information. However, in many implementations, the benefits associated with mystery boxes may be kept hidden from the recipients thereof until, for example, some later condition is met. For example, in some implementations, tournament management systems may be configured to cause the benefit associated with a particular mystery box to be revealed to the recipient (e.g., via notification, text message, or other communication) at a particular time on a particular date. In additional or alternative implementations, tournament management systems may be configured to cause the benefit associated with a particular mystery box, which may be a voucher or other redeemable benefit that allows the recipient to advance to the next stage of tournament play—even if they would otherwise not be eligible to progress to the next stage of tournament play, to be revealed to the recipient after the recipient has failed to qualify for further tournament play but prior to the start of a subsequent stage or round of tournament play.

Examples of different tiers of mystery box prizes may include:
  a) An additional tournament session entry, i.e., an additional opportunity to play in a tournament session.
  b) An award of cashable credits (or cash).
  c) An award of an in-game boost or enhancement, e.g., increased chance of winning, multiplier effect (that multiplies some or all points won by the recipient during a game).
  d) An award of promotional credits that may be used in wagering games for opportunities to win cashable credits.
  e) An award to the recipient of an amount of points in a tournament of a predetermined amount.
  f) An award to the recipient of an amount of points in a tournament sufficient to cause the recipient's ranking in the tournament to advance by a predetermined number of ranks.

g) An award to the recipient of advancement in the tournament to a level for which the recipient may not be eligible.

h) Combinations of any of the above.

As an example implementation of a mystery box award implementation, when a tournament session is over, the player in 4th place may receive a "mystery box." The mystery box may have an intro animation in which a mystery box drops down into the window, kicks up some dust, and text appears in front of or under it that says: "Mystery box! Open in the app after the tournament to reveal the prize!"

While the invention has been described with respect to the figures, it will be appreciated that many modifications and changes may be made by those skilled in the art without departing from the spirit of the invention.

What is claimed is:

1. A system comprising:
   a plurality of processors;
   a plurality of memory devices; and
   one or more display devices, wherein:
   the processors, the memory devices, and the one or more display devices are communicatively connected, and
   the plurality of memory devices collectively stores computer-executable instructions for controlling the processors to, collectively:
   receive information identifying a first player associated with a first device having at least one display device of the one or more display devices, at least one memory device of the memory devices, and at least one processor of the processors;
   cause a tournament graphical user interface (GUI) to be displayed on the at least one display device of the first device, the tournament GUI including a plurality of controls configured to display one or more unlocked tournament games that are available for play by the first player within a gaming tournament and one or more locked tournament games that are each available for play within the gaming tournament by the first player once unlocked for the first player;
   determine when one or more first conditions are met;
   cause, responsive to determining that the one or more first conditions are met, a first locked tournament game of the one or more locked tournament games indicated by the tournament GUI displayed on the at least one display device of the first device to transition to being an unlocked tournament game available for play by the first player;
   receive a first player game selection input via the tournament GUI displayed on the at least one display device of the first device, wherein the first player game selection input is associated with one of the one or more unlocked tournament games displayed by the tournament GUI displayed on the at least one display device of the first device;
   cause a first unlocked tournament game of the one or more unlocked tournament games to be presented for play via the at least one display device of the first device responsive, at least in part, to receipt of a player input via the tournament GUI displayed on the at least one display device of the first device;
   adjust a first tournament score associated with the first player responsive to game outcomes in the first unlocked tournament game resulting from plays of the first unlocked tournament game;
   obtain geolocation data indicating a location of the first device; and
   determine that the one or more first conditions are met by determining that the location of the first device is at least within a predetermined geographical area associated with the first locked tournament game.

2. The system of claim 1, wherein the plurality of memory devices further collectively stores computer-executable instructions for further controlling the processors to, collectively:
   cause a timer to be displayed as part of the tournament GUI,
   cause, prior to a start time of the gaming tournament, the timer to display a first countdown of time remaining until the gaming tournament starts, and
   cause, after the gaming tournament starts, the timer to display a second countdown of time remaining until the gaming tournament ends.

3. The system of claim 1, wherein the plurality of memory devices further collectively stores computer-executable instructions for further controlling the processors to, collectively:
   cause a control to be displayed as part of the tournament GUI that indicates a number of plays in the gaming tournament that are available to the first player for use in playing one or more of the unlocked tournament games indicated by the graphical user interface.

4. The system of claim 1, wherein the plurality of memory devices further collectively stores computer-executable instructions for further controlling the processors to, collectively:
   cause a control to be displayed as part of the tournament GUI that indicates a number of perks that are available to the first player for use in the gaming tournament, wherein each perk is a redeemable benefit in the gaming tournament.

5. The system of claim 4, wherein the plurality of memory devices further collectively stores computer-executable instructions for further controlling the processors to, collectively:
   cause one or more controls of the tournament GUI to indicate, for each type of perk of a plurality of types of perks that are earnable for use in the gaming tournament, the type of perk and a quantity of that type of perk that are available to the first player for use in the gaming tournament.

6. The system of claim 1, wherein the first device is an electronic gaming machine.

7. The system of claim 1, wherein the first device is a mobile phone or a tablet computer.

8. The system of claim 1, wherein the plurality of memory devices further collectively stores computer-executable instructions for further controlling the processors to, collectively determine that the one or more first conditions are met by determining that the location of the first device is at least within the predetermined geographical area associated with the first locked tournament game for a determined period of time.

9. The system of claim 1, wherein the plurality of memory devices further collectively stores computer-executable instructions for further controlling the processors to, collectively:
   cause a game purchase GUI to be displayed on the at least one display device of the one of the one or more display devices, the game purchase GUI displaying a first purchase condition associated with the first locked tournament game, and receive input indicating that the player has met the first purchase condition, wherein the one or more first conditions are alternatively met when the first purchase condition is met.

10. The system of claim 1, wherein the plurality of memory devices further collectively stores computer-executable instructions for further controlling the processors to, collectively:

determine when one or more second conditions are met, and cause the first player to be awarded items relating to the gaming tournament responsive to the one or more second conditions being met, wherein the one or more items are selected from the group consisting: of one or more plays for the gaming tournament, one or more perks that are redeemable for a benefit in the gaming tournament, and combinations thereof.

11. The system of claim 1, wherein the plurality of memory devices further collectively stores computer-executable instructions for further controlling the processors to, collectively:

obtain geolocation data indicating a location of the first device, and determine that the one or more second conditions are met by determining that the location of the first device is at least within a predetermined geographical area.

12. The system of claim 11, wherein the predetermined geographical area is associated with a particular casino.

13. The system of claim 11, wherein the predetermined geographical area at least partially overlaps with territory subject to tribal sovereignty.

14. The system of claim 13, wherein at least 90% of the predetermined geographical area overlaps with the territory subject to tribal sovereignty.

15. The system of claim 13, wherein all of the predetermined geographical area overlaps with the territory subject to tribal sovereignty.

16. The system of claim 1, wherein the plurality of memory devices further collectively stores computer-executable instructions for further controlling the processors to, collectively:

obtain geolocation data indicating a location of the first device, and cause the first unlocked tournament game of the one or more unlocked tournament games to be presented for play via the at least one display device of the first device responsive, at least in part, to the receipt of the player input via the tournament GUI displayed on the at least one display device of the first device contemporaneous with the geolocation data indicating that the location of the first device is within a predetermined geographical area.

17. The system of claim 1, wherein the plurality of memory devices further collectively stores computer-executable instructions for further controlling the processors to, collectively:

obtain geolocation data indicating a location of the first device, determine that the location of the first device is within a predetermined geographical area, and cause, responsive to determining that the location of the first device is within the predetermined geographical area, a notification to be provided via the first device that indicates that the first player is eligible to earn one or more items relating to the gaming tournament if the first player takes one or more actions at a particular location, wherein the one or more items are selected from the group consisting: of one or more plays for the gaming tournament, one or more perks that are redeemable for a benefit in the gaming tournament, and combinations thereof.

18. A system comprising:

one or more processors; and one or more memory devices, wherein:

the one or more processors and the one or more memory devices are communicatively connected, and the one or more memory devices collectively store computer-executable instructions for controlling the one or more processors to, collectively:

receive information identifying a first player associated with a first device, wherein the first player is a participant in an asynchronous gaming tournament;

determine when one or more first conditions are met;

cause, responsive to determining that the one or more first conditions are met, a signal to be sent to the first device that causes a first locked tournament game of one or more locked tournament games for the asynchronous gaming tournament to be transitioned to being a first unlocked tournament game available for play by the first player on the first device;

receive a first player game selection input from the first device that is associated with the first unlocked tournament game;

send a signal to the first device to cause the first unlocked tournament game of the one or more unlocked tournament games to be presented for play on the first device responsive, at least in part, to receipt of the first player game selection input from the first device;

receive messages indicating game outcomes associated with the first player's play of the first unlocked tournament game;

adjust a first tournament score associated with the first player responsive to the game outcomes associated with the first player's play of the first unlocked tournament game;

obtain geolocation data indicating a location of the first device; and determine that the one or more first conditions are met by determining that the location of the first device is at least within a predetermined geographical area associated with the first locked tournament game.

* * * * *